United States Patent
Suzuki

(10) Patent No.: US 7,103,646 B1
(45) Date of Patent: Sep. 5, 2006

(54) DISTRIBUTED CONTROL SYSTEM AND INFORMATION PROCESSING SYSTEM

(75) Inventor: Shoji Suzuki, Nakajo-machi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/370,152

(22) Filed: Aug. 9, 1999

(30) Foreign Application Priority Data

| | | |
|---|---|---|
| Aug. 7, 1998 | (JP) | 10-224027 |
| Sep. 21, 1998 | (JP) | 10-265950 |
| Mar. 3, 1999 | (JP) | 11-055556 |

(51) Int. Cl.
*G06F 15/177* (2006.01)

(52) U.S. Cl. ............... 709/220; 709/201; 709/207; 718/103; 370/395.42

(58) Field of Classification Search ............ 709/201, 709/207, 220, 202, 223, 224; 718/103; 370/395.42
See application file for complete search history.

(56) References Cited

U.S. PATENT DOCUMENTS

| 5,802,291 A | * | 9/1998 | Balick et al. | 709/202 |
| 5,859,978 A | * | 1/1999 | Sonderegger et al. | 709/226 |
| 6,111,888 A | * | 8/2000 | Green et al. | 370/461 |
| 6,195,678 B1 | * | 2/2001 | Komuro | 709/202 |
| 6,397,252 B1 | * | 5/2002 | Sadiq | 709/226 |

OTHER PUBLICATIONS

Scheduling messages on controller area network for real–time CIM applications Zuberi, K.M.; Shin, K.G.; Robotics and Automation, IEEE Transactions on , vol.: 13 , Issue: 2, Apr. 1997 pp.: 310–316.*

Non–preemptive scheduling of messages on controller area network for real–time control applications Zuberi, K.M.; Shin, K.G.; Real–Time Technology and Applications Symposium, 1995. Proceedings , May 15–17, 1995 pp.: 240–249.*

OSEK/VDX Communication, Version 2.0a—Oct. 10, 1997, pp. 1–23.

* cited by examiner

*Primary Examiner*—Glenton B. Burgess
*Assistant Examiner*—Anita Choudhary
(74) *Attorney, Agent, or Firm*—Crowell & Moring LLP

(57) ABSTRACT

In a real-time distributed control system in which a plurality of network controllers are connected, a middleware module in each control unit executes starting of application modules and calling RT communication processing according to starting order information in application configuration information. RT communication service sends and receives messages between the application modules corresponding to the calling. The application configuration information and the messages are generated by an information processor based on user defined information, and transmitted to each of the units. A network driver executes network communication using a network controller which stores sending and receiving messages. A network driver priority manager determines priority of processing of the network driver corresponding to priorities of sent and received messages, and a scheduler executes processing of the network driver according to the priority of the processing of the network driver.

13 Claims, 53 Drawing Sheets

FIG.2

| AP MODULE | NEXT EXECUTED MODULE |
|---|---|
| M1 | Msg 1 SENDING |
| M2 | M3 |
| M3 | NULL |
| M4 | Msg 3 SENDING |
| M5 | NULL |
| ⋮ | ⋮ |
| Mn | NULL |

| MESSAGE OBJECT NAME | PRIORITY OF COMMUNICATION PROCESSING | INTERNAL/ EXTERNAL COMMUNICATION | KIND OF COMMUNICATION SERVICE | AT SENDING | AT RECEIVING |
|---|---|---|---|---|---|
| Msg1 | NULL | INTERNAL | INTERNAL | Msg1 RECEIVING | M2 |
| Msg2 | MIDDLE | EXTERNAL | EXTERNAL | NULL | M4 |
| Msg3 | LOW | EXTERNAL | EXTERNAL | M5 | NULL |
| ⋮ | ⋮ | | | | |
| Msgm | HIGH | EXTERNAL | EXTERNAL | NULL | NULL |

FLOW CHART SHOWING OPERATION OF MODULE STARTING CONTROL TASK

FIG.6(a)

| INTERRUPT CAUSE | START TASK |
|---|---|
| 30ms TIMER | MODULE START CONTROL TASK A |

FIG.6(b)

| |
|---|
| PRIORITY:HIGH |
| RECEIVING TARGET VEHICLE SPEED |
| |
| |

FIG.6(c)

| AP MODULE | NEXT EXECUTED MODULE |
|---|---|
| TARGET DRIVE FORCE CALCULATION | TARGET DRIVE FROCE, SENDING |
| THROTTLE OPENING CALCULATION | NULL |

FIG.6(d)

| MESSAGE OBJECT NAME | PRIORITY OF COMMUNICATION PROCESSING | INTERNAL/ EXTERNAL COMMUNICATION | KIND OF COMMUNICATION SERVICE | NEXT EXECUTED MODULE AT SENDING | NEXT EXECUTED MODULE AT RECEIVING |
|---|---|---|---|---|---|
| TARGET VEHICLE SPEED | MIDDLE | INTERNAL | ASYNCHRONOUS | NULL | TARGET DRIVE FORCE CALCULATION |
| TARGET DRIVE FORCE | NULL | INTERNAL | SYNCHRONOUS | TARGET DRIVE FORCE, SENDING | THROTTLE OPENING CALCULATION |

FIG.8(a)

| INTERRUPT CAUSE | START TASK |
|---|---|
| 30ms TIMER | TASK A |

| INTERRUPT CAUSE | START TASK |
|---|---|
| TARGET DRIVE FORCE RECEIVING | TASK B |

FIG.8(b)

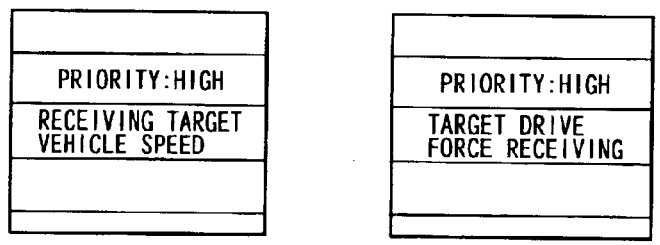

| PRIORITY:HIGH |
|---|
| RECEIVING TARGET VEHICLE SPEED |

| PRIORITY:HIGH |
|---|
| TARGET DRIVE FORCE RECEIVING |

FIG.8(c)

| AP MODULE | NEXT EXECUTED MODULE |
|---|---|
| TARGET DRIVE FORCE CALCULATION | TARGET DRIVE FROCE, SENDING |
| THROTTLE OPENING CALCULATION | NULL |

FIG.8(d)

| MESSAGE OBJECT NAME | PRIORITY OF COMMUNICATION PROCESSING | INTERNAL/ EXTERNAL COMMUNICATION | KIND OF COMMUNICATION SERVICE | NEXT EXECUTED MODULE AT SENDING | NEXT EXECUTED MODULE AT RECEIVING |
|---|---|---|---|---|---|
| TARGET VEHICLE SPEED | MIDDLE | INTERNAL | ASYNCHRONOUS | NULL | TARGET DRIVE FORCE CALCULATION |
| TARGET DRIVE FORCE | HIGH | EXTERNAL | SYNCHRONOUS | NULL | THROTTLE OPENING CALCULATION |

FIG.10

TABLE OF CORRESPONDENCE BETWEEN INTERRUPT CAUSE AND START TASK IN DRIVE FORCE MANAGEMENT UNIT

| INTERRUPT CAUSE | START TASK |
|---|---|
| TARGET VEHICLE SPEED RECEIVING | TASK A |

TABLE OF CORRESPONDENCE BETWEEN INTERRUPT AND START TASK IN THROTTLE CONTROL UNIT

| INTERRUPT CAUSE | START TASK |
|---|---|
| TARGET DRIVE FORCE RECEIVING | TASK B |

TABLE OF CORRESPONDENCE BETWEEN INTERRUPT CAUSE AND START TASK IN DRIVE FORCE MANAGEMENT UNIT

| INTERRUPT CAUSE | START TASK |
|---|---|
| 30ms TAIMER | TASK C |

FIG.11

TCB OF TASK A

| |
|---|
| PRIORITY:HIGH |
| RECEIVING TARGET VEHICLE SPEED |
| |

TCB OF TASK B

| |
|---|
| PRIORITY:HIGH |
| TARGET DRIVE FORCE RECEIVING |
| |

TCB OF TASK C

| |
|---|
| PRIORITY:HIGH |
| FOLLOWING DISTANCE CALCULATION |
| |

FIG.12

TABLE OF AP MODULE CONFIGURATION INFORMATION

| AP MODULE | NEXT EXECUTED MODULE |
|---|---|
| TARGET DRIVE FORCE CALCULATION | TARGET DRIVE FORCE, SENDING |
| THROTTLE OPENING CALCULATION | NULL |
| FOLLOWING DISTANCE CALCULATION | FOLLOWING DISTANCE, SENDING |
| TARET VEHICLE SPEED CALCULATION | TARGET VEHICLE SPEED, SENDING |

FIG.13

TABLE MESSAGE OBJECT CONFIGURATION INFORMATION

| MESSAGE OBJECT NAME | PRIORITY OF COMMUNICATION PROCESSING | INTERNAL/ EXTERNAL COMMUNICATION | KIND OF COMMUNICATION SERVICE | AT SENDING | NEXT EXECUTED MODULE AT RECEIVING |
|---|---|---|---|---|---|
| TARGET VEHICLE SPEED | MIDDLE | INTERNAL | SYNCHRONOUS | NULL | TARGET DRIVE FORCE CALCULATION |
| TARGET DRIVE FORCE | HIGH | EXTERNAL | SYNCHRONOUS | NULL | THROTTLE OPENING CALCULATION |
| FOLLOWING DISTANCE | NULL | INTERNAL | SYNCHRONOUS | FOLLOWING DISTANCE, RECEIVING | TARGET VEHICLE SPEED CALCULATION |

FIG.15

TABLE OF CORRESPONDENCE BETWEEN INTERRUPT CAUSE AND START TASK IN DRIVE FORCE MANAGEMENT UNIT

| INTERRUPT CAUSE | START TASK |
| --- | --- |
| FOLLOWING DISTANCE CALCULATION | TASK A |

TABLE OF CORRESPONDENCE BETWEEN INTERRUPT AND START TASK IN THROTTLE CONTROL UNIT

| INTERRUPT CAUSE | START TASK |
| --- | --- |
| TARGET DRIVE FORCE RECEIVING | TASK B |

TABLE OF CORRESPONDENCE BETWEEN INTERRUPT CAUSE AND START TASK IN DRIVE FORCE MANAGEMENT UNIT

| INTERRUPT CAUSE | START TASK |
| --- | --- |
| 30ms TAIMER | TASK C |

FIG.16

TCB OF TASK A

| |
| --- |
| PRIORITY:HIGH |
| RECEIVING TARGET VEHICLE SPEED |
| |

TCB OF TASK B

| |
| --- |
| PRIORITY:HIGH |
| TARGET DRIVE FORCE RECEIVING |
| |

TCB OF TASK C

| |
| --- |
| PRIORITY:HIGH |
| FOLLOWING DISTANCE CALCULATION |
| |

FIG.17

TABLE OF AP MODULE CONFIGURATION INFORMATION

| AP MODULE | NEXT EXECUTED MODULE |
|---|---|
| TARGET DRIVE FORCE CALCULATION | TARGET DRIVE FORCE, SENDING |
| THROTTLE OPENING CALCULATION | NULL |
| FOLLOWING DISTANCE CALCULATION | FOLLOWING DISTANCE, SENDING |
| TARET VEHICLE SPEED CALCULATION | TARGET VEHICLE SPEED, SENDING |

FIG.18

TABLE OF MESSAGE OBJECT CONFIGURATION INFORMATION

| MESSAGE OBJECT NAME | PRIORITY OF COMMUNICATION PROCESSING | INTERNAL/ EXTERNAL COMMUNICATION | KIND OF COMMUNICATION SERVICE | AT SENDING | AT RECEIVING |
|---|---|---|---|---|---|
| | | | | NEXT EXECUTED MODULE | |
| TARGET VEHICLE SPEED | MIDDLE | INTERNAL | SYNCHRONOUS | TARGET VEHICLE SPEED, RECEIVING | TARGET DRIVE FORCE CALCULATION |
| TARGET DRIVE FORCE | HIGH | EXTERNAL | SYNCHRONOUS | NULL | THROTTLE OPENING CALCULATION |
| FOLLOWING DISTANCE | NULL | INTERNAL | SYNCHRONOUS | FOLLOWING DISTANCE, RECEIVING | TARGET VEHICLE SPEED CALCULATION |

DISTRIBUTED CONTROL PROCESSING MIDDLEWARE CODE GENERATING TOOL

FIG.23

SYSTEM INPUT/OUTPUT INFORMATION TABLE

| INPUT | OUTPUT |
|-------|--------|
| D11 | D14 |
| D21 | D24 |
| D31 | D34 |

FLOW OF EXTRACTING COMMUNICATION DATA BETWEEN UNITS (S3070)

DELETING THE SAME ITEM OF DATA BOTH INPUT AND OUTPUT FROM AP MODULE DATA INPUT/OUTPUT INFORMATION TABLE — S3181

↓

ASSIGNING REMAINING ITEM OF DATA TO INPUT DATA — S3182

↓

ASSIGNING ITEM OF DATA, WHICH IS OUTPUT FROM AP MODULE OF OWN UNIT AND INPUT TO THE OTHER UNITS OR OUTPU FROM THE SYSTEM, TO OUTPUT DATA — S3183

AP MODULE START INFORMATION TABLE — 2422

T1 / T2 / T3

| STARTING ORDER (2422a) | PRIORITY (2422b) | START CONDITION (2422c) | EVENT SETTING CONDITION (2422d) |
|---|---|---|---|
| M11 | 1 | 10ms CYCLE | NULL |
| M12 | | | |
| M13 | | | |

⇩

T1

| STARTING ORDER | PRIORITY | START CONDITION | EVENT SETTING CONDITION |
|---|---|---|---|
| M11 | 1 | 10ms CYCLE | NULL |
| M12 | | | |
| M13 | | | |

T2

| STARTING ORDER | PRIORITY | START CONDITION | EVENT SETTING CONDITION |
|---|---|---|---|
| M11 | 2 | AFTER UPDATING DATA D21 | 1:10ms AFTER COMPLETION OF M22 |
| M12 | | | |
| WEIGHT 1 | | | |
| M23 | | | |

T3

| STARTING ORDER | PRIORITY | START CONDITION | EVENT SETTING CONDITION |
|---|---|---|---|
| M31 | 3 | AFTER UPDATING DATA D22 | NULL |
| M32 | | | |
| M33 | | | |

FIG.26(a)

AP MODULE/MESSAGE OBJECT START INFORMATION TABLE FOR UNIT1

T1

| STARTING ORDER | PRIORITY | START CONDITION | EVENT SETTING CONDITION |
|---|---|---|---|
| Meg11 RECEIVING | 1 | 10ms CYCLE | NULL |
| M11 | | | |
| M12 | | | |
| Meg12-13 SENDING | | | |
| M13 | | | |

Columns: 2630a, 2630b, 2630c, 2630d

| STARTING ORDER | PRIORITY | START CONDITION | EVENT SETTING CONDITION |
|---|---|---|---|
| Meg21 RECEIVING | 2 | AFTER UPDATING DATA Mge21 | NULL |
| M21 | | | |
| Meg22 SENDING | | | |

| STARTING ORDER | PRIORITY | START CONDITION | EVENT SETTING CONDITION |
|---|---|---|---|
| Meg22 RECEIVING | 3 | AFTER UPDATING DATA Mge22 | NULL |
| M31 | | | |
| Meg32 SENDING | | | |

FIG.27(a)

AP MODULE/MESSAGE OBJECT START INFORMATION TABLE FOR UNIT2

T2

| STARTING ORDER | PRIORITY | START CONDITION | EVENT SETTING CONDITION |
|---|---|---|---|
| Meg22 RECEIVING | 1 | AFTER UPDATING Meg22 | 1:10ms AFTER COMPLETING M22 |
| Meg12-13 SENDING | | | |
| M22 | | | |
| WEIGHT 1 | | | |
| M23 | | | |
| Meg22 RECEIVING | | | |

| STARTING ORDER | PRIORITY | START CONDITION | EVENT SETTING CONDITION |
|---|---|---|---|
| Meg32 RECEIVING | 2 | AFTER UPDATING DATA Mge32 | NULL |
| M32 | | | |
| Meg33 SENDING | | | |

| STARTING ORDER | PRIORITY | START CONDITION | EVENT SETTING CONDITION |
|---|---|---|---|
| Meg33 RECEIVING | 1 | AFTER UPDATING DATA Mge33 | NULL |
| M31 | | | |
| Meg34 SENDING | | | |

FIG.29(a)

| | | | MESSAGE OBJECT INFORMATION TABLE FOR UNIT 1 | | | |
|---|---|---|---|---|---|---|
| 2931a | 2931b | 2931c | 2931d | 2931e | 2931f | 2931g |
| DATA | MESSAGE OBJECT | READ/ WRITE | SEND/ RECEIVE | ACTION AFTER UPDATING | PRIORITY | UPDATING CONDITION |
| D11 | Msg11 | READ | RECEIVING | NULL | NULL | AFTER ARRIVAL |
| D12 D13 | Msg12-13 | WRITE | SENDING | NULL | 2 | AFTER M12 |
| D14 | Msg14 | WRITE | SENDING | NULL | 1 | AFTER M13 |
| D21 | Msg21 | READ | RECEIVING | TASK2 START | NULL | AFTER ARRIVAL |
| D22 | Msg22 | WRITE/READ | SENDING | TASK3 START | 2 | AFTER M21 |
| D32 | Msg32 | WRITE | SENDING | NULL | 2 | AFTER M31 |

FIG.29(b)

| | | | MESSAGE OBJECT INFORMATION TABLE FOR UNIT 2 | | | |
|---|---|---|---|---|---|---|
| DATA | MESSAGE OBJECT | READ/ WRITE | SEND/ RECEIVE | ACTION AFTER UPDATING | PRIORITY | UPDATING CONDITION |
| D22 | Msg22 | READ | RECEIVING | TASK2 START | NULL | AFTER ARRIVAL |
| D12 D13 | Msg12-13 | READ | RECEIVING | NULL | NULL | AFTER ARRIVAL |
| D24 | Msg24 | WRITE | SENDING | NULL | 2 | AFTER M23 |
| D32 | Msg32 | READ | RECEIVING | TASK3 START | NULL | AFTER ARRIVAL |
| D33 | Msg33 | WRITE | SENDING | NULL | 3 | AFTER M32 |

FIG.29(c)

| | | | MESSAGE OBJECT INFORMATION TABLE FOR UNIT 3 | | | |
|---|---|---|---|---|---|---|
| DATA | MESSAGE OBJECT | READ/ WRITE | SEND/ RECEIVE | ACTION AFTER UPDATING | PRIORITY | UPDATING CONDITION |
| D33 | Msg22 | READ | RECEIVING | TASK3 START | NULL | AFTER ARRIVAL |
| D34 | Msg24 | WRITE | SENDING | NULL | 2 | AFTER M23 |

FIG.34
EXTRACTING COMMUNICATION DATA BETWEEN TASKS
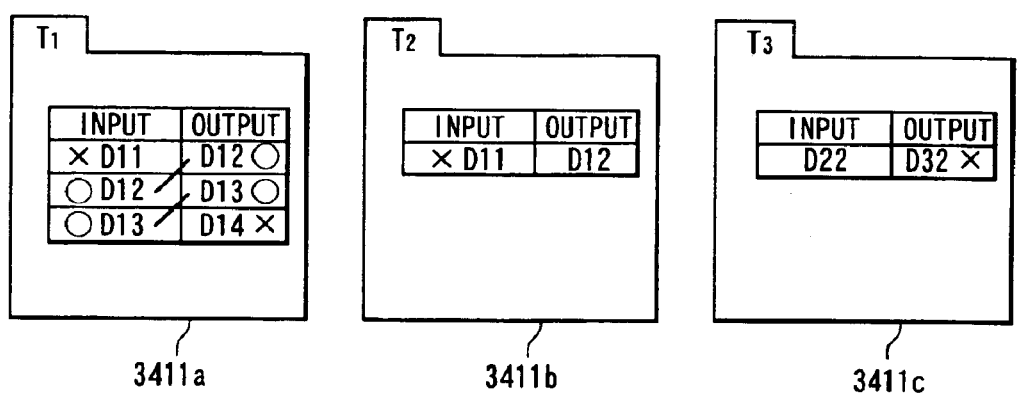
$\begin{cases} \times : \text{DELETED DATA IN S3391} \\ \bigcirc : \text{DELETED DATA IN S3392} \end{cases}$
↓ EXTRACTION
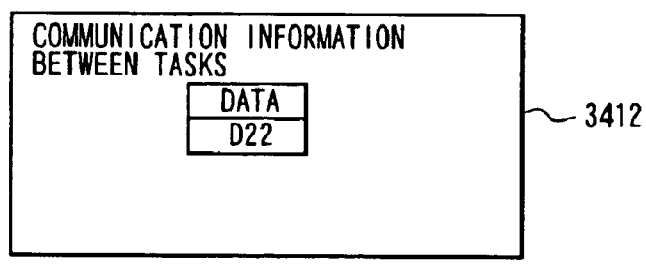

FIG.35

FLOW OF EXTRACTING DATA TO BE PACKED (S3072)

S3071
↓
CHECKING DATA COMMUNICATED BETWEEN TASKS AND BETWEEN UNITS ON TASK EXECUTING MODULE FOR OUTPUTTING THE DATA — S3520
↓
CHECKING EACH ITEM OF EXTRACTED DATA ON MODULE FOR READING THE DATA — S3521
↓
EXTRACTING GROUP OF ITEMS OF DATA BELONGING TO THE SAME OUTPUT TASK AND TO THE SAME READING MODULE OUT OF EXTRACTED DATA, AND ASSIGNING THE GROUP TO A GROUP OF DATA ITEMS TO BE PACKED — S3522
↓
S3073

FIG.36

PACK EXTRACTING TABLE

| DATA | OUTPUT TASK | READING M |
|------|-------------|-----------|
| D22  | T2          | M31, M22  |
| D11  | —           | M11       |
| D21  | —           | M21       |
| D14  | T1          | —         |
| D32  | T3          | —         |
| D12  | T1          | M22       |
| D13  | T1          | M22       |

3630

PACK { D12, D13 }

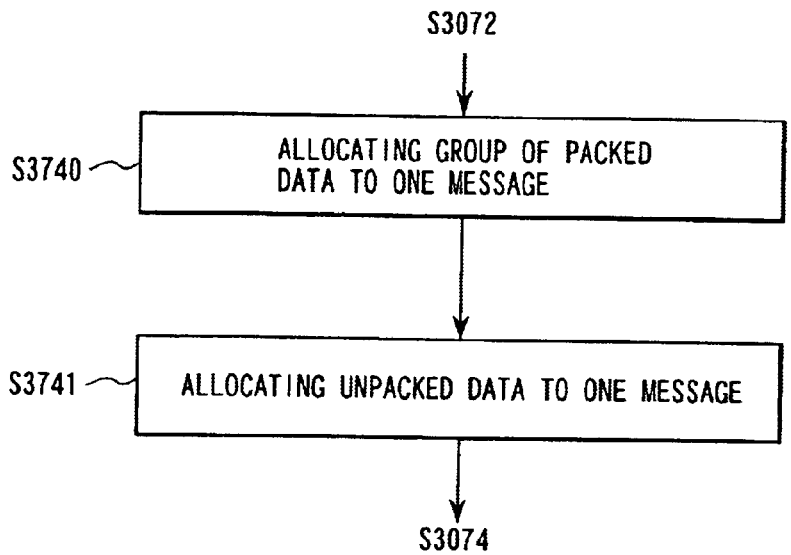
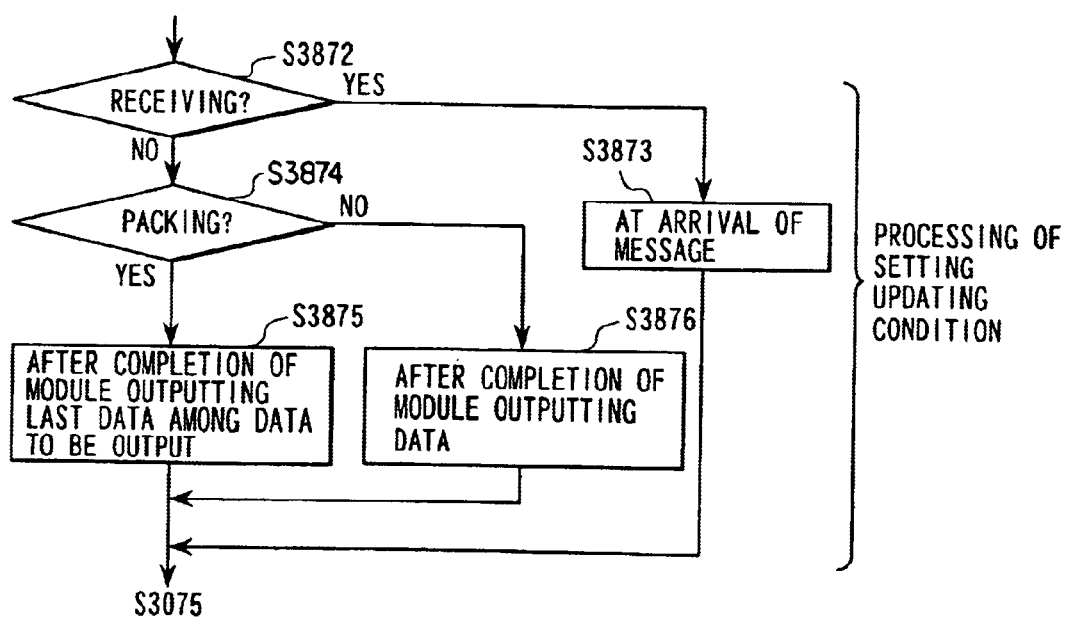

FLOW OF SETTING START CONDITION (3077)

FLOW OF SETTING TASK PRIORITY (S3079)

FIG.45(a)

COMMUNICATION INFORMATION TABLE 4580

| DATA 4580a | PRIORITY 4580b | DIRECT/CYCLE (hour) 4580c | ACTION AT RECEIVING 4580d | TIME-OUT 4580e | NOMSG ALLOWABLE NUMBER OF TIMES 4580f | START TASK ID AT OCCURRENCE OF ERROR 4580g | Ack PRESENCE/ABSENCE 4580h |
|---|---|---|---|---|---|---|---|
| D12 | 3 | CYCLE (10) | ↑TASK3 EVENT SET | 10 | 10 | TASK10 | PRESENCE |
| D23 | – | – | ↑TASK2 EVENT SET | 10 | 10 | TASK10 | |

FIG.45(b)

PACK INFORMATION TABLE

| DATA 4581a | PRIORITY 4581b | DIRECT/CYCLE (hour) 4581c | ACTION AT RECEIVING 4581d | TIME-OUT 4581e | NOMSG ALLOWABLE NUMBER OF TIMES 4581f | START TASK ID AT OCCURRENCE OF ERROR 4581g | Ack PRESENCE/ABSENCE 4581h | SENDING TIMING 4581i | COMMUNICATION ALONE 4581j |
|---|---|---|---|---|---|---|---|---|---|
| D12, D3, D22 | – | – | – | – | – | – | – | AFTER UPDATING D12 ALL AFTER UPDATING ANY TIME AFTER UPDATING | D22 |

— UPDATING MESSAGE BY RECIVING FROM OUTSIDE OF UNIT
▱ SENDING TO OUTSIDE OF UNIT
⏝ UPDATING MESSAGE BY TASK INSIDE UNIT
⏜ THERE IS READING BY TASK INSIDE UNIT

▷ TASK START
◁ TASK END
☐ WAIT

FIG.48

| DATA | MESSAGE | WRITE/READ | SEND/RECEIVE | ACTION AFTER UPDATING | PRIORITY | UPDATING CONDITION |
|---|---|---|---|---|---|---|
| D12<br>D13 | Msg12-13 | WRITE/READ | NULL | NULL | 2 | AFTER M12 |
| D22 | Msg22 | WRITE/READ | NULL | TASK3 START | 3 | AFTER M21 |
| D11 | Msg11 | READ | RECEIVE | NULL | NULL | AFTER ARRIVAL |
| D21 | Msg21 | READ | RECEIVE | TASK2 START | NULL | AFTER ARRIVAL |
| D14 | Msg14 | WRITE | SEND | NULL | 1 | AFTER M13 |
| D24 | Msg24 | WRITE | SEND | NULL | 2 | AFTER M23 |
| D34 | Msg34 | WRITE | SEND | NULL | 3 | AFTER M33 |

MESSAGE OBJECT INFORMATION TABLE

FIG.49

EXAMPLE OF AP MODULE/MESSAGE OBJECT START INFORMATION TABLE

TASK 1

| STARTING ORDER | PRIORITY | START CONDITION | EVENT SETTING CONDITION |
|---|---|---|---|
| Meg11 RECEIVING | 1 | 10ms CYCLE | NULL |
| M11 | | | |
| M12 | | | |
| Meg12-13 SENDING | | | |
| M13 | | | |
| Meg12-13 SENDING | | | |

TASK 2

| STARTING ORDER | PRIORITY | START CONDITION | EVENT SETTING CONDITION |
|---|---|---|---|
| Meg21 RECEIVING | 2 | AFTER UPDATING Meg21 | 1:10ms AFTER COMPLETION OF M22 |
| M21 | | | |
| Meg22 SENDING | | | |
| Meg12-13 SENDING | | | |
| M22 | | | |
| WEIGHTING 1 | | | |
| M23 | | | |
| Meg23 SENDING | | | |

TASK 3

| STARTING ORDER | PRIORITY | START CONDITION | EVENT SETTING CONDITION |
|---|---|---|---|
| Meg22 RECEIVING | 3 | AFTER UPDATING Meg22 | NULL |
| M31 | | | |
| M32 | | | |
| M33 | | | |
| Meg34 RECEIVING | | | |

FIG.63

MESSAGE ATTRIBUTE TABLE

| MAIL BOX NUMBER | Message ID | Data Size | QUEUED | LOCKED | NOMSG | LIMIT |
|---|---|---|---|---|---|---|
| 0 | 100 | 8 | 0 | 1 | 1 | 0 |
| 1 | 200 | 8 | 1 | 0 | 1 | 0 |
| 2 | 500 | 8 | 0 | 0 | 1 | 0 |
| . | . | . | . | . | . | . |
| . | . | . | . | . | . | . |

TASK PRIORITY MANAGEMENT TABLE

| MESSAGE ID | TASK PRIORITY |
|---|---|
| 100 | 1 |
| 200 | 2 |
| 300 | 3 |

6700, 6701

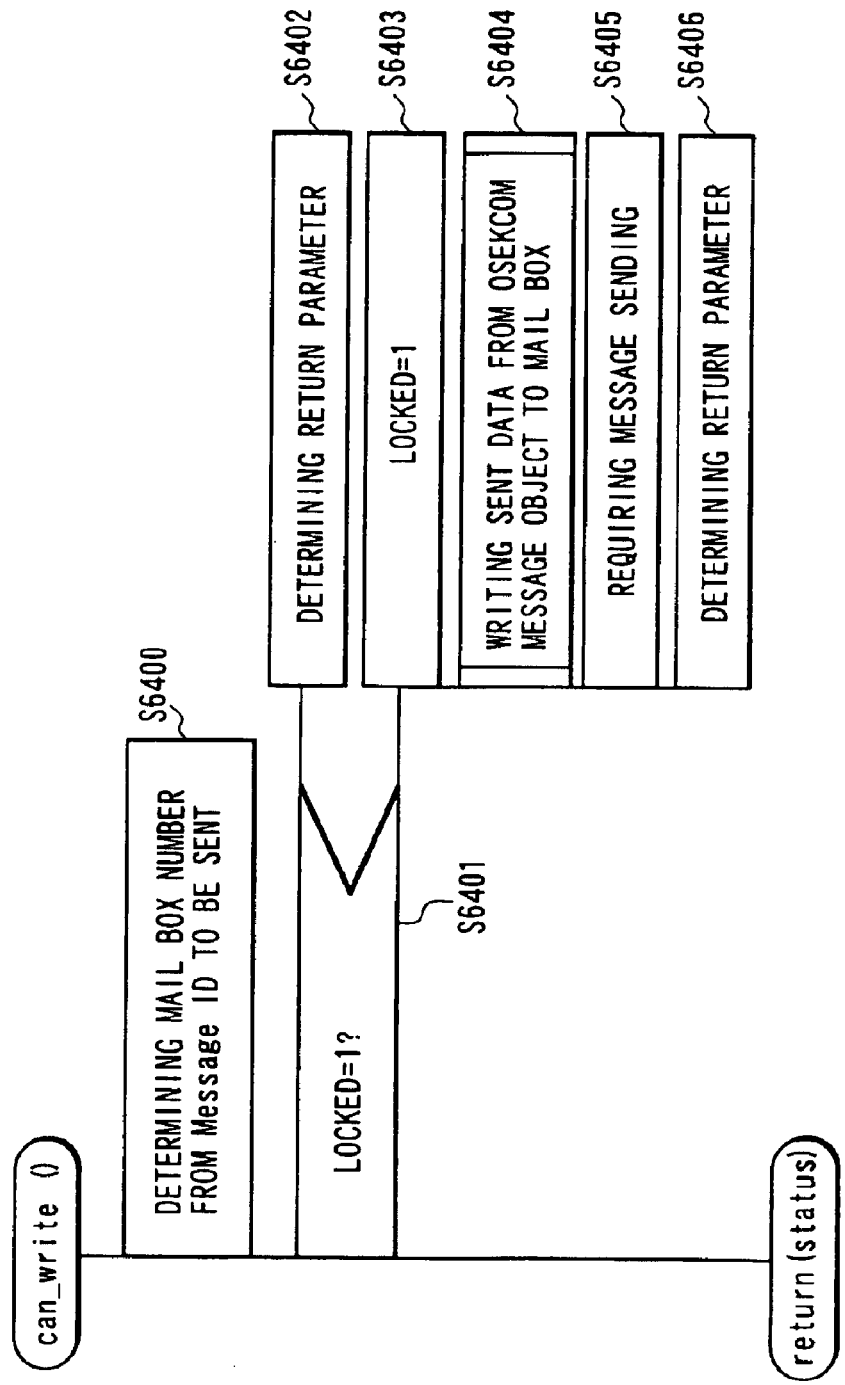

DISTRIBUTED CONTROL SYSTEM AND INFORMATION PROCESSING SYSTEM

BACKGROUND OF THE INVENTION

The present invention relates to a distributed control system in which a plurality of built-in systems are connected with a field network such as a CAN (controller area network), a foundation field bus or the like.

A distributed control system in which a plurality of built-in systems are connected with a field network has been applied to a power train control system of a vehicle, a field instrument control system of factory automation or process automation, a control system of a medical instrument or a robot.

In an LON (local operating network) of a kind of field networks or in a standard communication protocol for automobile control OSEK-COM), a library method is employed. In the library method, an application program module (hereinafter, referred to as AP module) calls communication processing. A technology in connection with the library method is described, for example, in "OSEK/VDX Communication Version 2.0a (edited by OSEK group)".

On the other hand, in most of industrial systems, a memory transcribing method (reflective memory method) is employed. In the memory transcribing method, an AP module and communication processing separated from each other through a common memory are asynchronously operated. A technology in connection with the memory transcribing method is disclosed, for example, in Japanese Patent Application Laid-Open. No 6-332807.

When a message is sent or received through a network, a network controller realizing the network communication by hardware and a network driver performing the network communication using the network controller are used. Here, let a buffer for storing the sent and received message provided in the network controller be called as a mail box. For example, in a case of sending a message, a sending requirement from an application to the network is arranged in a sending requirement queue. The network driver performs network sending processing by taking the sending requirement out of the sending requirement queue one by one and storing the sent message into the mail box. Since the sending requirement queue is generally queued by FIFO, the network sending processing is performed in order of time requiring sending. However, in a real time distributed system, it is desirable that priority is added to the message and the network communication processing is performed in order of the priority. Therefore, as described, for example, in Interface, No. 12, 1994, pages 72 to 148, published by CQ Publisher, there is a method of controlling a network communication in order of priority by changing places of queued sending requirements to order of priority of messages to be sent by an application. Thereby, the network driver can perform network sending processing according to the priority of the sent data at extracting the sending requirements from the sending requirement queue instead of extracting in order of time requiring sending.

SUMMARY OF THE INVENTION

However, in the conventional library method described above, it is difficult to guarantee the worst executing time of sensor inputting to actuator outputting including the communication processing through the network, that is, to guarantee the real time operatability of end-to-end because a communication process or the like is described in the AP module.

In other words, in a case where real-time operatability is independently guaranteed for each AP module in taking the starting timings of the AP module and communication processing into consideration, the AP module needs to be completely re-written ever change in the system configuration because the AP module does not have versatility at least in the real-time operation, and accordingly the real-time operatability of end-to-end is difficult to be guaranteed. Further, as standardization of protocol in field network is being progressed, it is expected that need for interconnection of different vendor units from each other is being increased. However, when the units of different kinds are interconnected and rewriting of the AP module on each of the units is impossible, the real-time operatability of end-to-end can not be guaranteed.

On the other hand, according to the conventional memory transcribing method described above, the worst executing time of each AP module and the worst executing time of communication processing are guaranteed because the AP module and the communication processing are separated from each other, but the data transmission delay occurs because the AP module and the communication processing are asynchronously started. Therefore, the worst executing time from sensor input to actuator output including the communication processing through the network is not guaranteed. From such a reason, it is considered that the conventional memory transcribing method is unsuitable for processing severe in requiring the worst executing time.

Further, according to the conventional memory transcribing method, traffic on the network is easily occurs because data on a common memory is periodically transferred and updated ny the communication processing.

A first object of the present invention is to provide a distributed control system which can easily guarantee the real-time operatability of end-to-end over a network and can suppress a volume of software change incident to change in the system configuration. A second object of the present invention is to provide an information processing system which can automatically produce information defining the control structure of each control unit on the distributed control system.

Further, in the conventional memory transcribing method described above, there is a problem that when a network driver is once started up to start network sending processing, network sending processing for a message having a higher priority can not be executed until the present network processing is completed even if a sending requirement is made to the message having the priority higher than that of the data presently under network sending processing.

Here, a real-time distributed system in which a plurality of network controllers are connected is taken as an example. It is assumed that the real-time distributed system employs a network which performs priority control of the network according to priorities added to messages. When the plurality of network controllers send messages to the network, the priority control of the network is performed according to the priorities added to the messages, a network controller, which makes a sending requirement of message of the highest priority among messages required to be sent, can send the message to the network. At that time, a network controller making a sending requirement of message of lower priority is behind in sending the message to the network. Therefore, if the network controller can not perform network sending processing of a message of a higher priority until network sending processing of a massage of a lower priority is completed, the network sending processing of the message of the higher priority is further deferred to produce a problem in the real-time operatability of the system.

Therefore, a third object of the present invention is to provide a distributed control system which can send a message of the highest priority among messages required to be sent even if the network driver processing has been already started.

In order to attain the above-mentioned first object, a control unit connected to a network comprises a module configuration information storing portion for storing starting procedure of one or more software modules composing an application program; and a module starting control portion for executing the application program modules referring to the module configuration information storing portion.

Further, in order to attain the above-mentioned first object, a control unit connected to a network comprises a message object configuration information storing portion for storing starting procedure of one or more message objects having a network communication function; and a real-time communication processing control portion for executing the message objects referring to the message object configuration information storing portion.

Furthermore, in order to attain the above-mentioned first object, in a distributed control system having at least one control unit connected to a network, the control unit connected to a network comprises a module configuration information storing portion for storing starting procedure of one or more software modules composing an application program; an object configuration information storing portion for storing starting procedure of one or more message objects having a network communication function; a module start control portion for executing the application program module referring to the application program module configuration information storing portion; and a real-time communication processing control portion for executing the message object referring to the message object configuration information storing portion.

Further, in order to attain the above-mentioned first object, a control unit connected to a network comprises a first information storing portion for storing the application programs and a communication control processing program in which the message communication processing is defined; a second information storing portion for storing module configuration information in which starting order of the programs on the control unit is determined; and a third information storing portion for storing message object by which a start control portion for starting the application program and the communication processing program and a communication control program started by the start control portion send and receive message data between the application programs based on the starting order determined in the module configuration information.

In the distributed control system, because the starting control means makes the application program and the communication control program into operation according to the module configuration information, the application program and the message communication processing program are completely separated from each other. Therefore, according to the distributed control system, even if the system configuration or the unit configuration is changed, the application can be executed under the new system configuration by changing only the set contents of the module configuration information without changing the software. That is, since a volume of software change incident to change in the system configuration can be suppressed to minimum, labor for matching the application to the new system can be reduced and productivity of software can be improved.

Further, in the distributed control system, since starting order of the application program and the communication control program on each of the control units can be changed by changing the set contents of the module configuration information on each of the control units, the application program and the communication control program can be easily started synchronously or asynchronously. Therefore, it is easy to shorten the worst executing time of sensor inputting to actuator outputting including the communication processing through the network, and it is easy to guarantee the real time operatability of end-to-end.

In order to attain the above-mentioned second object, an information processing system comprises an input receiving means for receiving inputs of starting order information of all application modules comprising an application executed on a distributed control system having a plurality of control units, unit storing information designating a unit allocated to each of the application modules and input data name information of each of the application modules; an information generating means for generating at least one of module configuration information and message object based on the starting order information and the input and output data name information, wherein in regard to each of the control units designated as the allocated units by the allocation unit information, the module configuration information determines starting order on the control unit of all the application modules allocated to the control unit and the message object is for sending and receiving each of the application modules allocated to the control unit; and an output means for outputting the information generated by the information generating means.

According to the information processing system, only by inputting the input information such as the system configuration information determining the starting order of all the application modules composing the application into the input receiving means, the information defining the control structure of each of the control units of the distributed control system, that is, any one of the module configuration information and the message object is automatically generated based on the input information. Therefore, the present information processing system is useful for easily insuring the real-time operatability of end-to-end of the distributed control system.

In order to attain the above-mentioned third object, a distributed control system comprises a network driver for performing network communication by executing processing of sending and receiving a plurality of massages using the network controller containing a plurality of sent and received messages to be handled; a network driver priority management portion for determining priorities on the processing of the network driver corresponding to the priorities of communication of the sent and received messages; and a scheduling portion for executing the processing of the network driver according to the priorities of the processing of the network driver.

Further, in order to attain the above-mentioned third object, a distributed control system comprises a message memory portion for storing a plurality of sent and received messages; a network driver for performing network communication by executing processing of sending and receiving the plurality of messages stored in the message memory portion using the network controller; a network driver priority management portion for determining priorities on the processing of the network driver corresponding to the priorities of communication of the sent and received messages to be handled; and a scheduling portion for executing the processing of the network driver according to the priorities of the processing of the network driver.

Furthermore, in order to attain the above-mentioned third object, a distributed control system comprises a message memory portion for storing a plurality of sent and received messages; a network driver for performing network communication using the network controller; a communication processing library for executing processing of sending and receiving a plurality of messages stored in the message memory portion using the network driver; a network driver priority management portion for determining priorities on the processing of the network driver corresponding to the priorities of communication of the sent and received messages to be handled; and a scheduling portion for executing the processing of the network driver according to the priorities of the processing of the network driver.

By the above-mentioned configuration, even if a network driver is once started up to start a task of message sending processing, a sending processing task for a network driver having a higher priority is started in parallel to execute the sending processing of the message having the higher priority without waiting completion of network sending processing being progressed now when a sending requirement is made to the message having the priority higher than that of the data presently under network sending processing. Similarly, in a case of receiving, when a message having a higher priority is received during processing of a message receiving task, a receiving processing task of the network driver having a higher priority is started to execute the receiving processing earlier. By doing so, messages can be received in order of higher priority.

BRIEF DESCRIPTION OF DRAWINGS

FIG. 2 is a figure showing an example of AP module configuration information and message object configuration information.

FIG. 6 is tables showing parameters of the unit shown in FIG. 5.

FIG. 8 is tables showing parameters of the unit shown in FIG. 7.

FIG. 9 is a block diagram showing operation of a task which a unit is added to.

FIG. 10 is a figure showing tables of correspondence between interrupt cause-start task in the throttle control unit 1.

FIG. 11 is tables showing TCBs (task control blocks) of task A, task B and task C.

FIG. 12 is a table showing an AP module configuration information.

FIG. 13 is a table showing a message object configuration information.

FIG. 15 is a figure showing tables of correspondence between interrupt cause-start task in the throttle control unit 1.

FIG. 16 is tables showing TCBs (task control blocks) of task A, task B and task C.

FIG. 17 is a table showing an AP module configuration information.

FIG. 18 is a table showing a message object configuration information.

FIG. 23 is a figure showing an example of a system input/output information table contained in a system input/output information.

FIG. 24 is a figure showing an example of an AP module start information table contained in a system configuration information.

FIG. 26 is a figure showing an example of an AP module/message object start information table generated by an information analyzing tool.

FIG. 27 is a figure showing an example of an AP module/message object start information table generated by an information analyzing tool.

FIG. 28 is a figure showing an example of an AP module/message object start information table generated by an information analyzing tool.

FIG. 29 is a figure showing an example of a message object information table for each control unit generated by the information analyzing tool.

FIG. 31 is a flowchart showing the flow of inter-unit communication data extracting processing in an inter-unit communication data extracting routine S3070 of FIG. 30.

FIG. 34 is a figure for explaining the inter-task communication data extracting processing in detail.

FIG. 35 is a flowchart showing the flow of packed data extracting processing in a packed data extracting routine S3072 of FIG. 30.

FIG. 36 is a figure conceptually showing a packed data extracting table generated by the packed data extracting processing.

FIG. 37 is a flowchart showing the flow of message object processing in a message object generating routine S3073 of FIG. 30.

FIG. 40 is a flowchart showing the flow of updating condition setting processing and setting correcting processing in the message object item setting routine S3074 of FIG. 30.

FIG. 45(a) is a figure conceptually showing the data structure of a communication information table contained in a user defining information, and (a) is a figure conceptually showing the data structure of a packed information table contained in the user defining information.

FIG. 48 is a figure showing an example of a message object information table of one control unit in a case where all the AP modules are arranged in the one control unit.

FIG. 49 is a figure showing an example of an AP module/message object start information table of one control unit in a case where all the AP modules are arranged in the one control unit.

FIG. 63 is a figure showing the detailed configuration of a message attribute table composing a CAN driver in a control unit of the real-time distributed system.

FIG. 64 is a flowchart showing the flow of sending a message by the CAN driver.

FIG. 67 is a figure showing the detailed configuration of a task priority management table composing an OS in the control unit of the real-time distributed system.

DESCRIPTION OF THE PREFERRED EMBODIMENTS

Figure 1:
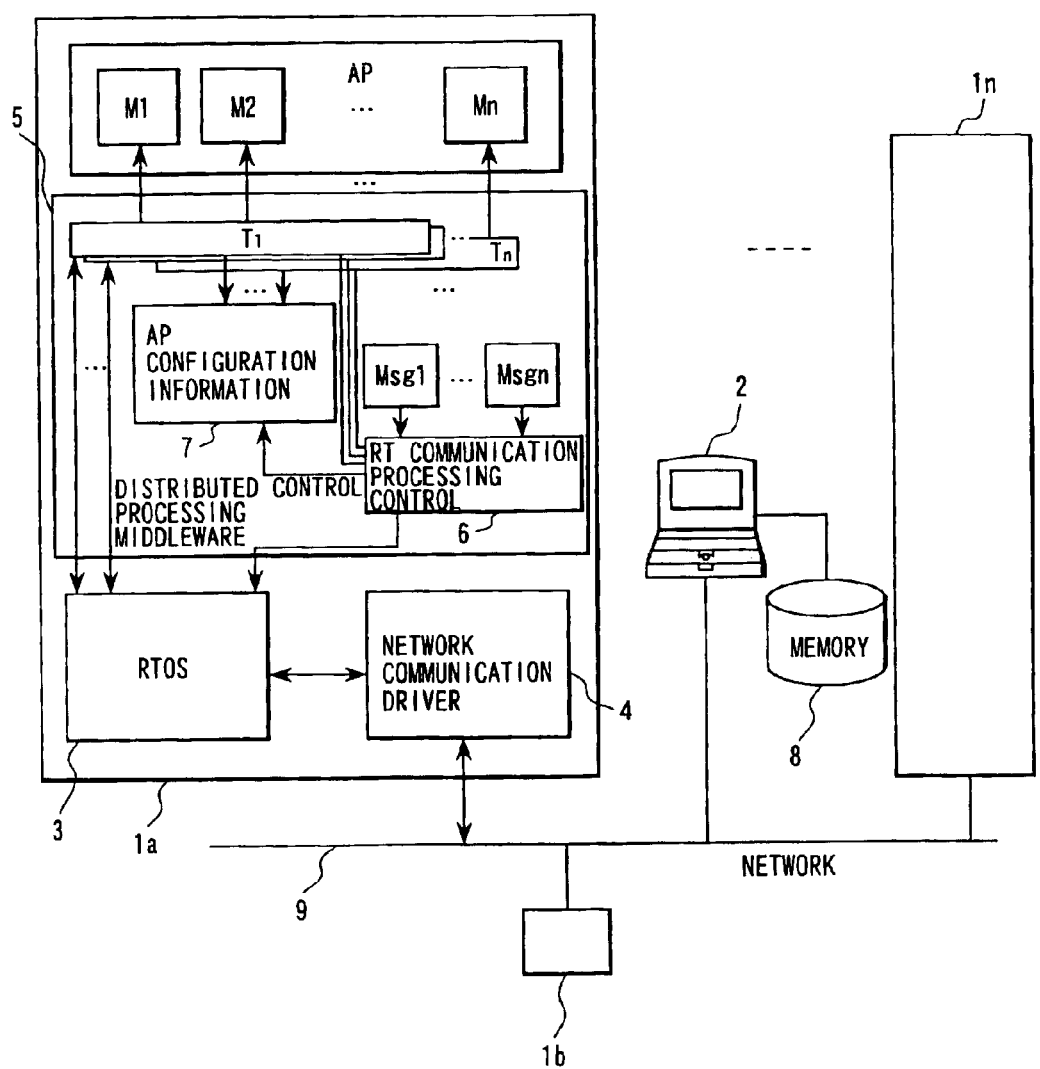
FIG. 1 is a diagram showing the configuration of an embodiment of a unit in accordance with the present invention.

An embodiment in accordance with the present invention will be described below, referring to the accompanied drawings.

Initially, the basic configuration of an embodiment of a distributed control system in accordance with the present invention will be described, referring to FIG. 1.

The distributed control system is constructed by connecting a plurality of control units $1a, \ldots, n$ having a CPU, a memory and so on to a network. In each of the control units contains application modules (hereinafter, referred to as AP modules) M1, M2, . . . , Mn cooperatively operated by mutual message communication, a distributed control processing middleware 5 for providing communication services between the AP modules, a real-time operating system (hereinafter, referred to as RTOS) 3 for executing task control and the like, and a network communication processing driver 4 for controlling data transfer on the network. Therein, services provided to the AP modules by the distributed control processing middleware 5 of each of the control units are (1) RT communication service performing sending and receiving message objects Msg1, Msg2, . . . , Msgn between the AP modules, and (2) a plurality of tasks T1, T2, . . . , Tn for starting an AP module allocated by AP configuration information 7. By these services, the AP modules distributed in the control units can perform cooperative operation by mutual message communication.

Both of the AP configuration information 7 and the message objects on the control units $1a, \ldots, 1n$ are offline or on-line transferred information of output information of an information processing system 2 using a memory medium or the like. By loading and executing a program stored in an external memory 8, the information processing system 2 automatically generates the AP configuration information 7 and the message objects based on user defined information of input information of the user.

EMBODIMENT 1

As Embodiment 1, description will be made on a case of adding and transferring units of the distributed control system shown in FIG. 1.

Initially, operation of the distributed control system shown in FIG. 1 will be described.

FIG. 2 shows the AP configuration information 7 which is composed of AP module configuration information 21 and message object configuration information 22.

AP modules $21a$ executed in the system and modules $21b$ executed next by the task after completion of executing the AP module 21a (sending and receiving processing of the AP module or the message object) are registered in the AP configuration information 21.

The example of the figure shows that the task is executed by executing AP module: M1 and then executing sending of message object: Msg1, and executing AP module: M2 and then executing AP module: M3. Although the next executed module after executing AP module: M3 is indicated as NULL, the indication NULL means that there is no module to be executed next, that is, it shows completion of the task. Further, after executing AP module: M4, sending of message object: Msg3 is executed next.

In the message object configuration information 22, message object names 22a in the system, communication processing priority 22b, internal/external communication 22c of a graph showing whether the communication processing is in-unit communication or inter-unit communication, kind of communication service 22d, next executed module 22e to be executed after executing the sending processing of the message object, and next executed module 22f to be executed after executing the receiving processing of a message object are registered. Therein, a communication processing priority is set only for inter-unit communication, and set as not setting yet (NULL) for in-unit communication.

There are two kinds of communication services, that is, synchronous communication and asynchronous communication.

(1) The synchronous communication is a communication service that in a case of message sending processing, sending processing of the message to the receiver side is executed immediately after executing the processing, and that in a case of message receiving processing, the processing is executed immediately after occurrence of message receiving event.

(2) The asynchronous communication is a communication service that in a case of message sending processing, there is no guarantee of immediately executing sending processing of the message to the receiver side after executing the processing. The sending processing of the message to the receiver side is basically executed by another task (Task B) different from the task (Task A) executing sending processing, that is, executed regardless of Task A. The asynchronous communication is a communication service that in a case of message receiving processing, the message receiving processing is executed in another event (cycle timer, sensor input or the like) regardless of the event of the message receiving.

In the example of the figure, the message Msg1 is of communication priority of NULL, unit-internal communication and synchronous communication service. Further, it shows that the task is executed by executing receiving processing of Msg1 after executing sending processing of Msg1, and that the task is executed by executing AP module: M2 after executing receiving processing of Msg1.

The message Msg2 is of communication priority of middle, unit-external communication and synchronous communication service. It shows that the task is executed by executing NULL, that is, finishing the task after executing sending processing of Msg2, and that the task is executed by executing AP module: M4 after executing receiving processing of Msg2.

On the other hand, the message Msg3 is of communication priority of low, unit-external communication and asynchronous communication service. It shows that the task is executed by executing AP module: M5 after executing sending processing of Msg3, and that the task is executed by executing NULL, that is, finishing the task after executing receiving processing of Msg3.

The AP module configuration information 21 and the message object configuration information 22 in the AP configuration information 7 are stored in a memory in the unit 1a as common data capable of being referred by each of the tasks T1, . . . , Tn.

Although the present embodiment shows an example that the AP module configuration information 21 and the message object configuration information 22 compose the AP configuration information 7, the both may be unified. It is also possible to divide the AP configuration information 7 into information in which the AP module configuration information and the message object configuration information are combined and the next executed module for each of the modules is registered and information of the message object configuration information 22 from which the next executed modules are deleted. Further, the information is not limited to the shape shown in FIG. 2, and it is possible, for example, to define a structure of configuration information basis of each module and to manage the structure using a pointer.

Figure 3:
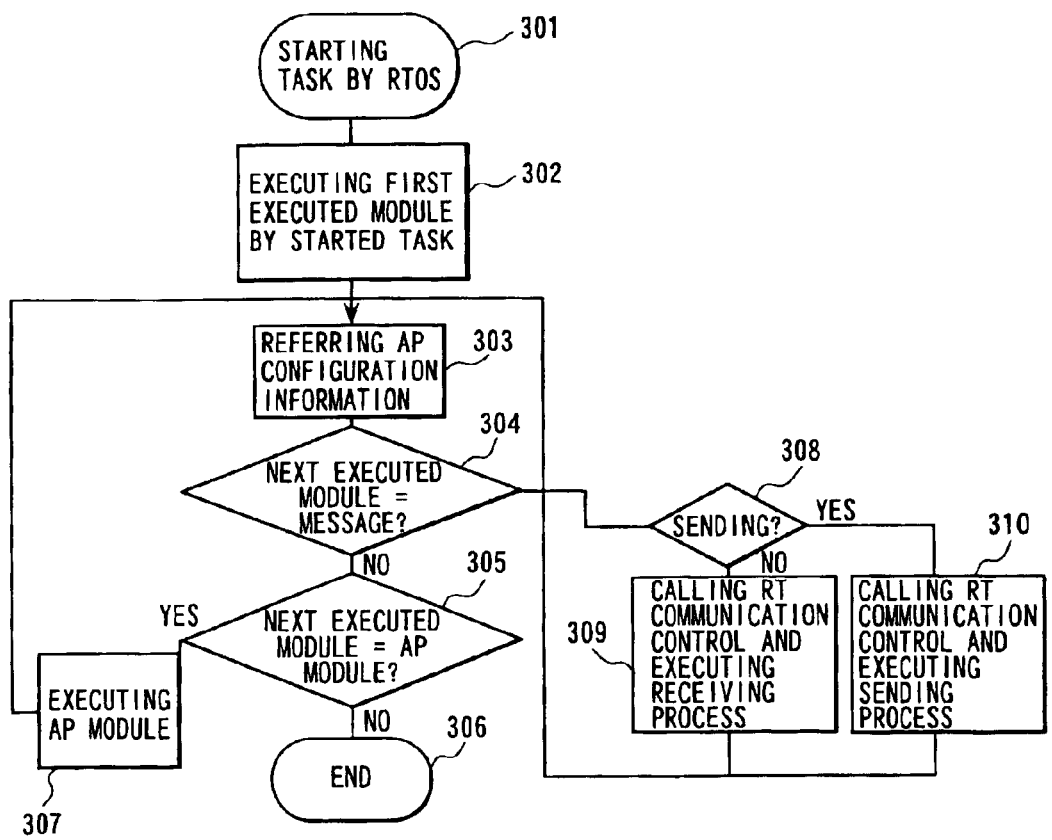
FIG. 3 is a flowchart showing operation of a task.

An example of basic operation of the present invention will be described below. In FIG. 1, the main operating parts are tasks T1 to Tn, and therefore the example of the operation of FIG. 1 will be described using a flowchart of FIG. 3 expressing the operation of the tasks.

In step 301, a task is started by RTOS 3. The started task executes a module to be executed first in step 302. (Details of the step 301 and the step 302 are to be described later using FIG. 4.)

After executing the module, a next executed module is retrieved by referring to the AP configuration information 7 in step 303.

It is checked whether or not the next executed module is a message object in step 304. If not message object, it is checked whether or not the next executed module is an AP module in step 305. If not AP module, the processing of the task is completed because the task completes all the modules to be executed.

If the next executed module is an AP module in step 305, the AP module is executed in step 307. After completion of the execution, the processing is returned to step 303 to repeat processing referring to the AP configuration information 7.

If the next executed module is a message object in step 304, it is checked whether the communication processing is sending processing or receiving processing in step 308. If receiving processing, the receiving processing is executed by calling the RT communication processing control 6 in step 309. If sending processing, the sending processing is executed by calling the RT communication processing control 6 in step 310.

When the communication processing in step 308 or 310 is completed, the processing is returned to step 303 to repeat the processing by referring to the AP configuration information 7.

The communication service of the message object registered in the AP configuration information 7 is described in the RT communication processing control 6, and the task calls the RT communication processing control 6 and executes inter-unit communication through the RTOS and the network communication driver 4 according to the processing described there.

The RT communication processing control 6 executes the communication processing by referring to the AP configuration information 7 (more strictly, the message object configuration information 22) on communication processing priority of the message object to be communicated, in-unit communication or inter-unit communication and communication service. The RT communication processing control 6 can be realized by the OSEK-COM communication library described, for example, in the reference "OSEK/VDX Communication Version 2.0a".

Figure 4:
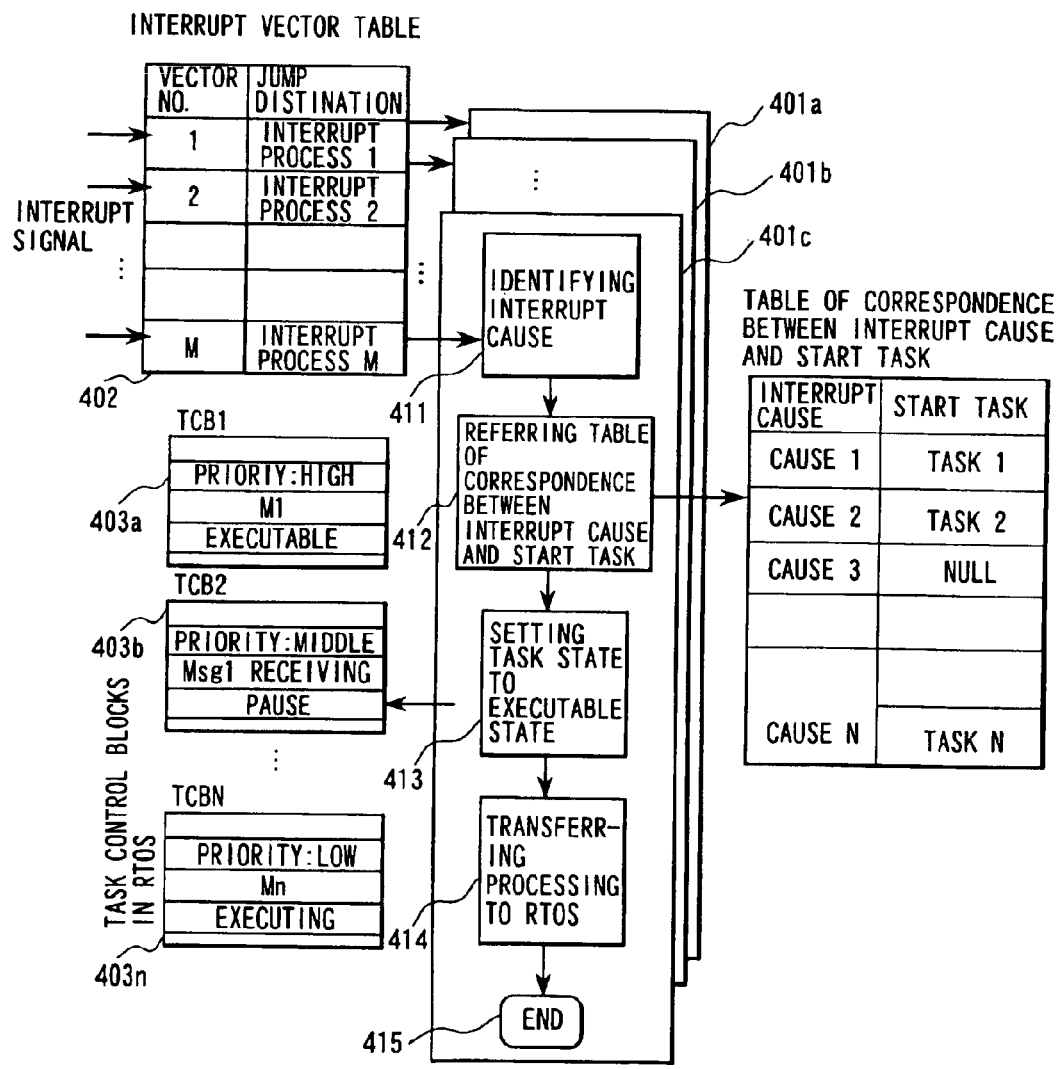
FIG. 4 is a diagram showing a flow of operation of interruption processing.

The task is started by RTOS 3, as shown in FIG. 4.

FIG. 4 is a diagram showing the operating flow of an interrupting processing.

In the diagram, the reference characters 401a to 401m indicate the interrupting processing. The interrupting processing 401m is composed of processing 411 to processing 415. The other interrupting processing is also composed similarly. The reference character 102 indicates an interrupt vector table. The reference characters 403a to 403n indicate task control blocks (hereinafter, referred to as TCB) in the RTOS. In the TCB, task executing priority, information on module to be executed first after starting, task status and so on are stored. The reference character 404 indicates a table of correspondence between interrupt cause and start task.

Operation of the interrupt processing is as follows. With input of an interrupt signal, the microprocessor stops processing in progress and stores the result in progress, and starts interrupt processing corresponding to an interrupt cause (=vector number) referring to the interrupt vector table 402. For example, in a case where the interrupt processing started by an interrupt cause of vector number M is an interrupt processing of 401m, initially the interrupt cause is specified in step 411. In detail, in a case of an interrupt from the communication LSI, it is specified by referring to the control register of the communication LSI which the interrupt cause is, completion of sending, message receiving from outside or occurrence of error. Therein, it is assumed that the interrupt cause is cause 2, a started task is found by referring to the table of correspondence between interrupt cause and start task 404 in step 422. The start task of the cause 2 in the table 404 is task T2, and in step 413 the task status is set to executable by referring to TCB 2 (403b) of task T2.

Then, the processing is transferred to the RTOS 3 in step 414, and the interrupt processing is completed (step 415).

On the other hand, the RTOS 3 starts a task of the highest priority among the tasks in the executable status to execute a module to be executed first. A means for starting a task of the highest priority among a plurality of tasks in the executable status can be realized in the RTOS by a standard task scheduler composed of a plurality of scheduling queues provided for each of priorities.

For example, in a case where the task T2 is started in FIG. 4, the module to be executed first is "Msg2 receiving" by referring to the TCB2 (403b). The operation of the task after that becomes as follows, as explained by FIG. 2.

(1) By referring to the message object configuration information 22, after executing receiving processing of message object name: Msg2, AP module: M4 is executed next.
(2) By referring to the AP module configuration information 21, after executing AP module: M4, sending of message object: Msg3 is executed next.
(3) By referring to the message object configuration information 22, after executing sending processing of message object name: Msg3, AP module: M5 is executed next.
(4) By referring to the AP module configuration information 21, after executing AP module: M5, NULL is executed next, that is, it is indicated that the operation of the task is completed.

Summary of the operation of the task is as follows:
Msg2 receiving→M4→Msg3 sending→M5→completion.

An example of task operation referring to the AP configuration information 7 will be described below. Initially, assuming that a task T in a unit executes AP module: M1 first, by tracing the next executed modules of FIG. 2, executing order of the module becomes as follows:
M1→Msg1 receiving→Msg1 sending→M2→M3→completion.

Assuming that a task B in another unit executes Msg2 receiving first, by tracing the next executed modules of FIG. 2, executing order of the module becomes as follows:
Msg2 receiving→M4→Msg3 sending→M5→completion.

As described above, task operation starts only functions (=module) such as main functions of C language composed of only function call, and becomes a frame work of execution of AP processing such as execution of module executing order control.

Although the task calls and executes the AP module, the AP module does not call and execute the task or the OS service, and the API between the AP and the task becomes the AP module. This is contrary to the conventional technology in which API is OS service or library.

In the present embodiment, the AP configuration information 7 in each unit of FIG. 1 holds all the information shown in FIG. 2, that is, the information is the same information common among the units. Otherwise, it is easily realized that each of the units holds only own information used by the unit, that is, information in regard to modules (AP modules or message objects) in the unit.

In the present embodiment, the message object are handled as the modules other than AP modules executed by the tasks T1 to Tn. However, in regard to other input and output objects other than message, for example, specific sensor objects, actuator objects, executing control of various kinds of input and output objects can be executed similarly to the executing control of message object by storing input and output objects corresponding to the message objects Msg1~Msgn, input and output object control modules corresponding to the RT communication processing control 6 and input and output configuration information into the AP configuration information 7.

The tasks T1~Tn are handled as tasks in the present embodiment but may be handled as functions inside the RTOS 3. In this case, the task switching overhead is decreased, but size of the RTOS 3 becomes large and the portability becomes worse.

In the present embodiment, the RT communication processing control 6 is a software module called by the message objects Msg1~Msgn, and executed by the tasks T1~Tn. However, the RT communication processing control 6 may be another independent task, and the RT communication processing control 6 may be a function inside the RTOS 3. In a case where the RT communication processing control 6 is a task, parallel processing with the tasks T1~Tn can be flexibly performed, but the task switching overhead is increased. In a case where the RT communication processing control 6 is a function inside the RTOS 3, the task switching overhead is decreased, but size of the RTOS 3 becomes large and the portability becomes worse.

Although the RT communication processing control 6 does not directly control the network communication processing driver 4 in the present embodiment, the RT communication processing control 6 may directly control the network communication processing driver 4. In this case, the overhead becomes smaller by the amount not passing through the RTOS 3. On the other hand, description of the program in the RT communication processing control 6 becomes complex because exclusive control processing of the common resources must be performed when the RT communication processing control 6 executes the network communication processing driver 4.

An example of system change by changing the AP configuration information will be described in detail below.

(1) Basic Configuration

Figure 5:
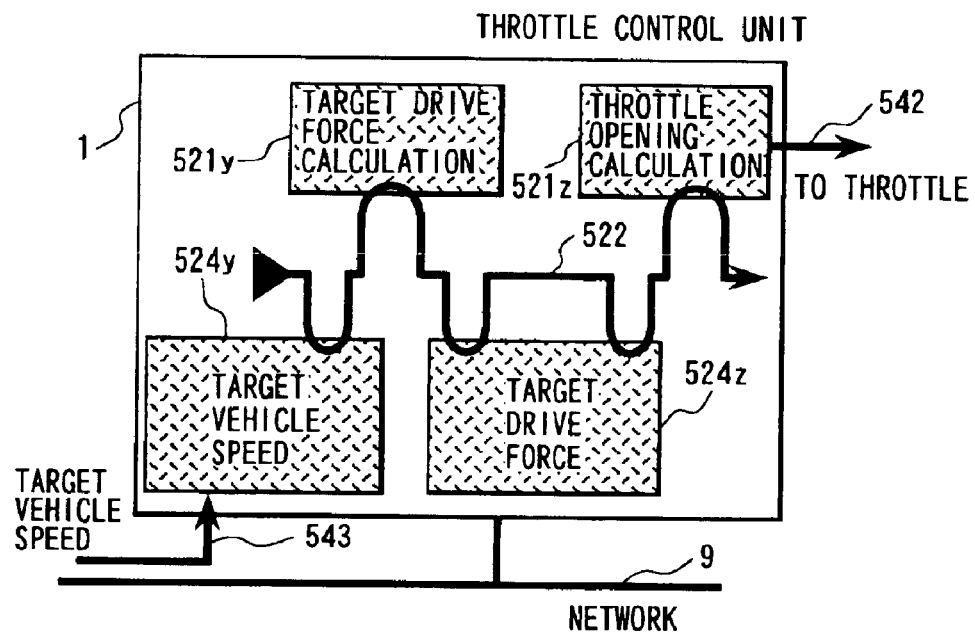
FIG. 5 is a block diagram showing operation of a task in a throttle control unit.

FIG. 5 shows operation of tasks in a throttle control unit used for automatic cruising control of a vehicle.

Referring to FIG. 5, a unit 1 is connected to a network 9. The unit 1 is composed of a target drive force calculation 521y and a throttle opening calculation 521z of AP modules and a target vehicle speed 524y and a target drive force 524z of message objects. The unit 1 receives information 543 of the target vehicle speed through the network 9. The unit 1 outputs a throttle opening from a unit output 542.

Operation of the task A (522) of FIG. 5 is set by parameters shown in FIG. 6 (*a*) to (*d*).

FIG. 6 (*a*) shows a table of correspondence between interrupt cause-start task in the unit 1 of the throttle control unit. This table of correspondence expresses that the task A 522 is periodically started by 30 ms timer.

FIG. 6 (*b*) shows a TBC (task control block). It is shown that the task executing priority is high, and the module executed first after starting is receiving of the target vehicle speed 524y.

FIG. 6 (*c*) shows an AP module configuration information. It is shown that after executing AP module: target drive force calculation 521y, sending processing of message object: target drive force 524z is executed, and the task is completed after executing AP module: throttle opening calculation 521z.

FIG. 6(*d*) shows a message object configuration information. The communication of message object: target vehicle speed 524y is of middle in the communication priority, inter-unit communication and asynchronous communication service. It is shown that after the task executes sending processing of the target vehicle speed 524y the task is completed, and after the task executes receiving processing of target vehicle speed, the task executes AP module: target drive force calculation 521y. On the other hand, the communication of message object: target drive force 524z is of NULL in the communication priority, in-unit communication and synchronous communication service. It is shown that the task executes receiving processing of the target dive force 524z after sending processing of the target drive force 524z, and after the task executes receiving processing of the target drive force 524z, the task executes AP module: throttle opening calculation 521z.

From the above parameter values of FIG. 6, the operation of the task A 522 is periodically started by the 30 ms timer, and the order of module execution is as follows:

Receiving of target vehicle speed 524y→target drive force calculation 521y→sending of target drive force 524z →receiving of target drive force 524z→executing of throttle opening calculation 521z→completion of the task.

(2) Function Distribution

Figure 7:
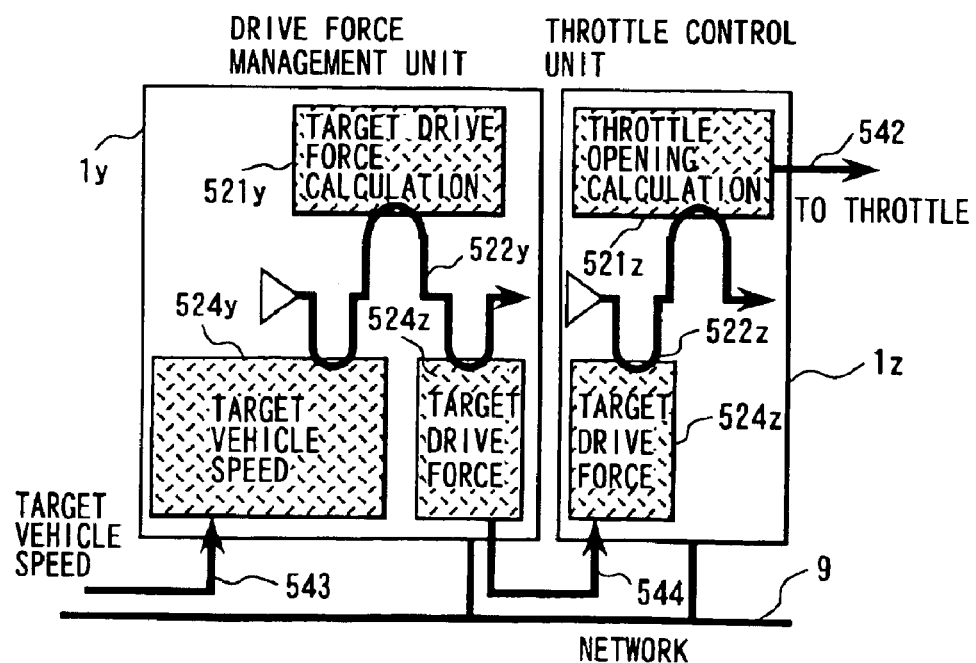
FIG. 7 is a block diagram showing operation of a task in which the functions are distributed.

FIG. 7 shows operation of the task in a case where the function of the throttle control unit of FIG. 5 is distributed into two units.

Referring to FIG. 7, units 1y and 1z are connected to the network 9. The unit 1y is composed of the target drive force calculation 521y of AP module and the target vehicle speed 524y and a target drive force 524z1 of message objects. The unit ly receives information 543 of a target vehicle speed through the network 9. The unit 1y sends information 544 of a target drive force to the network 9. The reference character 522y is a task A in the unit 1y. The unit 1z is composed of the throttle opening calculation 521z of AP module and a target drive force 524z2 of message object. The unit 1z receives the information 544 of target drive force through the network 9. The unit 1z outputs a throttle opening from a unit output 542. The reference character 522z is a task B in the unit 1z.

The task A 522y and the task B 522z of FIG. 7 are set by parameters shown in FIG. 8 (*a*) to (*d*).

FIG. 8 (*a*) shows tables of correspondence between interrupt cause-start task in a drive force management unit 1y and a throttle control unit 1z, respectively. The tables of correspondence expresses that the task A 522 and the task B 522z are periodically started by a 30 ms timer and receiving an event of the target drive force 524z2, respectively.

FIG. 8 (*b*) shows TBCs (task control blocks) of the task A and the task B. It is shown that the both task executing priorities of the task A and the task B are high, and the module executed first after starting for the task A is receiving of the target vehicle speed 524y and the module executed first after starting for the task B is receiving of the target drive force 524z2.

FIG. 8 (*c*) shows an AP module configuration information. It is shown that after executing AP module: target drive force calculation 521y, sending processing of message object: target drive force 524z1 is executed, and the task is completed after executing AP module: throttle opening calculation 521z.

FIG. 8 (*d*) shows message object configuration information. The communication of message object: target vehicle speed 524y is of middle in the communication priority, inter-unit communication and asynchronous communication service. It is shown that after the task executes sending processing of the target vehicle speed 524y the task is completed, and after the task executes receiving processing of target vehicle speed 524y, the task executes AP module: target drive force calculation 521y. On the other hand, the communication of message object: target drive force 524z1, 524z2 (the both are the same object, and the configuration information is common between the both) is high in the communication priority, of inter-unit communication and synchronous communication service. It is shown that after the task executes sending processing of the target drive force, the task is completed, and after the task executes receiving processing of the target drive force, the task executes AP module: throttle opening calculation 521z.

From the above parameter values of FIG. 8, the operation of the task A 522y is periodically started by the 30 ms timer, and the order of module execution is as follows:

receiving of target vehicle speed 524y→target drive force calculation 521y→sending of the target drive force →completion of the task.

The operation of the task B 522z is started by the receiving event of the target drive force, and the order of module execution is as follows:

receiving of the target drive force→executing the throttle opening calculation 521z→completion of the task.

Therefore, when the system configuration is changed from (1) to (2), it is possible to cope with the change only by the following parameter change.

Newly registering of the task B 522z of the table of correspondence between interrupt cause and start task in the throttle control unit 1z.

Newly registering of the TCB (task control block) of the task B 522z.

Change of the AP configuration information on three points, that is, the communication processing priority of message object: target drive force, internal/external communication and next executed module at sending.

(3) New Function

Figure 9:
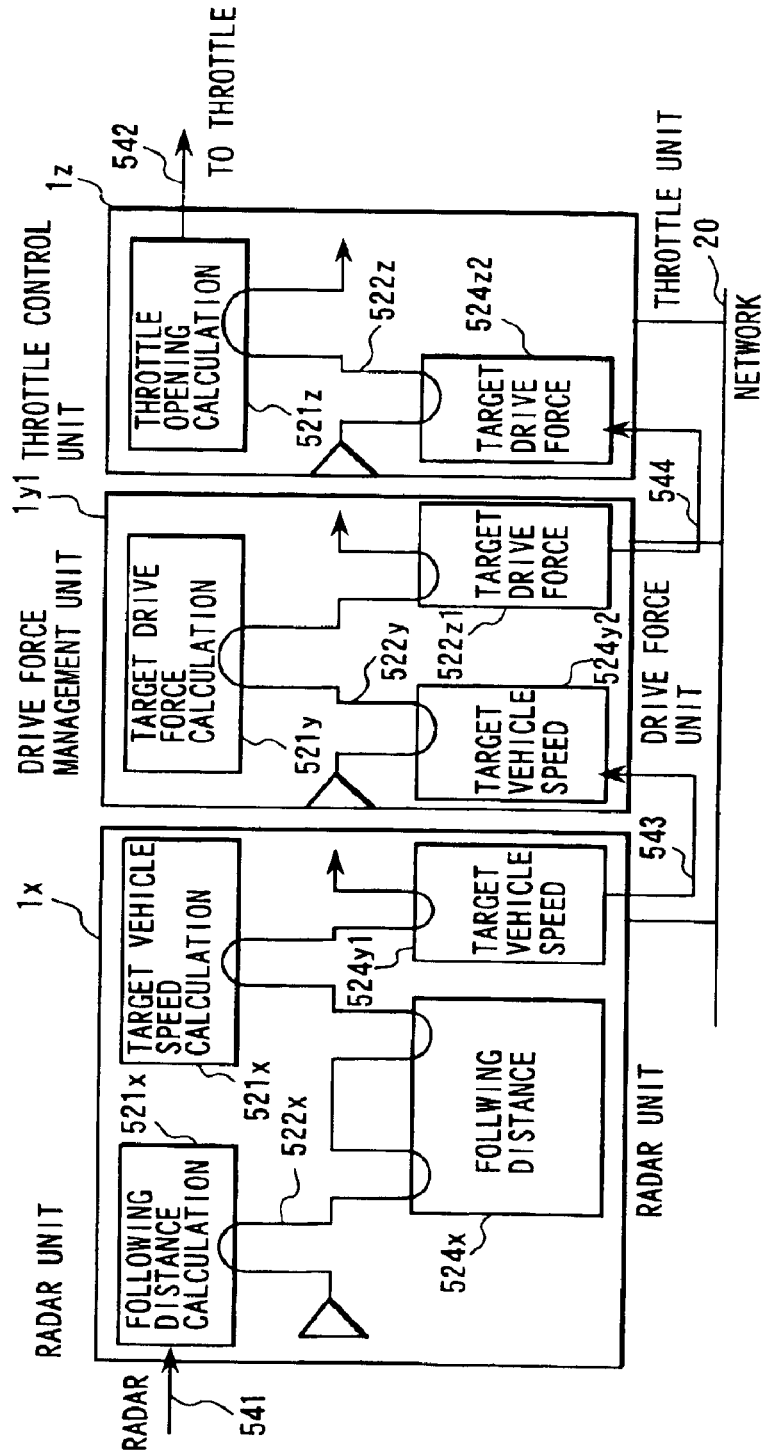

FIG. 9 shows operation of the task in a case where a radar unit is newly added to the system configuration of FIG. 7.

Referring to FIG. 9, units $1x$, $1y$ and $1z$ are connected to the network 9. The unit $1x$ is composed of a following distance calculation 521$w$ and a target vehicle speed calculation 521$x$ of AP modules and a following distance 524$x$ and a target vehicle speed 524$y$1. The unit $1x$ receives radar information from a unit input 541. The unit $1x$ sends information of target vehicle speed 545 to the network 9. The reference character 522$x$ is a task C in the unit $1x$. The unit $1y$ is composed of the target drive force calculation 521$y$ of AP module and the target vehicle speed 524$y$2 and the target drive force 524$z$1 of message objects. The unit $1y$ receives information 543 of a target vehicle speed through the network 9. The unit $1y$ sends information 544 of a target drive force to the network 9. The reference character 522$y$ is a task A in the unit $1y$. The unit $1z$ is composed of the throttle opening calculation 521$z$ of AP module and a target drive force 524$z$2 of message object. The unit $1z$ receives the information 544 of target drive force through the network 9. The unit $1z$ outputs a throttle opening from a unit output 542. The reference character 522$z$ is a task B in the unit $1z$.

Operations of the task A 522$y$, the task B 522$z$ and the task C 522$x$ of FIG. 9 are set by parameters shown in FIG. 10 to FIG. 13.

FIG. 10 shows tables of correspondence between interrupt cause-start task in the drive force management unit 1$y$, the throttle control unit 1$z$ and a radar unit 1$x$, respectively. It is shown by the figure that the task A 522$y$, the task B 522$z$ and the task C 522$x$ are started by receiving an event of target vehicle speed 524$y$2, receiving an event of the target drive force 524$z$2 and periodically started by a 30 ms timer, respectively.

FIG. 11 shows TBCs (task control blocks) of the task A, the task B and the task C. It is shown that all the task executing priorities of the task A, the task B and the task C are high, and the module executed first after starting for the task A is receiving of the target vehicle speed 524$y$2, the module executed first after starting for the task B is receiving of the target drive force 524$z$2 and the module executed first after starting for the task C is receiving of the following distance calculation 521$w$.

FIG. 12 shows AP module configuration information. It is shown that after executing AP module: target drive force calculation 521$y$, sending processing of message object: target drive force 524$z$1 is executed, and the task is completed after executing AP module: throttle opening calculation 521$z$, and after executing the following distance calculation 521$w$ sending processing of message object: following distance 524$x$ is executed, and after executing the target vehicle speed calculation 521$x$ sending processing of message object: target vehicle speed 524$y$1 is executed.

FIG. 13 shows message object configuration information. The communication of message object: target vehicle speed 524$y$1, 524$y$2 (the both are the same object, and the configuration information is common between the both) is middle in the communication priority, of inter-unit communication and synchronous communication service. It is shown that after the task executes sending processing of the target vehicle speed the task is completed, and after the task executes receiving processing of target vehicle speed, the task executes AP module: target drive force calculation 521$y$. On the other hand, the communication of message object: target drive force 524$z$1, 524$z$2 (the both are the same object, and the configuration information is common between the both) is high in the communication priority, of inter-unit communication and synchronous communication service. It is shown that after the task executes sending processing of the target drive force, the task is completed, and after the task executes receiving processing of the target drive force, the task executes AP module: throttle opening calculation 521$z$. Further, the communication of message object: following distance 524$x$ is of NULL in the communication priority, inter-unit communication and synchronous communication service. It is shown that after the task executes sending processing of the following distance, receiving processing of message object: following distance is executed, and after the task executes receiving processing of the following distance, AP module: target vehicle speed calculation 521$x$ is executed.

From the above parameter values of FIG. 10 to FIG. 13, the operation of the task A 522$y$ is started by the receiving event of the target vehicle speed, and the order of module execution is as follows:

receiving of target vehicle speed→target drive force calculation 521$y$→sending of the target drive force →completion of the task.

The operation of the task B 522$z$ is started by the receiving event of the target drive force, and the order of module execution is as follows:

receiving of the target drive force→executing the throttle opening calculation 521$z$ →completion of the task.

The operation of the task C 522$x$ is periodically started by the 30 ms timer, and the order of module execution is as follows:

following distance calculation 521$w$→sending of the following distance→receiving of a following distance target vehicle speed calculation 521$x$→sending of the target vehicle speed→completion of the task.

Therefore, when the system configuration is changed from (2) to (3), it is possible to cope with the change only by the following parameter change.

Change of the table of correspondence between interrupt cause and start task of the drive force management unit 1$y$1.

Newly registering of the task C 522$x$ of the table of correspondence between interrupt cause and start task in the radar unit 1$x$.

Newly registering of the TCB (task control block) of the task C 522$x$.

Changes of the AP configuration information are AP module: newly registering of following distance calculation 521$w$ and target vehicle speed calculation 521$x$, message object: kind of communication service of the target vehicle speed and newly registering of message object: following distance.

(4) Function Transfer

Figure 14:
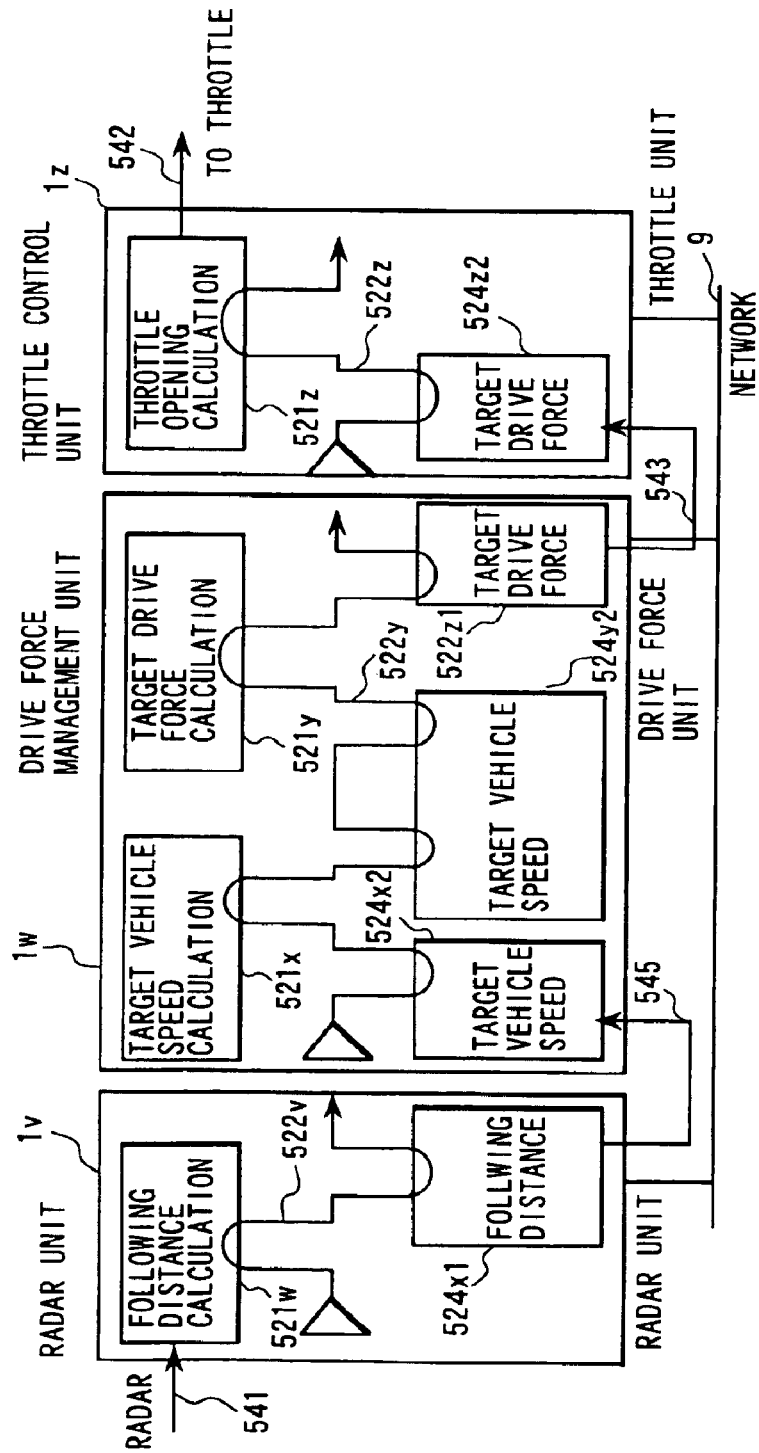
FIG. 14 is a diagram showing operation of a task when a module is transferred from one unit to another unit.

FIG. 14 shows operation of the task in a case where a module is transferred from one unit to the other unit in the system configuration of FIG. 9.

Referring to FIG. 14, units $1v$, $1w$ and $1z$ are connected to the network 9. The unit $1v$ is composed of a following distance calculation 521$w$ of AP module and a following distance 524$x$1 of message object. The unit $1v$ receives radar information from a unit input 541. The unit $1v$ sends information of target vehicle speed 545 to the network 9. The reference character 522$v$ is a task C in the unit $1v$. The unit $1w$ is composed of the target vehicle speed calculation 521× and the target vehicle speed 524$y$ of AP modules and the target drive force 524$z$1 of message objects. The unit $1w$ receives information 543 of a target vehicle speed through the network 9. The unit $1w$ sends information 544 of a target drive force to the network 9. The reference character 522w is a task A in the unit 1w. The unit 1z is composed of the throttle opening calculation 521z of AP module and a target drive force 524z2 of message object. The unit 1z receives the information 544 of a target drive force through the network 9. The unit 1z outputs a throttle opening from a unit output 542. The reference character 522z is a task B in the unit 1z.

Operations of the task A 522w, the task B 522z and the task C 522v of FIG. 14 are set by parameters shown in FIG. 15 to FIG. 18.

FIG. 15 shows tables of correspondence between interrupt cause-start task in the drive force management unit 1w, the throttle control unit 1z and a radar unit 1v, respectively. It is shown by the figure that the task A 522w, the task B 522z and the task C 522v are started by receiving an event of the following distance 524x2, receiving an event of the target drive force 524z2 and periodically started by a 30 ms timer, respectively.

FIG. 16 shows TBCs (task control blocks) of the task A, the task B and the task C. It is shown that all the task executing priorities of the task A, the task B and the task C are high, and the module executed first after starting for the task A is receiving of the following distance 524x2, the module executed first after starting for the task B is receiving of the target drive force 524z2 and the module executed first after starting for the task C is receiving of the following distance calculation 521w.

FIG. 17 shows AP module configuration information. It is shown that after executing AP module: target drive force calculation 521y, sending processing of message object: target drive force 524z1 is executed, and the task is completed after executing AP module: throttle opening calculation 521z, and after executing the following distance calculation 521w sending processing of message object: following distance 524x is executed, and after executing the target vehicle speed calculation 521x sending processing of message object: target vehicle speed 524y1 is executed. FIG. 17 is the same as FIG. 12.

FIG. 18 shows message object configuration information. The communication of message object: target vehicle speed 524y1, 524y is of NULL in the communication priority, in-unit communication and synchronous communication service. It is shown that after the task executes sending processing of the target vehicle speed, receiving processing of message object: target vehicle speed is executed, and after the task executes receiving processing of the target vehicle speed, the task executes AP module: target drive force calculation 521y. On the other hand, the communication of message object: target drive force 524z1, 524z2 (the both are the same object, and the configuration information is common between the both) is high in the communication priority, inter-unit communication and synchronous communication service. It is shown that after the task executes sending processing of the target drive force, the task is completed, and after the task executes receiving processing of the target drive force, the task executes AP module: throttle opening calculation 521z. Further, the communication of message object: following distance 524x1, 524x (the both are the same object, and the configuration information is common between the both) is low in the communication priority, of inter-unit communication and synchronous communication service. It is shown that after the task executes sending processing of the following distance, receiving processing of message object: following distance is executed, and after the task executes receiving processing of the following distance, AP module: target vehicle speed calculation 521x is executed.

From the above parameter values of FIG. 15 to FIG. 18, the operation of the task A 522w is started by the receiving event of the target vehicle speed, and the order of module execution is as follows:

receiving of a following distance→target vehicle speed calculation 521x→sending of the target vehicle speed→target drive force calculation 521y →sending of the target drive force→completion of the task.

The operation of the task B 522z is started by the receiving event of the target drive force, and the order of module execution is as follows:

receiving of the target drive force→executing the throttle opening calculation 521z →completion of the task.

The operation of the task C 522v is periodically started by the 30 ms timer, and the order of module execution is as follows:

following distance calculation 521w →sending of the following distance→completion of the task.

Therefore, when the system configuration is changed from (3) to (4), it is possible to cope with the change only by the following parameter change.

Change of the table of correspondence between interrupt cause and start task of the drive force management unit 1y1.

Change of module to be executed first after starting of the TCB (task control block) of the task A 522w.

In regard to changes of the AP configuration information, the AP module configuration information is no change, and message object: target vehicle speed, communication processing priority of following distance, internal/external communication, next executed module at sending are changed.

As described above, the tasks can cope with an arbitrary system configuration by changing the AP configuration information (the AP module configuration information, the message object configuration information), and the start task information in the table of correspondence between interrupt cause and start task, the task executing priority information in the task control block and the information of module to be executed first after starting. Since a volume of software change incident to change in the system configuration can be suppressed to minimum as described above, labor for matching the application to the new system can be reduced and productivity of software can be improved.

Further, since the order of executing the AP modules, the order of executing the communication processing and the communication processing priority of the message object can be changed and the AP and the communication processing can be operated asynchronously or synchronously by changing the information, the worst executing time of sensor inputting to actuator outputting including the communication processing through the network can be shortened.

A setting system of the AP configuration information 7 will be described below. The AP configuration information on the units is stored in the memory 8 of FIG. 1, and at booting the system, AP configuration information (the table of correspondence between interrupt cause and start task 104, the task control block 103a to 103n in FIG. 4) in connection with a unit which needs to rewrite its AP configuration information is sent from the information processing system 2 and the memory 8 to the unit by dividing the information into a plurality of buckets through the network. The unit in the receiving side has an initializing processing portion, and the initializing processing portion receives the buckets transmitted through the network communication driver 14 and stores them into the AP configuration information 7 one by one.

Although it is described above only the case where the AP configuration information is stored in the memory 8 and the information is stored in the AP configuration information 7 in the unit by the information processing system 2, the table of correspondence between interrupt cause and start task 104, the task control block 103a to 103n in FIG. 4 in addition to the AP configuration information may be also stored in the memory 8 and the information may be transmitted and stored in the AP configuration information 7 in the unit by the information processing system 2.

Since operation of tasks in a unit can be changed by the present system even after the unit is already mounted in the system, it is unnecessary to take off the unit from the system even if change of the system configuration such as addition of a new unit is made.

Although it is described in the embodiment here that setting of the AP configuration information is performed through the network, setting of the AP configuration information may be performed through a serial cable such as RS232 instead of the network. In this case, serial cable driver software is necessary in the unit 1a1, and the initialization processing portion uses the serial cable driver software instead of the network communication processing driver 14.

Further, the AP configuration information may be set by directly writing the information in a memory area of the AP configuration information 7 using a ROM writer.

Figure 19:
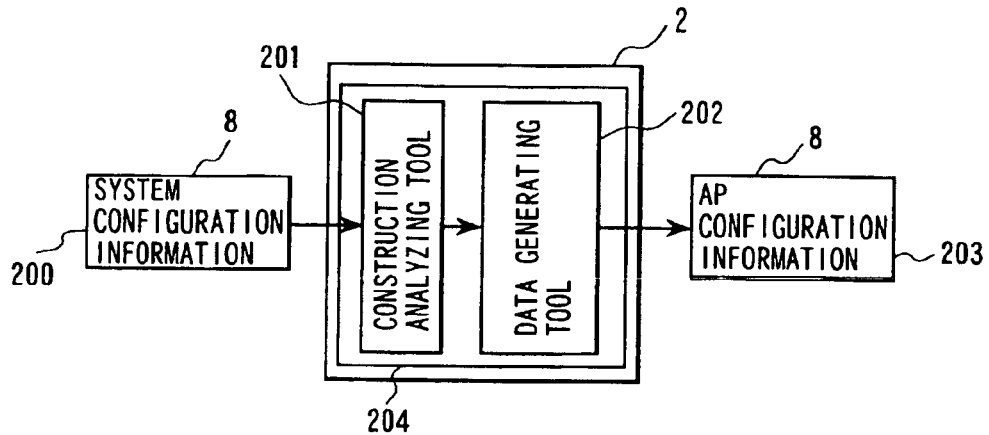
FIG. 19 is a block diagram showing the configuration of an AP configuration generating tool.

FIG. 19 is a configuration diagram of the process of generating the AP configuration information.

Referring to the figure, system configuration information 200 is input information of the tool, and the reference character 204 indicates an AP configuration information generating tool 204, and an AP configuration information 203 is output information. The tool 204 is composed of two parts of a construction analyzing tool 201 and a data generating tool 202.

The system configuration information 200 is composed of task information, AP information and message information which are described below.

(1) System Information

Order of executing tasks of distributed control processing (execution of a plurality of tasks from input to output), name of task to be executed and data flow.

Worst executing time of distributed control processing.

Delayed time of processing due to common resource access competition with other tasks.

Executing delay time taken over from the precedent task.

End-to-end dead line until completion of distributed control processing.

(2) Task Information

Order of executing module, name of module to be executed and data flow.

Priority of executing task.

Type of starting task (periodical timer starting or event starting).

Periodical time of task starting.

Periodical time (distributed control processing of periodical starting type).

Minimum period of event occurrence (distributed control processing of event driving type).

Worst response time of own task.

(3) AP Information

Pointer to all AP modules involved.

Number of information items input to each module, data type.

Number of information items output from each module, data type.

(4) Message Object Information

Pointer to all message objects involved.

Data type of each message object.

Kind of message (synchronous or asynchronous).

sending processing, time of time out until completion of receiving processing.

Upper limit of retry times of sending processing.

Communication error processing employed.

The construction analyzing tool 204 is a tool for extracting the AP configuration information from the system configuration information 200, and the construction analyzing tool 204 can be realized by a general construction analyzing tool. The data generating tool 202 is a tool for converting an output from the tool 201 into a format of the AP configuration information 203.

Since the tool eliminates manual work in preparing the AP configuration information 203, the software productivity can be improved.

Figure 20:
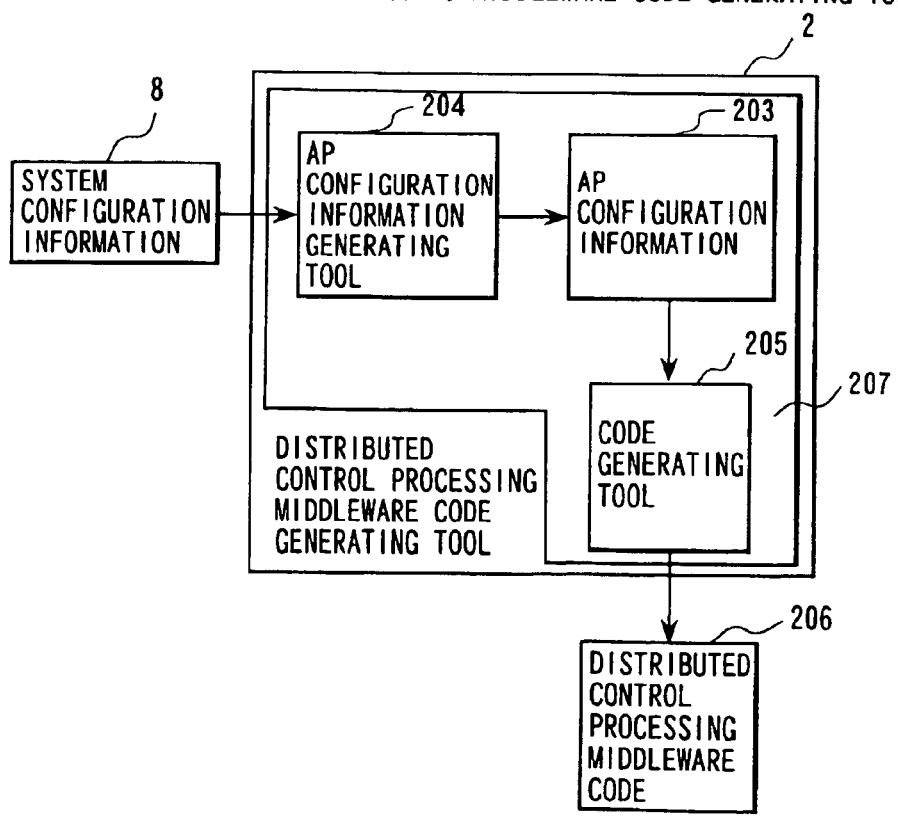
FIG. 20 is a block diagram showing the configuration of a distributed control processing middleware code generating tool.

FIG. 20 is a block diagram showing the configuration of a distributed control processing middleware code generating tool.

In the figure, the system configuration information 200 is input information of the tool, and the reference character 207 indicates the distributed control processing middleware code generating tool, and the reference character 206 indicates a distributed control processing middleware code. The tool 207 is composed of the AP configuration information generating tool 204, the AP configuration information 203 of middle data and a code generating tool 205. The code generating tool 205 generates task code from the tasks (T1 to Tn in FIG. 1) describing the operations in FIG. 3 and the AP configuration information 7 of reference data of the tasks. The generated code may be a source file of a high-level language, assembler code or an object file.

Since the code generated by the tool is smaller in size than the code for processing the AP configuration information referred by the task which has been described above, it is possible to save the memory and to reduce the overhead of executing time.

EMBODIMENT 2

Description will be made below on automatic generation of the information of which the control structure of each control unit is defined in the distributed control system shown in FIG. 1.

Figure 21:
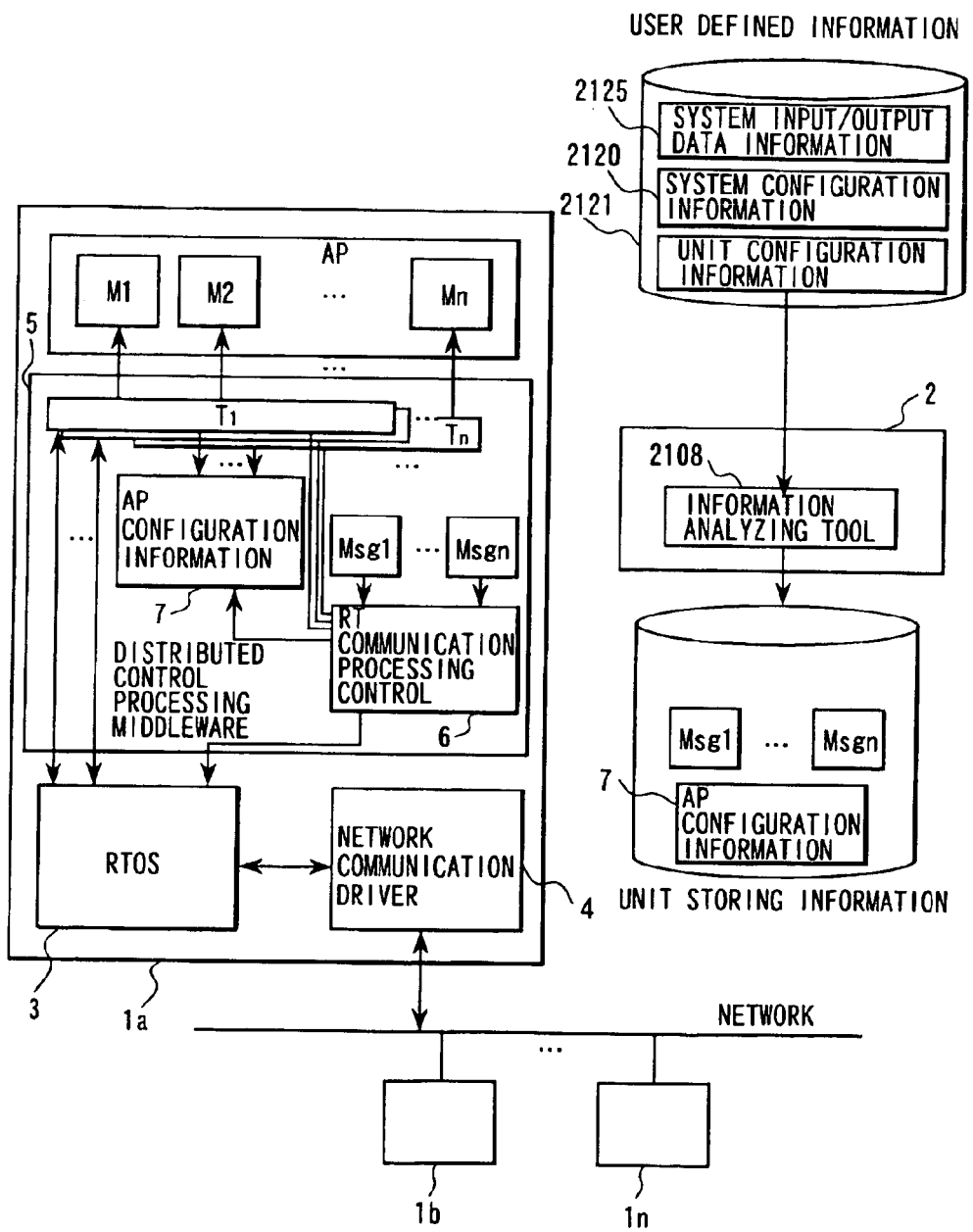
FIG. 21 is a block diagram showing the flow of processing of an information processing system.

FIG. 21 shows the flow of automatic generation by an information processing system 2. The information processing system 2 automatically generates the AP configuration information 7 and the message objects based on user defined information of input information from a user by loading and executing a program stored in an external memory 8, that is, an information analyzing tool 2108.

Before explaining details of the automatic generating processing, information ((1) user defined information, (2) AP configuration information, (3) message object) in connection with the processing will be described.

(1) User Defined Information

The user defined information includes three kinds of information, that is, system configuration information 2120, unit configuration information 2121 and system input/output data information 2125.

Figure 22:
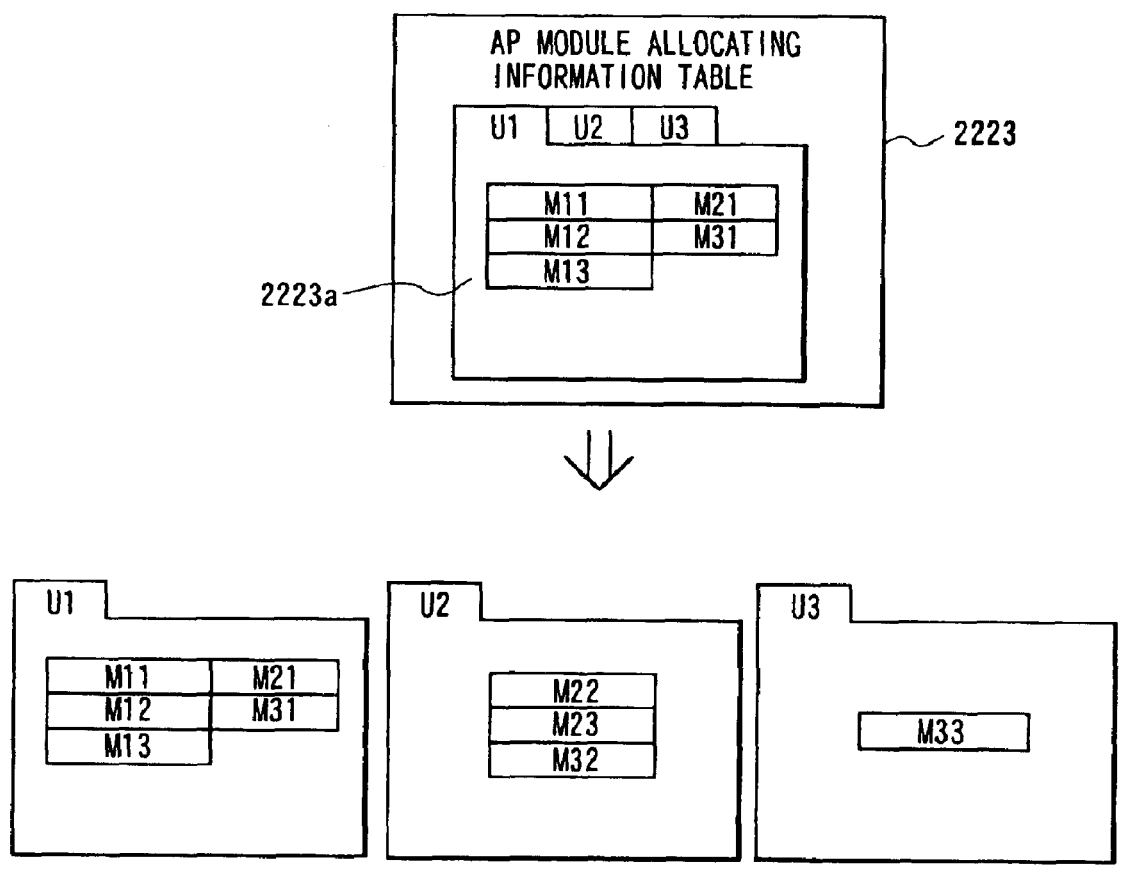
FIG. 22 is a figure showing an example of an AP module arranging information table contained in a unit configuration information.

In the unit configuration information 2121, an AP module allocating information table 2223 as shown in FIG. 22 is included. In the AP module allocating information table 2223, AP module allocating information for each control unit is registered on the unit-by-unit basis. In the AP module allocating information for each control unit, an AP module name 2223a allocated to the control unit is included.

In the AP module allocating information of the control unit 1a taken as an example here, two AP module names "M1" and "M2" allocated to the control unit 1a are included.

In the system input/output data information 2125, a system input/output data information table 2326 is included, as shown in FIG. 23. In the system input/output data information table 2326, an input data name and an output data name of the system are registered. In the system input/output data information table 2326 taken as an example here, input data names "D11", "D21", "D31" and output data names "D14", "D24", "D34" are registered.

Figure 25:
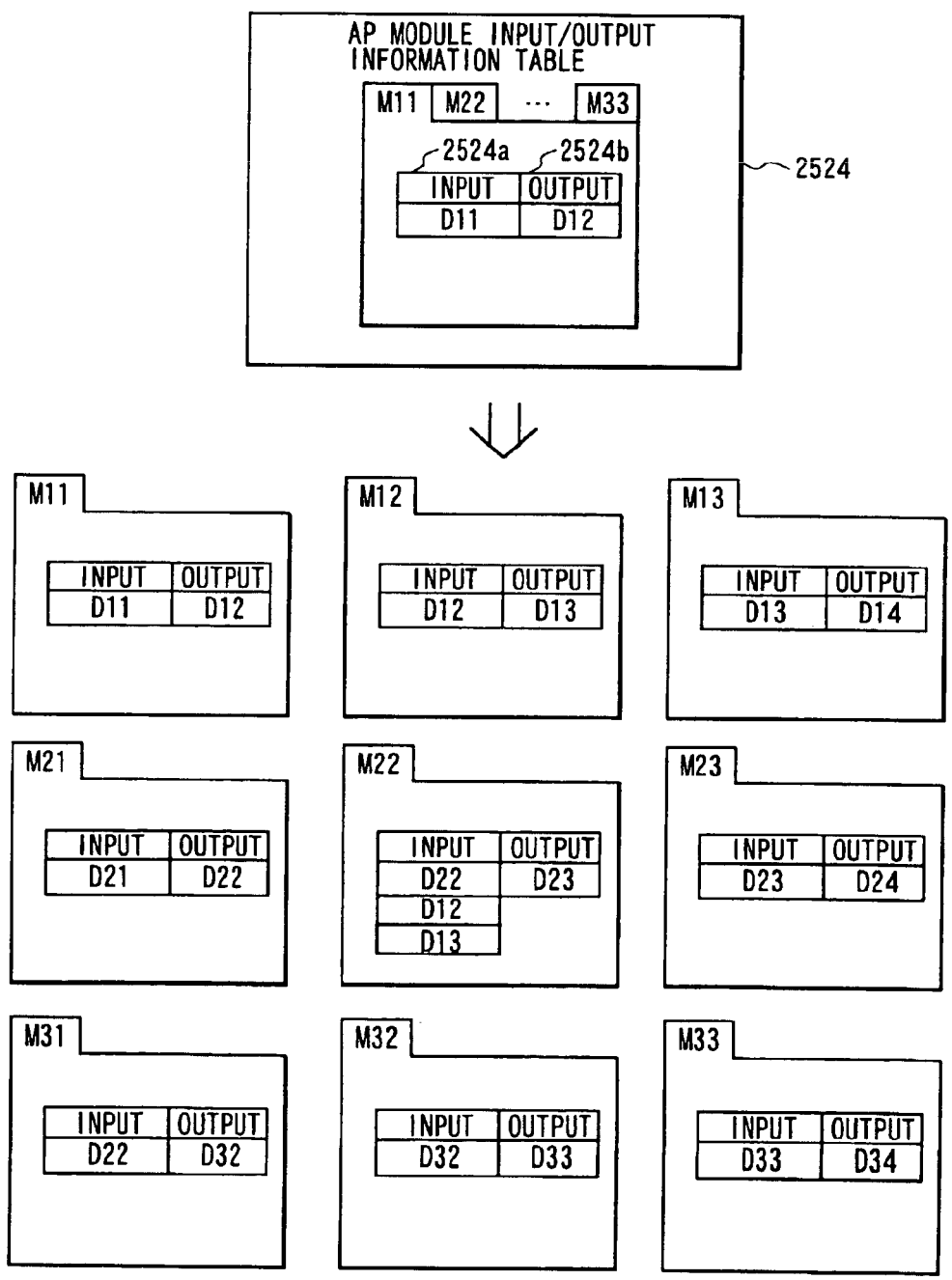
FIG. 25 is a figure showing an example of an AP module input/output information table contained in the system configuration information.
Figure 30:
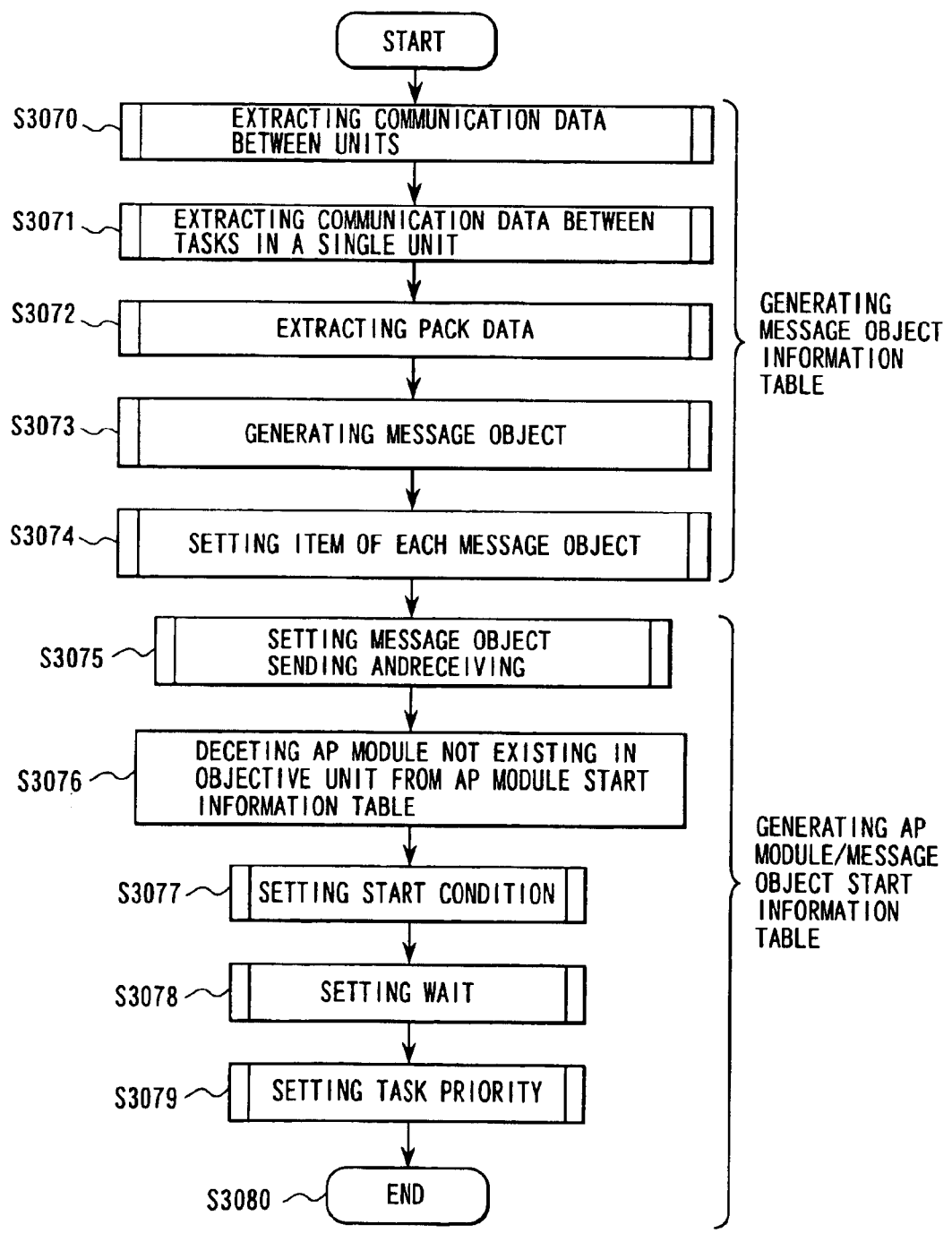
FIG. 30 is a flowchart showing the flow of information automatic generating processing executed by the information analyzing tool.

In the system configuration information 2120, two kinds of information tables, that is, an AP module start information table 2422 and an AP module input/output information table 2524 are included, as shown in FIG. 24 and FIG. 25.

In one of the above-mentioned tables, that is, in the AP module start information table 2422, AP module start information for each task is registered on the task basis. In the AP module start information for each task, AP module starting order information 2422a by the task, priority information 2422b of the task, start condition information 2422c of the task, event set condition information 2422d setting timing for releasing wait status of the task are included.

On the other hand, in the AP module start information table 2524, AP module input/output information for each AP module is registered on the AP module basis. In the AP module input/output information for each AP module, an input data name 2524a and an output data name 2524b of each of the AP modules is included.

The AP module input/output information of an AP module M1 taken as an example here, an input data name "D1" and an output data name "D2" of the AP module M1 are included. The AP module start information of the task 1 includes information expressing "the task 1 is transferred to an executing status in 10 ms cycle, and in the executing status the AP module M1 is started and after 10 ms waiting two AP modules M2, M3 are successively started" in addition to the priority information "1".

(2) AP Configuration Information

In the AP configuration information, an AP module/message object start information table is included. In the AP module/message object start information table, AP module/message object start information for each task is registered on the task-by-task basis, as shown in FIG. 26, FIG. 27 and FIG. 28. In the AP module/message object start information for each task, AP module and message object starting order information 2630a by the task, priority information 2630b of the task, starting condition information 2630c of the task, event set condition information 2630d setting an event for releasing wait status of the task are included.

The AP module/message object start information of the task 1 taken as an example here includes information expressing "the task 1 is transferred from an executable status to an executing status in 10 ms cycle, and in the executing status the AP module M1 is started and after 10 ms waiting two AP modules M2, M3 are successively started, and then a message object Nsg11 is started" in addition to the priority information "1".

(3) Message Object

In the message object information table, one or more message objects Mi are registered, as shown in FIG. 29. Each of the message objects Mi includes message data 2931a of the massage object, a message object name 2931b, read/write information 2931c having access right of the AP module to message data of the message object, sending/receiving information 2931d expressing whether the message object is a sending object or a receiving object, action information 2931e at updating the message data of the message object, priority information 2931f of the message object, updating condition information 2931g of the message object and so on.

In each of the set areas 2931a, 2931b, 2931c, 2931d, 2931e, 2931f, 2931g of the message object "Msg12–13" taken as an example here, two kinds of message data of "D12", "D13", message object name of "Msg12–13", AP module reading/writing information to the message object of "read", sending/receiving information of "no sending to and no receiving from an external control unit", action information after message updating of "no action", priority information of "2" and message data updating condition information of "after starting AP module M1" are set.

Information automatic generating processing by the information analyzing tool 2108 will be described below. Here, it is assumed that user defined information is pre-stored in the data base. Further, it is assumed that the user defined information stores the above-mentioned three kinds of information (1) unit configuration information including the AP module allocation information table 2223 (refer to FIG. 22) having registered three control units 1a, 1b, 1c, (2) system input and output information including the system input and output information table having registered input data D11, D21, D31 and output data D14, D24, D34 (refer to FIG. 23), (3) system information including the AP module start information table 2422 (refer to FIG. 24) having registered three tasks T1, T2, T3 and the AP module input/output information table 2524 (refer to FIG. 25) having registered nine AP modules M11, M12, M13, M21, M22, M23, M31, M32, M33.

Figure 33:
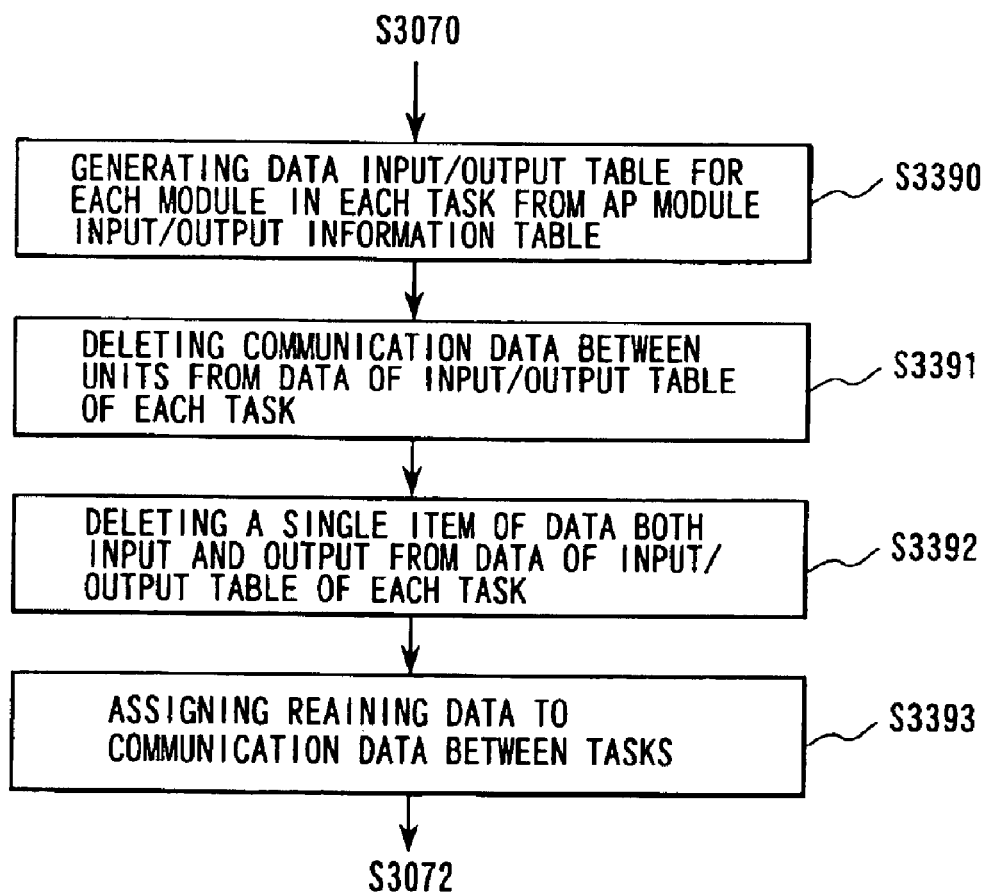
FIG. 33 is a flowchart showing the flow of inter-task communication data extracting processing in an inter-task communication data extracting routine S3071 of FIG. 30.

As shown in FIG. 33, the information analyzing tool 2108 executes message object information table generating processing S3070 to S3074 by extracting the user defined information from the database to generate a message object information table based on the user defined information, and then executes AP module/message object information table generating processing S3075 to S3079 to generate an AP module/message object start information table based on the user defined information.

In more detail, in the message object information table generating processing S3070 to S3074, the information analyzing tool 2108 initially executes a series of processing described below to generate a message object information table for each of control units 1a, 1b, 1c registered in the AP module allocating information table 2223.

In S330, the information analyzing tool 2108 executes inter-unit communication extracting processing S3181 to S3183 shown in FIG. 31 for each of the control units 1a, 1b, 1c registered in the AP module allocating information table 2223 by successively processing the units. However, only the processing S3183 is executed after the processing S3181 to S3182 for all the control units 1a, 1b, 1c is completed.

All input and output data of the AP module allocated to the unit to be processed is extracted from the AP module input/output information table 2524, and from the input and output data, data used for both input data and output data is deleted (S3181). Finally remaining input data is stored as input data for inter-unit communication information of the control unit (S3182). After the above-mentioned processing is executed for all the control units, the processing S3183 is further executed for each of the control units, respectively.

That is, by extracting data common to data stored as input data of inter-unit communication information of other units and output data of the AP module on the unit to be processed from output data of the system input and output information, the extracted data is stored as output data of the inter-unit communication information (S3183).

Figure 32:
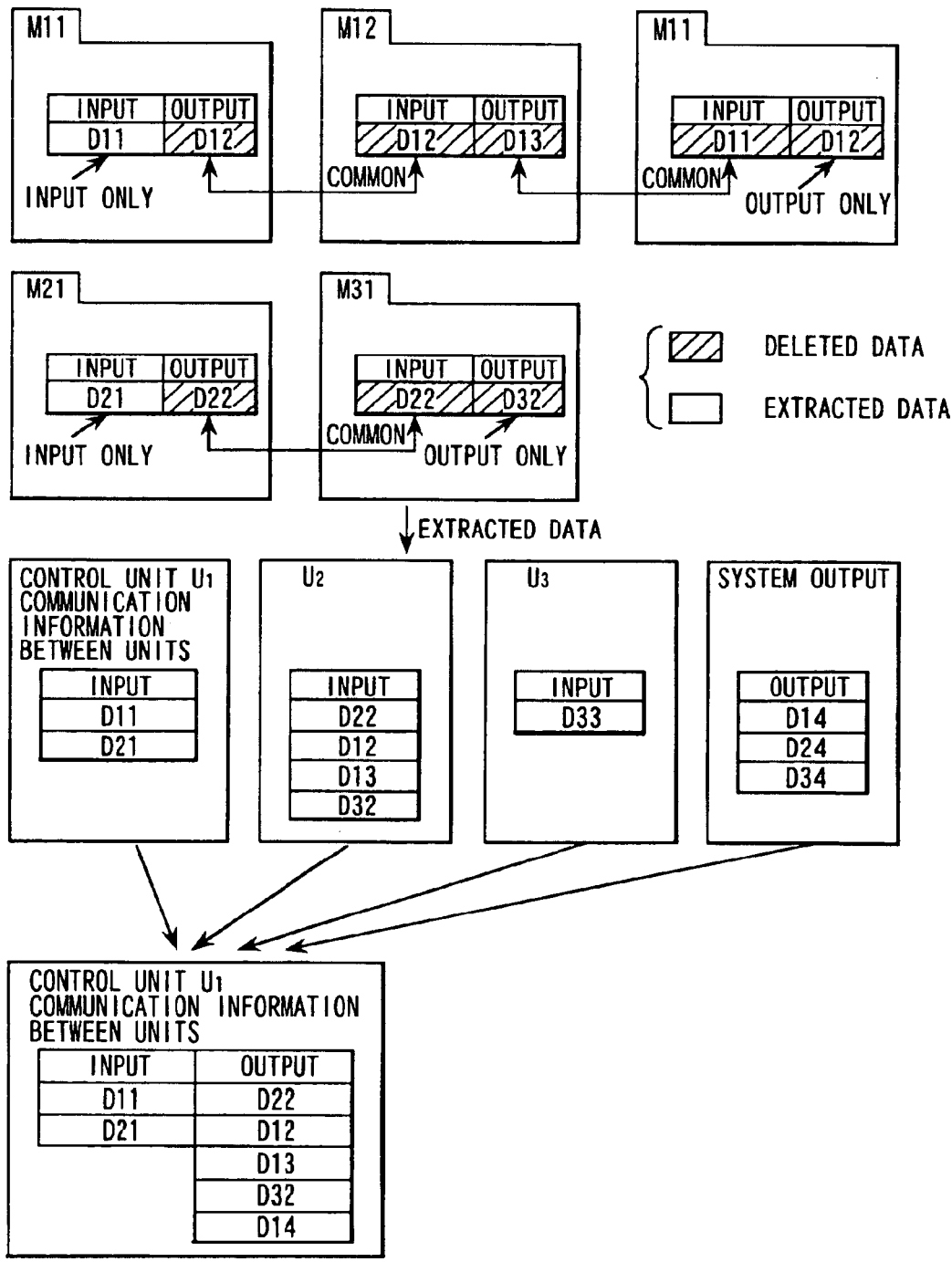
FIG. 32 is a figure for explaining the inter-unit communication data extracting processing in detail.

For example, in the inter-unit communication data extracting processing in a case where the unit to be processed is the control unit 1a, among the input and output data of the control unit 1a, input data of the other control units, and input and output data of the system, input data D11, D21 and output data D14, D32, D22, D12, D13 are stored as input data and output data of the inter-unit communication information of the control unit 1a, as shown in FIG. 32.

Next, in S3071, the information analyzing tool 2108 executes inter-task communication extracting processing S3390 to S3393 shown in FIG. 33 for each of the control units 1a, 1b, 1c registered in the AP module allocating information table 2223 by successively processing the units.

By extracting input data and output data allocated to a unit to be processed among AP modules started by tasks from the AP module input and output information tables 2326 for each task registered in the AP module starting information table 2422, a task input and output information table is generated using the input and output data (S3390). Then, input data and output data of the inter-unit communication information for the unit to be processed are deleted from the input data and the output data registered in each of the task input and output information tables (S3391). Further, data registered as both input data and output data is deleted from each of the task input and output information tables (S3392), and a group of data finally remaining is stored as inter-task communication information (S3393).

For example, in the inter-task communication data extracting processing S3390 to S3393 in a case where the unit to be processed is the control unit 1a, input data and output data of the modules M11, M12, M13, M21, M31 allocated to the unit 1a to be processed among AP modules started by each of the tasks T1, T2, T3 registered in the AP module start information table 2422 are extracted from the AP module input/output information table 2524, and task input and output information tables 3411a, 3411b, 3411c are formed using the input and output data, as shown in FIG. 34. Then, the input data D11, D21 and the output data D14, D32 of the inter-unit communication information (refer to FIG. 31) of the unit to be processed 1a are deleted from the input data and the output data of each of the task input and output information tables 3411a, 3411b, 3411c, and further data registered as both input data and output data (D12 and D13 in the task input and output information table 3411a) is deleted. After that, the final remaining data D22 is stored as inter-task communication information 3412.

Next, in S3072, the information analyzing tool 2108 executes pack data extracting processing S3520 to S3522 shown in FIG. 35 for each of the control units 1a, 1b, 1c registered in the AP module allocating information table 2223 by successively processing the units.

All stored data is extracted from each of the inter-task communication information and each of the inter-unit communication information of a unit to be processed. AP modules outputting each of the stored data among the AP modules allocated to the unit to be processed are retrieved from the AP module input/output information table 2524, and tasks executing the AP modules obtained from the result are respectively retrieved from the AP module start information table 2422 (S3520). Further, an AP module reading each of the stored data among the AP modules allocated to the unit to be processed is retrieved from the AP module input/output information table 2524 (S3521). Therein, if a plurality of AP modules reading any stored data are retrieved, an AP module started by the same task as an AP module outputting the stored data is selected as an AP module reading the stored data. Then, each of the stored data is stored in correspondence with the above mentioned retrieving results (read AP module, output task) as a pack extracting table (S3522).

For example, in the pack extracting processing S3520 to S3522 in a case where the unit to be processed is the control unit 1a, stored data D11, D21, D22, D12, D14, D13, D32 is extracted from the inter-task communication information (refer to FIG. 34) and the inter-unit communication information (refer to FIG. 32) of the control unit 1a, starting task of the AP modules outputting each of the data D11, D21, D22, D12, D14, D13, D32 and the AP modules reading the data D11, D21, D22, D12, D14, D13, D32 are retrieved, and then the pack extracting table 3630 shown in FIG. 36 is formed based on the retrieving results.

Next, in S3073, the information analyzing tool 2108 executes message object generating processing S3740 to S3741 shown in FIG. 37 for each of the control units 1a, 1b, 1c registered in the AP module allocating information table 2223 by successively processing the units.

In a case where there are two or more items of data among data registered in the pack extracting table of the unit to be processed which are read out from AP modules each started by the same task and output from AP modules each started by the same task, a message object with a name having the same data structure as the message object shown in FIG. 29 is generated, and the two or more items of data are allocated to the message object as one item of pack data (3740). By allocating a group of data items having common both to the sending task and the receiving module to one message object, a volume of communication during executing an application can be reduced.

In regard to the other data items, message objects with name are generated and each of the other data items is allocated to each of the message object one-to-one correspondence (S3741).

For example, in the pack data message object generating processing in a case where the unit to be processed is the control unit 1a, two data items of D12 and D13 among data D11, D21, D22, D12, D14, D13, D32 registered in the pack extracting table of the control unit 1a are packed, and the pack data is allocated to a message object Msg12–13 (S3740). The other data items D11, D21, D22, D14, D32 are allocated to message objects Msg11, Msg21, Msg22, Msg14, Msg32 different from one another, respectively (S3741).

Figure 38:
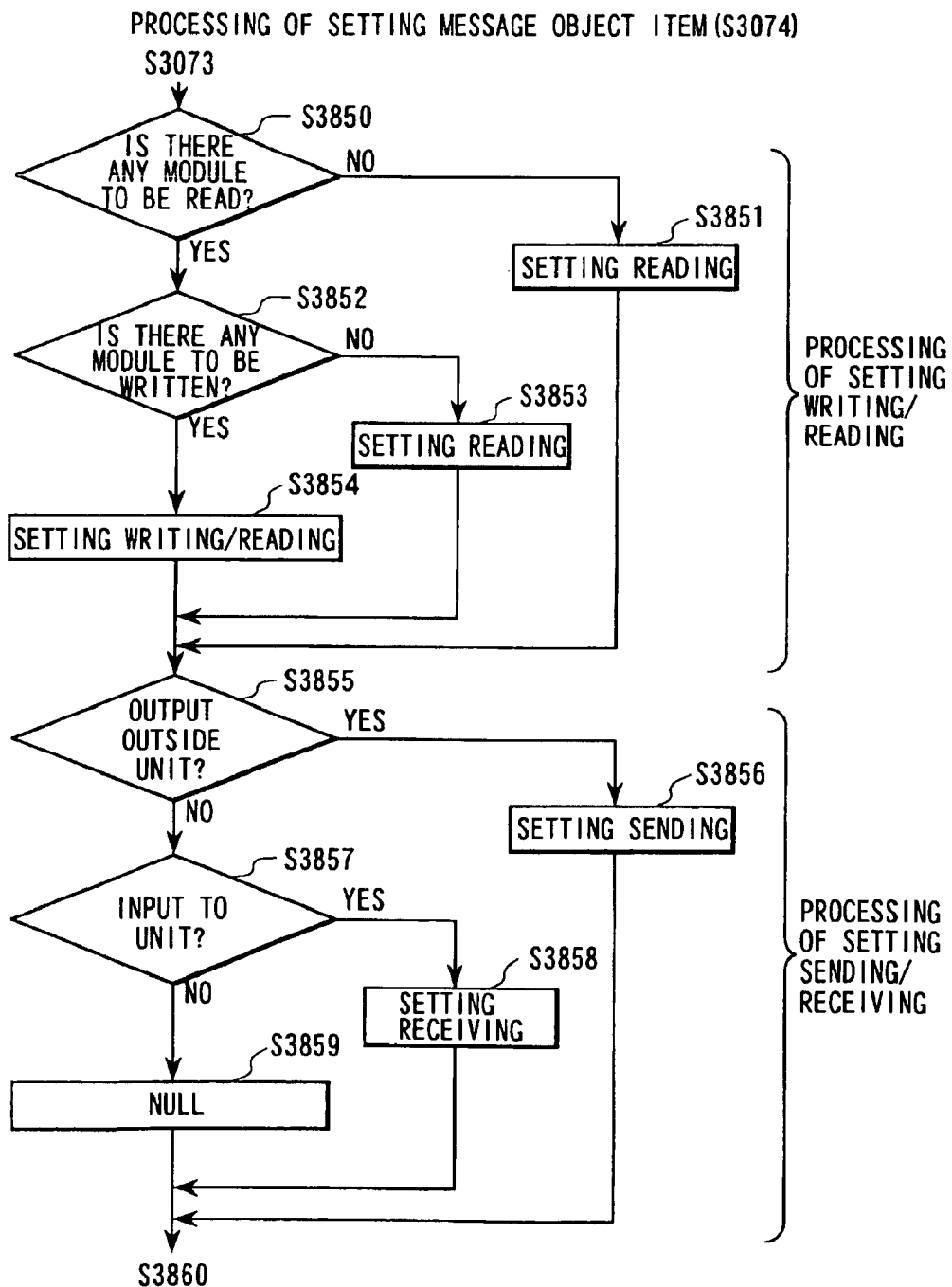
FIG. 38 is a flowchart showing the flow of writing/reading setting processing and sending/receiving setting processing in a message object item setting routine S3074 of FIG. 30.
Figure 39:
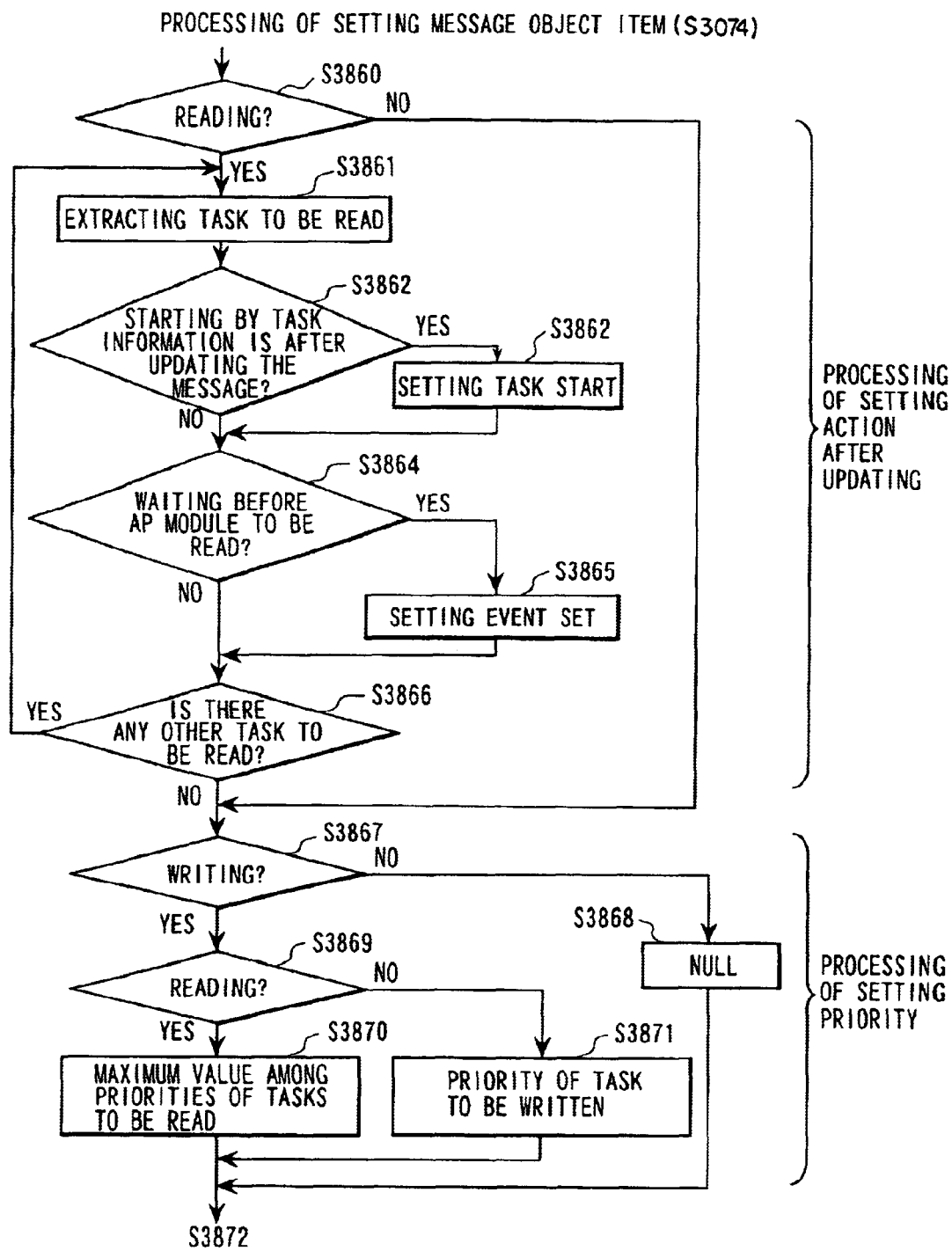
FIG. 39 is a flowchart showing the flow of post-updating action setting processing and priority setting processing in the message object item setting routine S3074 of FIG. 30.

Next, in S3074, the information analyzing tool 2108 executes message object item setting processing shown in FIG. 38, FIG. 39 and FIG. 40 for each of the control units 1a, 1b, 1c registered in the AP module allocating information table 2223 by successively processing the units. That is, the following processing of (1), (2), (3), (4), (5), (6) is performed for each of the control units 1a, 1b, 1c, and data setting processing to each of data setting areas of message object allocated for registered data of pack extracting table of the control unit.

(1) Writing/Reading Setting Processing S3850 to S3854

Whether there is any AP module to be read in each data registered in a pack extracting table of a unit to be processed is judged by contents of input data of the inter-unit communication information and contents of the inter-task communication information (S3850).

If the data is set both in the input data of the inter-unit communication information and in the inter-task communication information, it is judged that there is no AP module to be read in the data and "writing" is set in the reading/writing information setting area of the message object allocated for the data (S3851).

In a case other than the above, it is judged that there is an AP module to be read in the data and it is judged whether there is any AP module to be written in the data is judged by the contents of output data of the inter-unit communication information and the contents of the inter-task communication information (S3852).

Therein, if the data is not set in either of the input data of the inter-unit communication information and the inter-task communication information, it is judged that there is no AP module to be written in the data and "reading" is set in the reading/writing information setting area of the message object allocated for the data (S413).

On the other hand, if the data is set only in the inter-task communication information, "reading and writing" is set in the reading/writing information setting area of the message object allocated for the data (S3854).

By doing so, the data setting to the reading/writing information setting area of the message object allocated for the each data registered in the pack extracting table of the unit to be processed is completed.

For example, in the writing/reading setting processing S3850 to S3854 in a case where the unit to be processed is the control unit 1a, "writing" is set in the reading/writing information setting area of the message objects Msg14, Msg32 allocated for the data D14, D32 not set in either of the input data of the inter-unit communication information and the inter-task communication information among data D22, D11, D21, D14, D32 registered in the pack extracting table (refer to FIG. 36) of the control unit 1a (S3851), and "reading" is set in the reading/writing information setting area of the message objects Msg11, Msg21 allocated for the data D11, D21 not set in either of the output data of the inter-unit communication information and the inter-task communication information (S3853). Further, "reading and writing" is set in the reading/writing information setting area of the message object Msg22 allocated for the data D22 set only in the inter-task communication information (S3854).

(2) Sending/Receiving Setting Processing S3855 to S3859

It is judged whether a message object allocated to registered data of the pack extracting table of a unit to be processed is sent from the unit to be processed to the other control units (S3855). If the data of the message object is set to output data of the inter-unit communication information, it is judged that the message object is sent from the unit to be processed to the other control units, "sending" is set in the sending/receiving information setting area of the message object (S3856). In a case other than the above, it is judged that the message object is not sent from the unit to be processed to the other control units, and it is judged whether the unit to be processed receives the message object (S3857). If data of the message object is set to input data of the inter-unit communication information, it is judged that the unit to be processed receives the message object and "receiving" is set in the sending/receiving information setting area of the message object (S3858). In a case other than the above, it is judged that the unit to be processed does not sends nor receives the message object and "NULL" is set in the sending/receiving information setting area of the message object (S3859).

By doing so, the data setting to the sending/receiving information setting area of the message object allocated for the each data registered in the pack extracting table of the unit to be processed is completed.

For example, in the sending/receiving setting processing S3855 to 3859 in a case where the unit to be processed is the control unit 1a, among the data D22, D11, D21, D14, D32 it is judged that the message objects Msg14, Msg32 of the data D14, D32 corresponding to output data of the inter-unit communication information are sent objects, and "sending" is set in the sending/receiving information setting areas (S3856). Further, it is judged that the message objects Msg11, Msg21 of the data D11, D21 corresponding to input data of the inter-unit communication information are received objects, and "receiving" is set in the sending/receiving information setting areas (S3858). It is judged that the message object Msg22 of the data D22 not corresponding to either of input data nor output data of the inter-unit communication information is neither sent object nor received object, and "NULL" is set in the sending/receiving information setting area (S3859).

(3) Post-Updating Action Setting Processing S3860 to S3866

Depending on set contents of reading/writing information of each of message objects of a unit to be processed, it is successively judged whether the message object is readable or not.

If "writing" is set as the reading/writing information of a message object, it is judged that the message data of the message object is unreadable, and "no action" is set in the action information area of the message object and the processing proceeds to (4) priority setting processing to be described next without performing any processing after that.

On the other hand, if "reading" is set as the reading/writing information of a message object, it is judged that the message data of the message object is readable, and the AP module using the message data as input data is retrieved from the AP module input/output information table 2524 (S3860). A task starting the AP module found that time is retrieved from the AP module start information table 2422 (S3861), and AP module starting information of the task is extracted from the AP module start information table 2422 and the following processing is executed based on the AP module starting information.

Initially, it is judged whether set contents of the starting condition information contained in the AP module starting information is "after updating of message data of message object" or not (S3862), and "task start found in S3861" is set in the action information setting area of the message object only when "after updating of message data of message object" is set (S3863). Further, it is judged whether there is wait setting just before starting of the AP module found in S3860 in the starting order included in the AP module starting information (S3864), and event set is set in the action information setting area of the message object only when there is wait setting (S3865).

Then, another task starting the AP module found in S420 is retrieved from the AP module start information table 2422, and the processing after S3861 is repeated until the task is not found (S3866).

By doing so, data setting to the event set condition setting area of each message object of the unit to be processed is completed.

For example, in the post-updating action setting processing S3860 to 3866 in a case where the unit to be processed is the control unit 1a, the message objects Msg14, Msg32 having setting of "writing" as the reading/writing information is judged that message data is unreadable, and "no action" is set in the action information setting area (S3860).

On the other hand, any one of the message objects Msg11, Msg21, Msg22 having setting of "reading" or "reading and writing" as the reading/writing information is judged that message data is readable, but "task T2 starting" is set only in the action information setting area of the message object Msg21 on which "after updating message data of message object." is set in the starting condition information included in the AP module starting information of the AP module starting task to which the message data is input (S3863).

(4) Priority Setting Processing S3867 to S3871

Depending on set contents of reading/writing information of each of message objects of a unit to be processed, it is successively judged whether or not there is any writing AP module in which the message data is written (S3867).

If "reading" is set as the reading/writing information of a message object, it is judged that there is no writing AP module in the message object, and "no priority" is set in the priority information setting area of the message object (S3868).

On the other hand, if "writing" or "reading and writing" is set as the reading/writing information of a message object, it is judged that there is a writing AP module in the message object, and depending on the set contents of the reading/writing information of the message object it is judged whether there is any reading AP module for reading message data of the message object (S3869).

If the reading/writing information of the message object is "writing", it is judged that there is no reading module in the message object, and a writing AP module having output data of the message data of the message object is retrieved from the AP module input/output information table 2524. AP module starting information of the writing AP module starting task found at that time is extracted from the AP module start information table 2422, and priority information included in the AP module starting information is set in the priority information setting area of the message object (S3871).

On the other hand, if "reading and writing" is set as the reading/writing information of a message object, it is judged that there are a reading module in addition to a writing module in the message object, and a reading AP module started by a task different from the writing AP module having message data of the message object as output data among read AP modules having message data of the message object as input data is retrieved from the AP module input/output information table 2524. AP module starting information of the reading AP module starting task found at that time is extracted from the AP module start information table 2422, and priority information included in the AP module starting information (the maximum value among set values of the priority information included in the AP module starting information of each of the reading AP module starting tasks if a plurality of reading AP modules are found by the retrieval) is set in the priority information setting area of the message object. By setting the priority of a sending destination to the priority of the message object as described above, the priority control can be guaranteed.

By doing so, data setting to the priority information setting area of each message object of the unit to be processed is completed.

For example, in the priority setting processing S3867 to 3871 in a case where the unit to be processed is the control unit 1a, the message objects Msg14, Msg32 having setting of "reading" as the reading/writing information is judged that there is no writing AP module (S3867), and "no priority" is set in the priority information setting area (S3868). The message object Msg22 having setting of "reading and writing" as the reading/writing information among the other message objects Msg14, Msg32, Msg22 is judged that there is a reading AP module (S3869), and priority "3" of the starting task T3 of the reading AP module M31 started by another task different from the reading AP module M21 is set in the priority information setting area (S3870). The other message objects Msg14, Msg32 are judged that there is no writing AP module (S3869), and priorities "1", "3" of the starting tasks T1, T1 of the writing AP module M13, M31 are set in the priority information setting areas (S3871).

(4) Updating Condition setting processing S3872 to S3875

Depending on set contents of sending/receiving information of each of message objects of a unit to be processed, it is successively judged whether or not the message object is a receiving object (S3872).

If "receiving" is set as the sending/receiving information of the message object, it is judged that the message object is a receiving object, and "at arrival of message" is set in the updating condition setting information area (S6876).

In the cases other than the above, it is judged whether the message data of the message object is pack data or not (S3874). If the message data is not pack data, "after completion of AP module outputting message data of message object" is set in the updating condition setting information area (S3876). If the message data is pack data, an AP module outputting data last among AP modules outputting data included in the pack data is retrieved from the AP module starting information and the AP module input and output information, and "after completion of AP module outputting last data" is set in the updating condition setting information area (S3875).

By doing so, data setting to the updating condition information setting area of each message object of the unit to be processed is completed.

When generating and data setting to the data setting areas of the message objects of all the control units 1a, 1b, 1c registered in the AP module allocation information table are completed through the above-mentioned processing S3070 to S3074, the information analyzing tool 2108 registers them to message object information tables prepared for each control unit, respectively, as shown in FIG. 29. Then, as described above, the information analyzing tool 2108 executes AP module/message object starting information table generating processing S3075 to S3079. In more detail, the information analyzing tool 2108 executes a series of processing described below to form an AP module/message object starting information table of all the control units 1a, 1b, 1c registered in the AP module allocation information table 2223.

Figure 41:
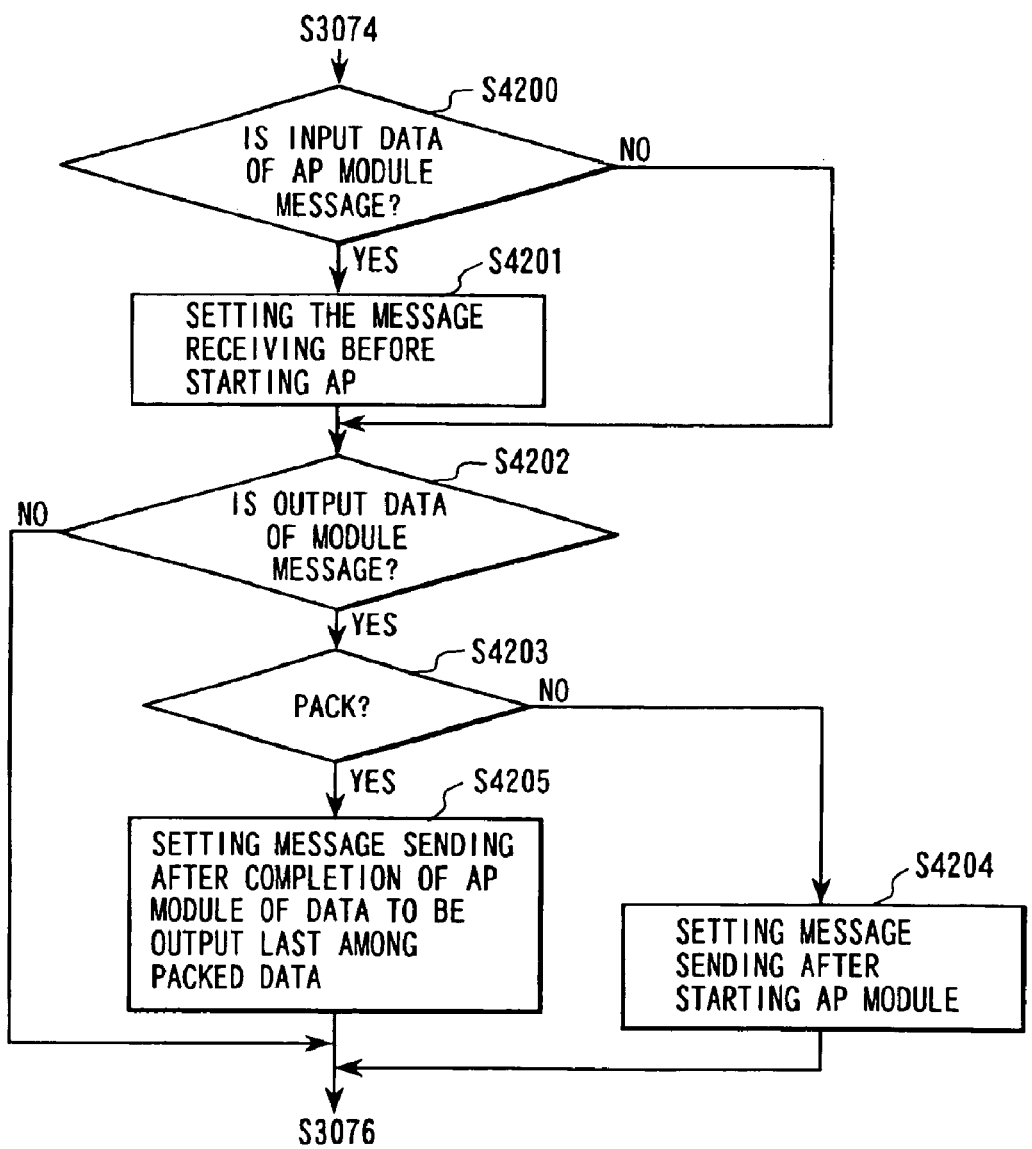
FIG. 41 is a flowchart showing the flow of message object sending/receiving setting processing in a message object sending/receiving setting routine S3075 of FIG. 30.

Initially, in S3075, in regard to each of the tasks T1, T2, T3 registered to the AP module start information 2422, the information analyzing tool 2108 respectively extracts the AP module starting information of the task from the AP module starting information table, and execute the message object sending and receiving processing S4200 to S4205 shown in FIG. 41.

In regard to AP modules registered in order of starting to the starting order information included in the AP module starting information of each task to be processed, it is successively judged whether or not input data corresponds to message data of any of the message objects using registered contents of the AP module input/output information table 2524 and set contents of each of message objects (S4200). If an AP message object having input data of message data of a message object is found, setting of "receiving of the message object (specify the message object name)" is inserted just before the AP module in the starting order information (S4201).

Further, in regard to each of the AP modules registered to the starting order information, it is successively judged whether or not the output data agrees with message data of any one of the message objects based on registered contents of the AP module input/output information table 2524 and set contents of each message object (S4202). In regard to AP modules of which output data is not message data of the message object, the processing proceeds to the AP module deleting processing to be described below without executing the following processing S4203 to S4205 of the message object sending and receiving setting processing.

On the other hand, in regard to AP modules of which output data is message data of the message object, it is further judged whether or not the message data is pack data (S4203). If the output data is not pack data, setting of "sending of the message object (specify the message object name)" is inserted just after the AP module in the starting order information (S4204). If the output data is pack data, an AP module outputting data last among AP modules outputting data included in the pack data is retrieved from the AP module start information table 2422 and the AP module input/output information table 2524, and setting of "sending of the message object (specify the message object name)" is inserted just after the AP module in the starting order information (S42045).

Next, in S3076, the information analyzing tool 2108 executes AP module deleting processing to be described below for each of the control units 1*a*, 1*b*, 1*c* registered in the AP module allocating information table 2223 by successively processing the units. AP modules not included in the AP module allocating information of a unit to be processed are deleted from starting order information of each of tasks T1, T2, T3 processed in the message object sending and receiving setting processing, and the results are employed as starting order information of AP module/message object starting information of each task on the unit to be processed. At that time, in regard to a task of which all the AP modules are deleted, the task is not handled as a task on the unit to be processed in the following processing.

Figure 42:
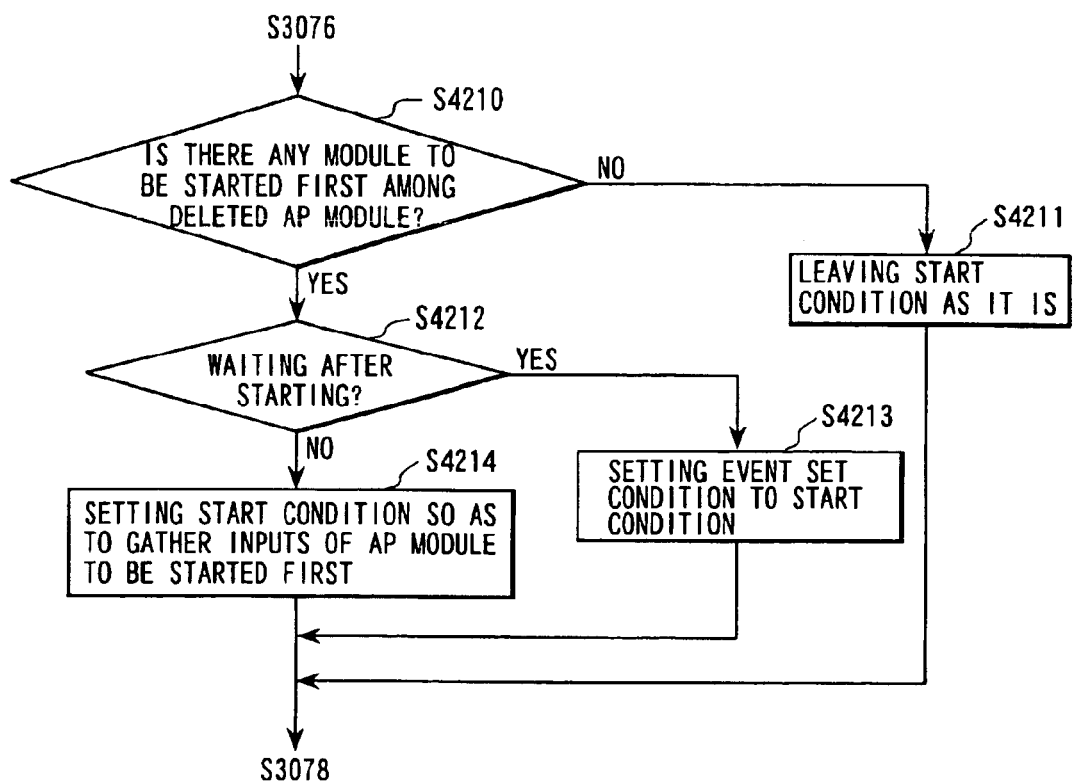
FIG. 42 is a flowchart showing the flow of start condition setting processing in a start condition setting routine S3076 of FIG. 30.

Next, in S3077, the information analyzing tool 2108 executes the starting condition setting processing S4210 to S4214 shown in FIG. 42 for each of the control units 1*a*, 1*b*, 1*c* registered in the AP module allocating information table 2223.

In regard to each of tasks T1, T2, T3 of the unit to be processed, it is judged whether or not an AP module set as a first starting module in the starting order information of the AP module starting information of the task is deleted in the AP module deleting processing (S4210).

In regard to a task of which the first starting module is deleted, starting condition information included in the AP module starting information of the task extracted in the message object sending and receiving setting processing (S3075) is employed as starting condition information of the AP module/message object starting information of the task (S4211), just as it is.

On the other hand, in regard to a task of which the first starting module is not deleted, it is judged whether or not wait is set in the starting condition information of the task (S4212).

At that time, if the wait setting is found, the event set condition information included in the AP module starting information of the task extracted in the message object sending and receiving setting processing (S3075) is employed as starting condition information of the AP module/message object starting information of the task (S4213). However, if the wait setting is not found, the timing when all the input data of the first starting AP module is prepared is set as starting condition information of the AP module/message object starting information of the task (S4214).

Figure 43:
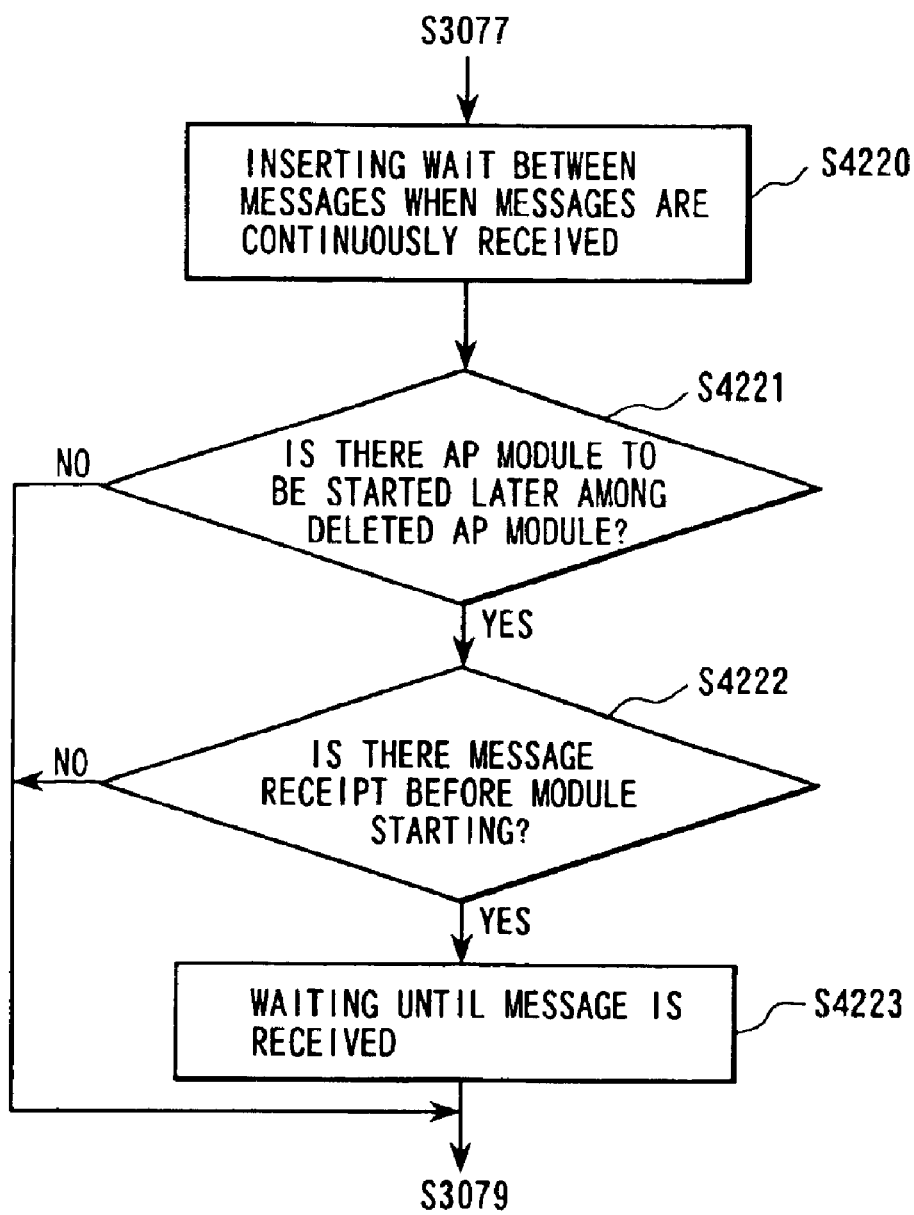
FIG. 43 is a flowchart showing the flow of wait setting processing in a start condition setting routine S3078 of FIG. 30.

Next, in S3078, the information analyzing tool 2108 executes the wait setting processing S4220 to S4223 shown in FIG. 43 for each of the control units registered in the AP module allocating information table 2223.

In a case where items of "receiving message" are continuously set in the starting order information of the AP module/message object starting information of each of the tasks T1, T2, T3 on the unit to be processed, "wait" is inserted between the items (S4220).

Then, it is judged whether or not there is an AP module after an AP module deleted in the AP module deleting processing (s3706) among AP modules set in the starting order information of the AP module/message object starting information of each of the tasks T1, T2, T3 on the unit to be processed (S4221). At that time, in regard to starting order information in which such an AP module is not found, the processing proceeds to the task priority setting process without executing the following processing S4222 to S4223 in the wait setting processing. On the other hand, in regard to starting order information in which such an AP module is found, it is judged whether or not "receiving message" is set just before the AP module (S4222). If "receiving message" is set, setting of "wait" is inserted just before the "receiving message" (S4223). If "receiving message" is not set, the processing proceeds to the task priority setting processing to be described below.

Figure 44:
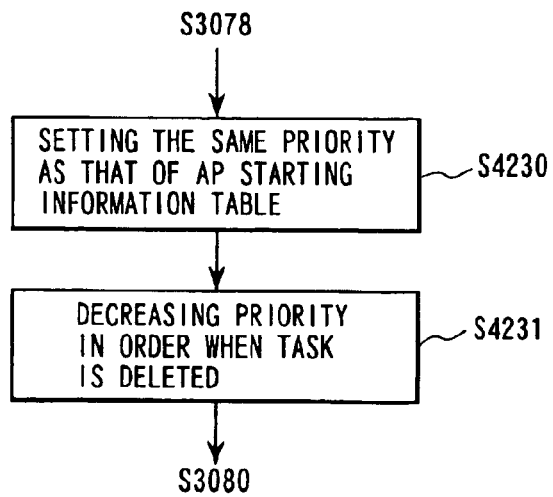
FIG. 44 is a flowchart showing the flow of task priority setting processing in a task priority setting routine S3079 of FIG. 30.

Next, in S3079, the information analyzing tool 2108 executes the task priority setting processing S4230 to S4231 shown in FIG. 44 for each of the control units registered in the AP module allocating information table 2223.

Priority information included in the AP module starting information of each of tasks T1, T2, T3 extracted from the message object sending and receiving setting processing (S3075) is employed as priority information of the AP module/message object starting information of each of the tasks (S4230). Then, if there is any task of which all the AP modules are deleted in the AP module deleting processing, levels of priority information of the other tasks having priorities higher than that of the task are carried down by one level in order (S4231). For example, in a case where all AP modules of the task T2 on the unit to be processed are deleted in the AP module deleting processing and the task T2 is deleted from the unit to be processed, when "1", "2", "3" are set in the priority information of the AP module starting information of each of the tasks T1, T2, T3 extracted in the message object sending and receiving setting processing (S3075), setting of the priority information of the task T3 having a higher priority than the deleted task T2 is carried down from "3" to "2".

According to such setting processing, because a priority of a task can be relatively set on a control unit even if the task spreads over a plurality of control units, the priority control can be guaranteed.

As generation of the AP module/message object starting information of each of the tasks on the control units 1*a*,1*b*, 1*c* registered in the AP module allocation information table is completed through the processing S3075 to S3079 described above, the results are registered to the AP module/message object starting information tables prepared for each of the control units, as shown in FIG. 26, FIG. 27 and FIG. 28.

Then, the message object information table and the AP module/message object starting information table for each of the control units are stored in a memory medium or the like as the AP configuration information and the message objects for each of the control unit, as described previously, and transmitted to each of the control units of the distributed control system, respectively.

If the information analyzing tool 2108 having the information automatic generating processing defined as described above is installed in the information processing unit 2, a user can automatically generate AP module configuration information and message objects necessary for cooperative operation of AP modules on a desired system structure using the information analyzing tool 2108. Therefore, when the system structure, for example, the AP module allocation is changed, it is sufficient that the user corrects only the set contents of the user defined information without rewriting the contents of the AP modules.

Although it is assumed in the above that the kinds of data included in the message objects are fixed and the setting is completely automated, the set contents of the message objects may be changed by the user if necessary.

When the set contents of the message objects need to be changed, the user adds a communication information table 4580 and a pack information table 4581 shown in FIG. 45 to the user defined information.

Items of communication information of message objects having set contents needed to be changed are registered in the communication information table 4580, as shown in FIG. 45 (*a*). In addition to a message data name 4580*a* for identifying a message object, another kind of change information for changing data already set in a data setting area of a message object by the above-mentioned information automatic generating processing, for example, priority information 4580*b* of the message object, action information at message updating of a message object (for example, adding and deleting event set or task start) 4580*d* may be included in the communication information. Other kinds of additional information newly added to the message object, for example, direct/cycle (time) setting information 4580*c* having kinds of message object communication of message objects (direct communication or periodical communication every specified time), a time-out value 4580*e*, information 4580*f* on allowable number of times of message not-yet-arriving of a message object, a task name 4580*g* starting a message object at occurrence of an error such as time-out, Ack setting information (presence/absence) 4580*h* and so on may be included in the communication information.

The pack information for converting a group of message data into a new pack data is registered in the pack information table 4581, as shown in FIG. 45 (*b*). In addition to a plurality of message data names 4581*a* to be converted into pack data, the pack information may include change information similar to the above-mentioned communication information and additional information (priority 4581*b*, direct/cycle (time) setting information 4581*c*, action information 4581*d*, a time-out value 4581*e*, information 4581*f* on allowable number of times of message not-yet-arriving of a message object, a task name 4581*g* starting a message object at occurrence of an error, Ack setting information 4581*h*. Further, the pack information may include additional information such as direct sending timing information of message object (after updating a specified message data, after updating all message data, after updating any message data and so on) 4581*i*, sole communication setting information 4581*j* specifying a message data name to be sent and received by a message object.

Figure 46A:
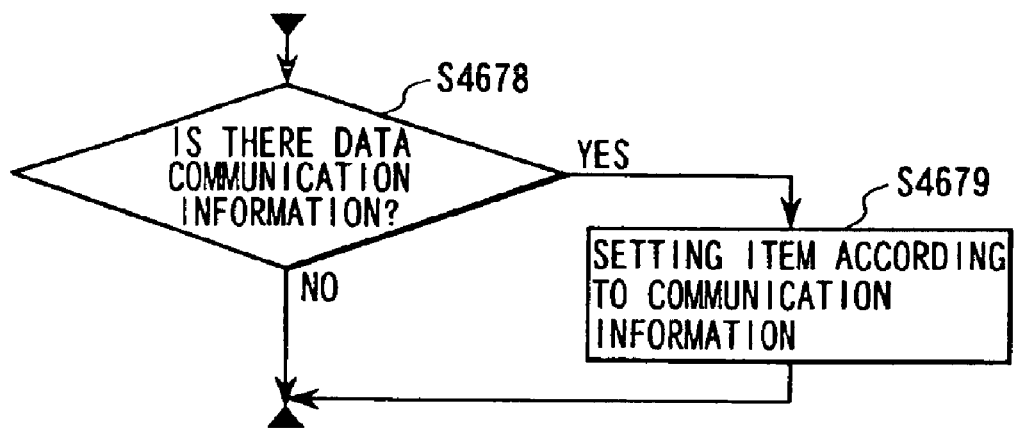
FIG. 46 is flowcharts showing the flow of setting correcting processing to be added to the message object item setting routine S3074 of FIG. 30.
Figure 46B:
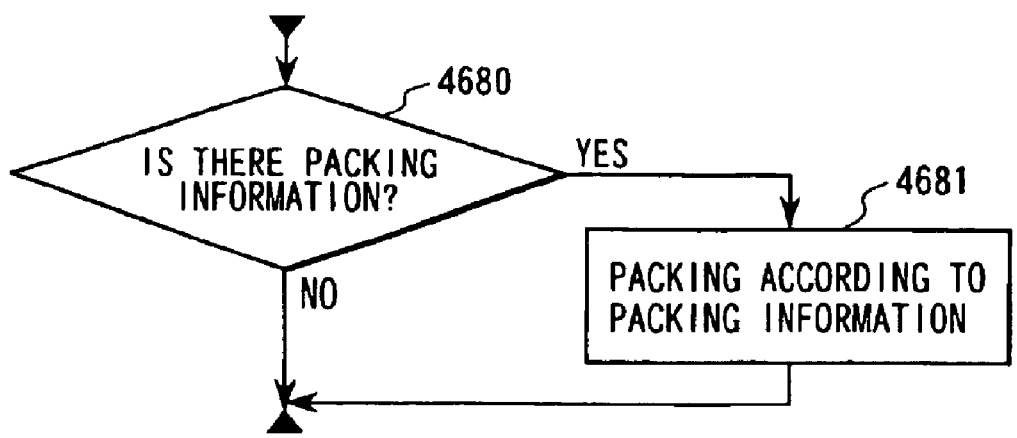
Figure 47:
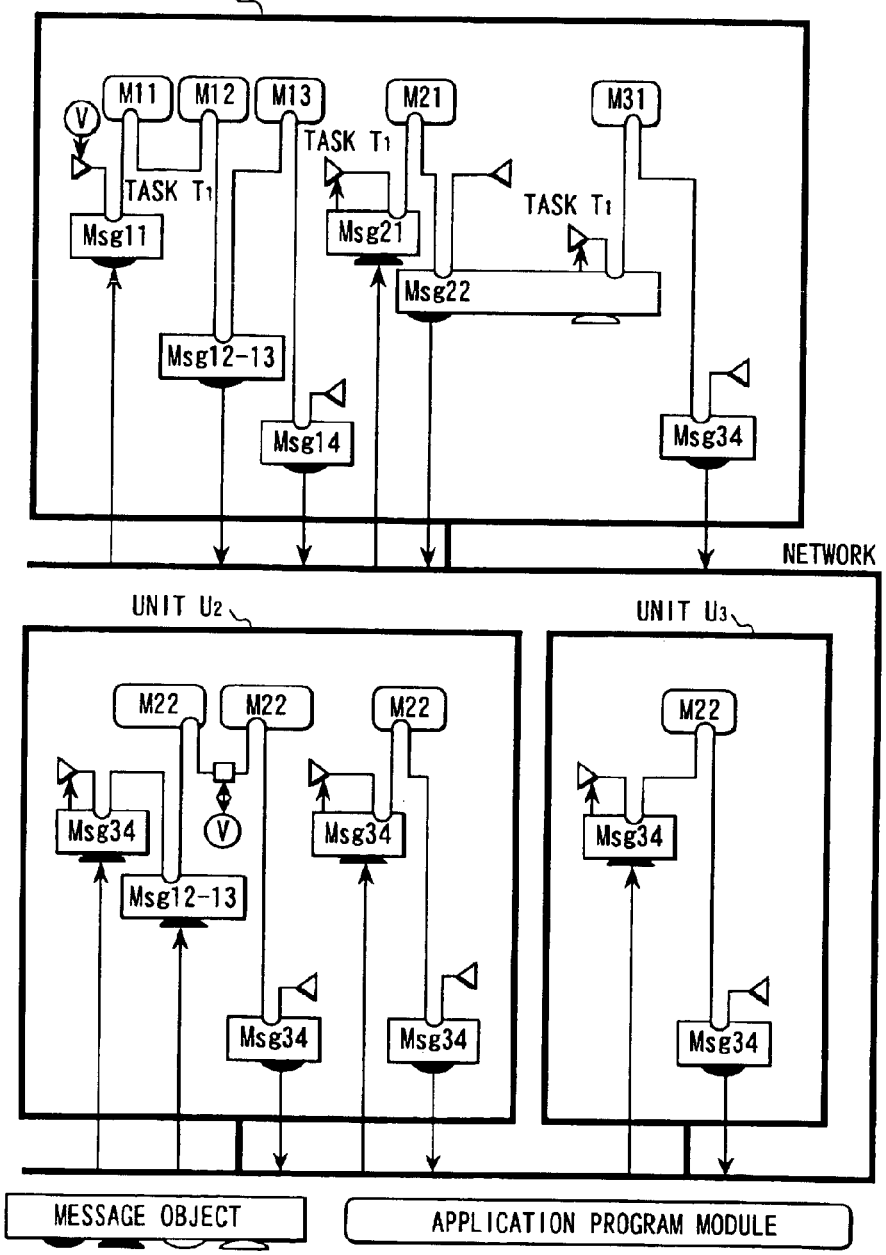
FIG. 47 is a block diagram for explaining cooperative operation of AP modules by message communication in an embodiment of a distributed control system in accordance with the present invention.

In a case where a communication information table 4580 is included in the user defined information, the information analyzing tool 2108 executes correction processing (refer to FIG. 46(*a*)) of the set contents of the message object based on the communication information after executing the updating condition setting processing. In more detail, after completion of the updating condition setting processing it is judged whether or not a communication table 4580 is included in the user defined information (S4678). If a communication table 4580 is included, set contents of each of message objects are changed based on the communication information containing the message data name of the message object (S4679). That is, the set contents of the corresponding information in the message object are changed using change information (priority 4580*b*, post-updating action information 4580*d*) contained in the communication information, and the additional information (direct/cycle (time) setting information 4580*c*, a time-out value 4580*e*, information 4580*f* on allowable number of times of message not-yet-arriving of a message object, a task name 4580*g* starting a message object at occurrence of an error, Ack setting information 4580*h*) is added to the message object as function adding information.

In a case where a pack information table 4581 is included in the user defined information, the information analyzing tool 2108 further executes pack processing (refer to FIG. 45 (*b*)) during message object generating processing (S3740), and executes correction processing of the set contents of the message object based on the pack information after completion of the updating condition setting processing. In more detail, in message object generating processing (S3740) it is judged whether or not a pack information table 4581 is included in the user defined information (S4680). If a pack information table 4581 is included, the group of message data specified in the pack information is packed as pack data, and the pack data is allocated to one message object. Then, after completion of the updating condition setting processing, the set contents of the message object generated based on the pack information are changed based on the pack information. That is, the set contents of the corresponding information in the message object art changed using the change information (priority 4581*b*, action information 4581*d*) included in the pack information, and the additional information (direct/cycle (time) setting information 4581*c*, a time-out value 4581*e*, information 4581*f* on allowable number of times of message not-yet-arriving of a message object, a task name 4581*g* starting a message object at occurrence of an error, Ack setting information 4581*h*, direct sending timing information of message object 4581*i*, sole communication setting information 4581*j*) included in the pack information is added to the message object as function adding information.

As described above, only in a case where the communication information table and the pack information table are included in the user defined information, the information analyzing tool 2108 correct the set contents of the message object using the communication information and the pack information registered in the tables. By doing so, the user can correct the AP configuration information automatically generated by the information processing unit 2 and the set contents of the message objects (for example, combination of the pack data and so on) depending on a special status of the corresponding system. Further, it is possible to set more detailed information, for example, to add an additional function (changing function from direct communication to periodical communication, sole communication function and so on).

Therefore, for example, even in a case where there is possibility to change registered contents of a message object information table generated in the information automatic generating processing due to system change or unit structure change, such possibility can be eliminated if the registered contents of the communication information table and the pack information table once formed are not changed.

In the distributed control system in which the message object information table of FIG. 29 and the AP module/message object starting information table of FIG. 26 to FIG. 28 are transmitted to each of the control units 1a, 1b, 1c, an application is executed by mutual message communication between AP modules on each of the control units 1a, 1b, 1c shown in FIG. 21.

(1) Processing on the Control Unit 1a

ROTS3 starts a task T1 in 10 ms cycle according to the starting condition information of the AP module/message object starting information (FIG. 26) of the task T1.

The task T1 shifted to executing status by the above starts the AP modules M13, M11, M12 and the RT communication processing control portion 6 according to the starting order information of the AP module/message object starting information (FIG. 26(a)) of the task T1. The details are as follows.

The task T1 initially starts the RT communication processing control portion 6 to update message data of the object Msg11 by a received message from the network. The RT communication processing control portion 6 started at that time updates the message data of the object Msg11 by the received message at a timing determined in the updating condition information (FIG. 29 (a)) of the object Msg11.

Next, the task T1 starts sequentially two AP message object M11, M12, and then starts the RT communication processing control portion 6 to send the message object Msg12–13 to the network. The RT communication processing control portion 6 started at that time updates the message data of the message object Msg12–13 after completion of the AP module M12 according to the updating condition information (FIG. 29(a)) of the message object Msg12–13, and then sends the message object Msg12–13 to the network.

Further, the task T1 starts the AP module M13 and finally starts the RT communication processing control portion 6 to send the message object Msg14 to the network. The RT communication processing control portion 6 started at that time updates the message data of the message object Msg14 after completion of the AP module M13 according to the updating condition information (FIG. 29 (a)) of the message object Msg14, and then sends the message object Msg14 to the network. The task T1 is completed with completion of the last starting processing.

When the network communication processing driver 4 receives the message object Msg22 from the network, the RTOS3 starts the RT communication processing control portion 6. The RT communication processing control portion 6 uses system call to make the RTOS3 start the task T2 according to the post-updating action information (FIG. 29 (a)) of the message object Msg12. The task T2 shifted to executing status by the above starts the AP module M21 and the RT communication processing control portion 6 according to the starting order information of the AP module/message object starting information (FIG. 26 (b)) of the task T2. The details are as follows.

The task T2 initially starts the RT communication processing control portion 6 to update message data of the object Msg12 by a received message from the network. The RT communication processing control portion 6 started at that time updates the message data of the object Msg12 by the received message at a timing determined in the updating condition information (FIG. 29 (a)) of the object Msg12.

Further, the task T2 starts the AP module M21 and finally starts the RT communication processing control portion 6 to send the message object Msg22 to the network. The RT communication processing control portion 6 started at that time updates the message data of the message object Msg22 after completion of the AP module M21 according to the updating condition information (FIG. 29 (a)) of the message object Msg22, and then sends the message object Msg22 to the network. The task T2 is completed with completion of the last starting processing.

The task T3 shifted to executing status starts the AP module M31 and the RT communication processing control portion 6 according to the starting order information of the AP module/message object starting information (FIG. 26 (b)) of the task T3. The details are as follows.

The task T3 initially starts the RT communication processing control portion 6 to update message data of the object Msg22 by a received message from the network. The RT communication processing control portion 6 started at that time receives the object Msg22 from the task 2.

Next, the task T3 starts the AP module M31 and finally starts the RT communication processing control portion 6 to send the message object Msg32 to the network. The RT communication processing control portion 6 started at that time updates the message data of the message object Msg32 after completion of the AP module M31 according to the updating condition information (FIG. 29 (a)) of the message object Msg32, and then sends the message object Msg32 to the network and uses system call to make the RTOS3 complete the task. The task T3 is completed with completion of the last starting processing.

(2) Processing in the Control Unit 1b

When the network communication processing driver 4 receives the message object Msg22 from the network, the RTOS3 starts the RT communication processing control portion 6. The RT communication processing control portion 6 uses system call to make the RTOS3 start the task T2 according to the post-updating action information (FIG. 29 (b)) of the message object Msg22. The task T2 shifted to executing status by the above starts the AP modules M22, M23, M32 and the RT communication processing control portion 6 according to the starting order information of the AP module/message object starting information (FIG. 27 (a)) of the task T2. The details are as follows.

The task T2 initially starts the RT communication processing control portion 6 to update message data of the object Msg22, and further starts the RT communication processing control portion 6 to receive the message object Msg12–13. At the first starting, the RT communication processing control portion 6 updates the message data of the message object Msg22 by the received message according to the updating condition information (FIG. 29 (b)) of the message object Msg22, and at the next starting, updates the message object Msg12–13 at arrival of the message object Msg12–13 from the network by the received message according to the updating condition information (FIG. 29 (b)) of the message object Msg12–13.

Then, the task T2 starts the AP module M22 and uses system call to execute wait 1. At that time, the task T2 uses system call to start an alarm giving an event 1 (10 ms after completion of AP module) set in the event information of the AP module/message object starting condition information (FIG. 27(a)).

Then, the task T2 released from wait status by starting of the alarm starts the AP module M23, and finally starts the RT communication processing control portion 6 to send the message object Msg24 to the network. The RT communication processing control portion 6 started at that time updates the message data of the message object Msg24 after completion of the AP module M23 according to the updating condition information (FIG. 29 (*b*)) of the message object Msg24, and sends the message object Msg24 to the network. The task T2 is completed with completion of the last starting processing.

When the network communication processing driver 4 receives the message object Msg32 from the network, the RTOS3 starts the RT communication processing control portion 6. The RT communication processing control portion 6 uses system call to make the RTOS3 start the task T3 according to the post-updating action information (FIG. 29 (*b*)) of the message object Msg32. The task T3 shifted to executing status by the above starts the AP module M32 and the RT communication processing control portion 6 according to the starting order information of the AP module/message object starting information (FIG. 27 (*b*)) of the task T3. The details are as follows. That is, the task T3 initially starts the RT communication processing control portion 6 to update message data of the object Msg32. The RT communication processing control portion 6 started at that time updates the message data of the message object Msg32 by the received message according to the updating condition information (FIG. 29 (*b*)) of the message object Msg32. Then, the task T3 starts the AP module M32, and finally starts the RT communication processing control portion 6 to send the message object Msg33 to the network. The RT communication processing control portion 6 started at that time updates the message data of the message object Msg32 after completion of the AP module M32 according to the updating condition information (FIG. 29 (*b*)) of the message object Msg32. The task T3 is completed with completion of the last starting processing.

(3) Control Unit 1*c*

When the network communication processing driver 4 receives the message object Msg33 from the network, the RTOS3 starts the RT communication processing control portion 6. The RT communication processing control portion 6 uses system call to make the RTOS3 start the task T3 according to the post-updating action information (FIG. 29 (*c*)) of the message object Msg33. The task T2 shifted to executing status by the above starts the AP module M33 and the RT communication processing control portion 6 according to the starting order information of the AP module/message object starting information (FIG. 28) of the task T2. The details are as follows. That is, the task T3 initially starts the RT communication processing control portion 6 to update message data of the object Msg33. The RT communication processing control portion 6 started at that time updates the message data of the message object Msg33 by the received message according to the updating condition information (FIG. 29 (*c*)) of the message object Msg33. Then, the task T3 starts the AP module M33, and finally starts the RT communication processing control portion 6 to send the message object Msg34 to the network. The RT communication processing control portion 6 started at that time updates the message data of the message object Msg34 after completion of the AP module M33 according to the updating condition information of the message object Msg34, and then sends the message object Msg34 to the network. The task T3 is completed with completion of the last starting processing.

In the above, sending of a message from each of the control units 1*a*,1*b*, 1*c* to the network is performed according to the priority information contained in each of the message objects.

As described above, in the present distributed control system, since the task starts the AP module and the message object communication processing according to the AP configuration information, the AP module and the message object communication processing program are completely separated. Therefore, according to the present distributed control system, even if the user defined information or the unit configuration is changed, the user can execute the application under the new system configuration only by changing the set contents of the user defined information without adding change to the software. That is, since a volume of software change incident to change in the system configuration or the unit configuration can be suppressed minimum, labor for matching the application to the new system can be reduced.

Further, since the set contents of the AP configuration information can be changed only by changing the set contents of the user defined information, the AP module and the message communication processing can be easily started synchronously or asynchronously only by changing starting order of the AP module and the message communication processing or the priority of the message object. Therefore, it is easy to shorten the worst executing time of sensor inputting to actuator outputting including the communication processing through the network, and it is easy to guarantee the real time operatability of end-to-end.

Figure 50:
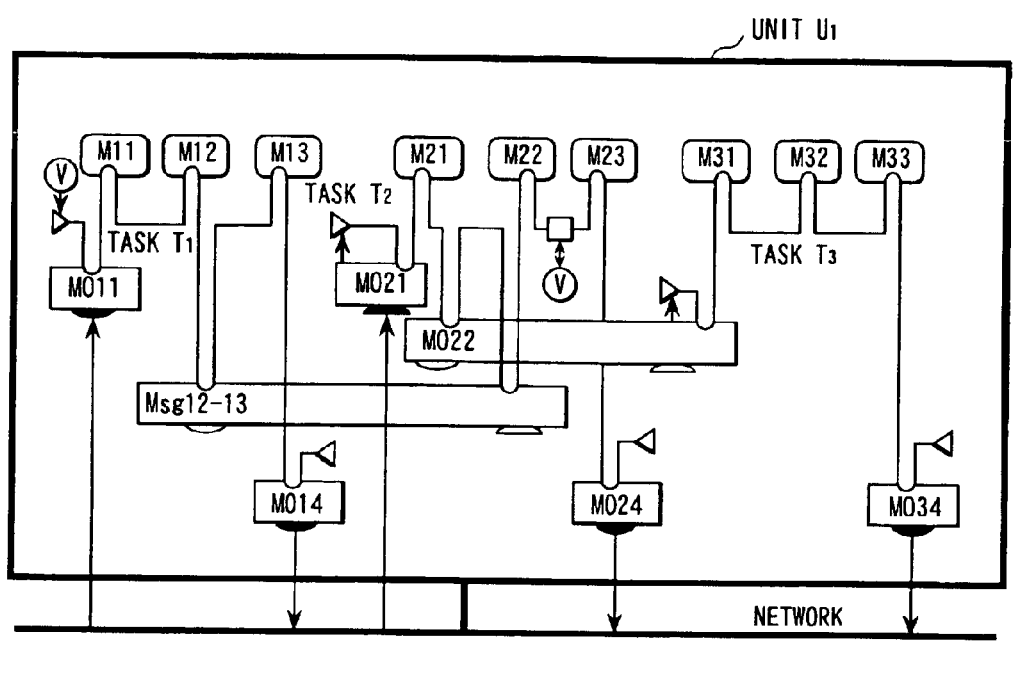
FIG. 50 is a diagram for explaining cooperative operation of AP modules by message communication in an embodiment of a distributed control system in accordance with the present invention.

Although the above description is made on an example in which the AP modules are distributed to the plurality of control units on the network, the present invention can be applied to a case where all the AP modules are allocated to one control unit on the network. For example, in a case where the AP module starting information table of FIG. 26 and the AP module input and output table of FIG. 25 are included in the system configuration information 2120 and the AP module allocation table having all the AP modules registered as the AP modules to be allocated to the control unit 1*a* is contained in the unit configuration information 2121, the information analyzing tool 2108 executes the above-mentioned information automatic generating processing based on the information 2120 and 2121, and the data shown in FIG. 58 and the data shown in FIG. 49 are registered to the message object information table and the AP module/message object starting information table of the control unit 1*a*, respectively. When the application in the control unit 1*a* having the tables transferred is executed, the task starts the AP modules and the RT communication control portion which provides the message object sending and receiving service between the AP modules according to starting order and so on determined in the AP module/message object starting information (refer to FIG. 50). Thereby, cooperative operation of the AP module by mutual message communication is performed to execute the application.

In a case where there are a plurality of reading modules as well as a writing module in the message objects, the highest value among the priorities of the starting tasks of the reading modules is employed as the priority of the message object in the present embodiment. However, it is not always necessary to do so. For example, if the priority of the writing module is employed as the priority of the message object, it becomes easy to perform message sending in the order of higher priority task.

Further, when the present invention is applied to a system in which a task is started only periodically, it is preferable that a message is periodically updated or that a message is allowed to periodically arrive and the task is started in synchronism with the cycle.

In the present embodiment, a message is generated even in a case of communication between tasks inside a single unit. However, number of communication processing times can be reduced by quitting generating a message in a case of communication between tasks inside a single unit.

EMBODIMENT 3

Description will be made below on a configuration which improves real-time operatability of message sending in the distributed control system.

Figure 51:
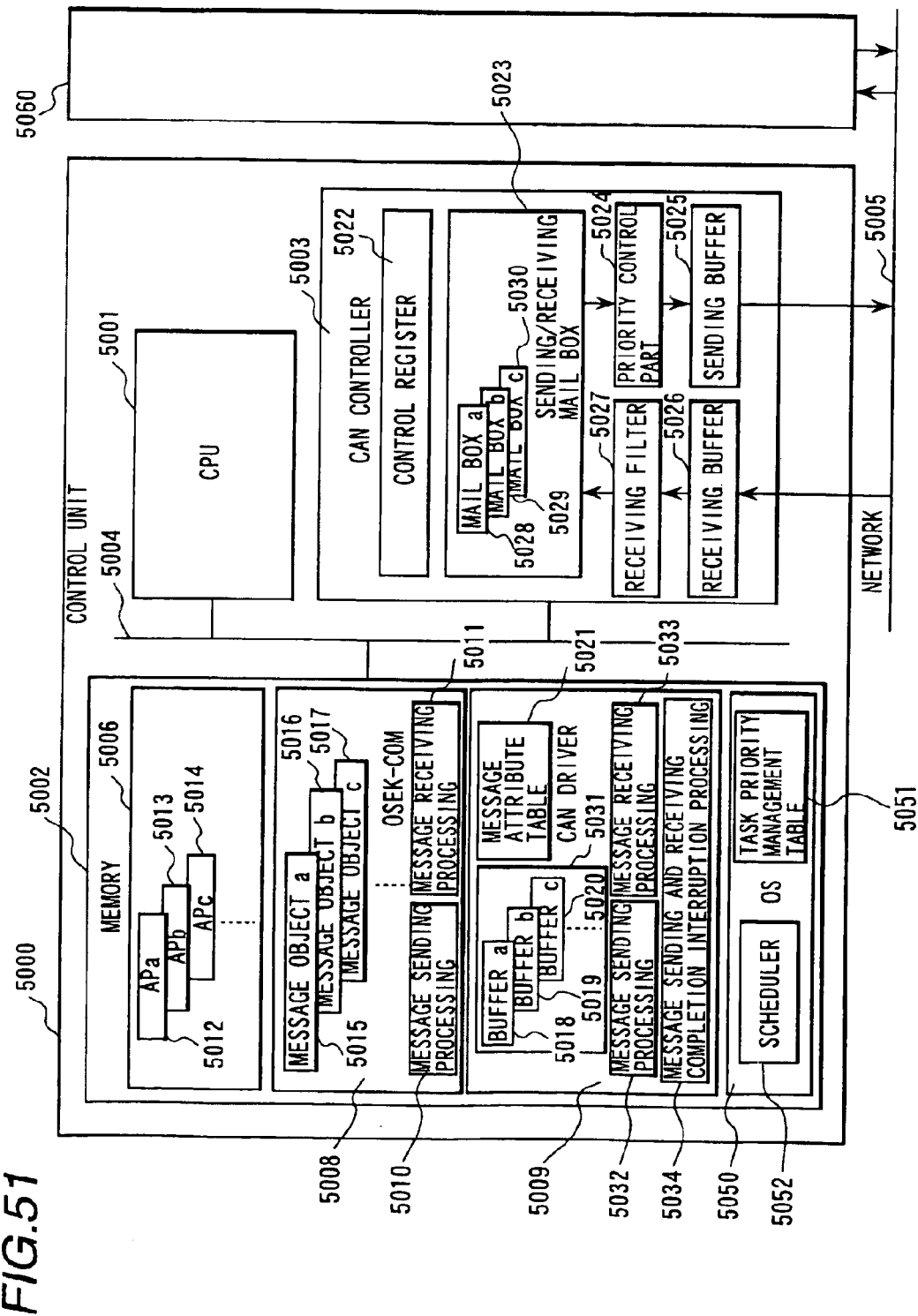
FIG. 51 is a block diagram showing the configuration of a real-time distributed system.

FIG. 51 shows the configuration of a real-time distributed system. In the distributed control system, control units 5000 and 5060 are connected with a network 5005. As the network of the present invention used is a CAN (controller area network) described, for example, in Specification of DeviceNet, volume 1, Release 2.0, 1998, chapter 2 section 2.1 to 2.8, published by Open DeviceNet Vendor Association. The control unit 5000 is composed of a CPU 2001, a memory 5002 and a CAN controller 5003 which are connected with a bus 5003. The CAN controller 5003 is connected to a CAN controller contained in the other control unit 5060 through the network 5005. The memory 5002 stores an application program 5006, an OSEK-COM 5008, a CAN driver 5009 and an OS 5050. Here, the OSEK-COM is a program for processing OSEK-COM protocol which is described in Specification of OSEK/VDX Communication, Version 2.1, revision 1, published by OSEK. The CPU 5001 reads a program stored in the memory 5002, and executes the program. The OS has a multi-task function capable of executing a plurality of tasks in parallel. The CAN controller 5003 is hardware for performing message sending and message receiving with the other control unit 5060.

The CAN controller 5003, the application program 5006, the CAN driver 5009 and the OS 5050 will be successively described below in detail.

(b) CAN Controller

Initially, the CAN controller will be described in detail. The protocol used by the CAN controller 5003 CAN protocol. The CAN protocol gives a message ID specific to each of messages. Priorities are allocated to the message ID's, and priority control (bus-arbitration) of the network 5005 is performed based on the priorities of the message ID's. The bus-arbitration by the message ID will be described. For example, it is assumed that the control unit 5000 is connected to a plurality of control units having the same structure as that of the control unit 5000 through the network 5005. When each of the control units sends a message to the network 5005 at a time, only a control unit sending a message having the highest priority message ID among the massages attains right of using the network 5005 (win bus-arbitration), and can preferentially send the message to the network 5005.

Next, the structure of the CAN controller will be described in detail. The CAN controller 5003.1s composed of a control register 5022, a sending/receiving mail box 5023; a priority control part 5024, a sending buffer 5025, a receiving filter 5027 and a receiving buffer 5026. These will be described below in detail.

Figure 52:
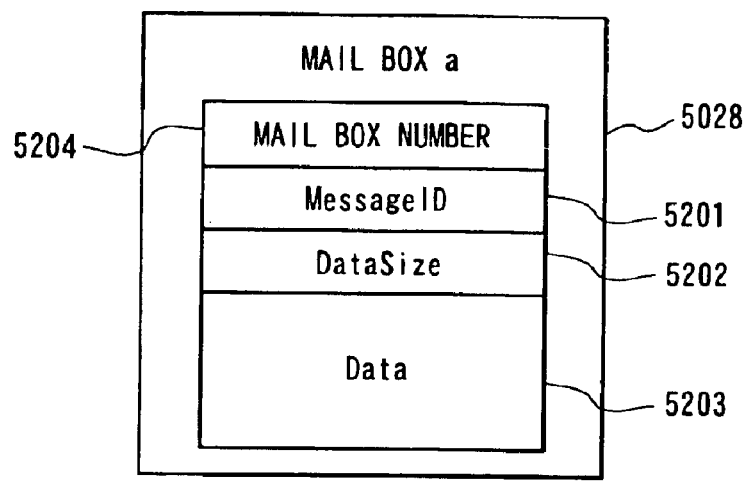
FIG. 52 is a figure showing the detailed configuration of a mail box composing a CAN controller in a control unit of the real-time distributed system.

The sending/receiving mail box 5023 will be described. The sending/receiving mail box 5023 is composed of a plurality of mail boxes of a mail box a 5028, a mail box b 5029, a mail box c 5030 and so on, and contains sent messages and received messages. FIG. 52 is a detailed structural figure of the mail box a 5028. The mail box a 5028 is composed of a Mail box name 5204, a Message ID 5201, a Data size 5202, a Data 5203. The Mail box name 5204 is specifically given to each of the mail boxes of the sending/receiving mail box 5023, and is an area to store the mail box number.

The Message ID 5201 is an area to store a message ID of a sent message and a received message. The mail box a 5028 contains only the sent message and the received message having the Message ID 5202. The Data size 5202 is an area to store the data size of the stored sent message and the stored received message. The Data 5203 is a data storing area of the sent message and the received message. The detailed structures of the mail box b 5029 and the mail box c 5030 are the same as that of the mail box a 5028.

Figure 53:
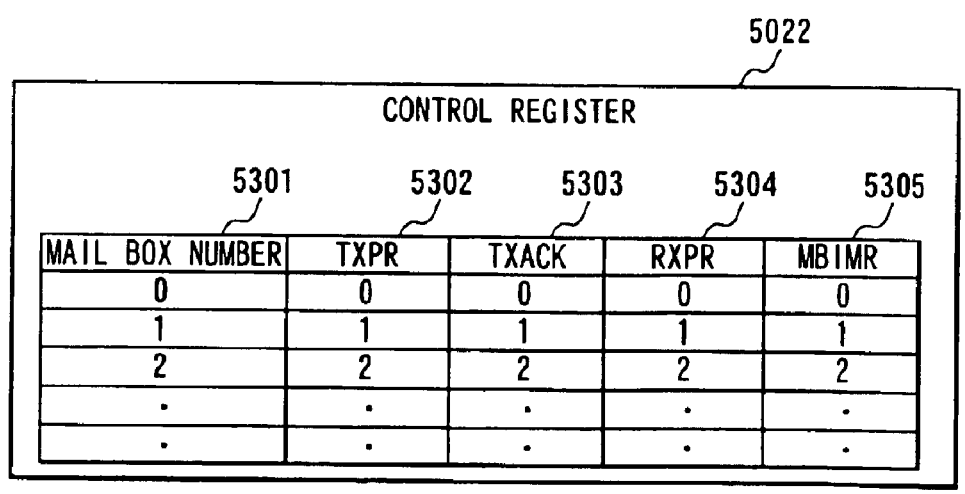
FIG. 53 is a figure showing the detailed configuration of a control register of the CAN controller.

FIG. 53 is a diagram showing the detailed configuration of the control register 5022. The control register 5022 is composed of a Mail box number 5301, a TXPR 5302, a TXACK 5303, a RXPR 5304 and a MBIMP 5305. The Mail box number 5301 is an area to store mail box numbers on the mail box basis. The TXPR 5302 is an area to store message sending requests on the mail box number basis, and the bit set is performed when message sending is requested to the CAN controller 5003.

The TXACK 5303 is an area to store completion of the message sending on the mail box number basis, and the bit set is performed when the CAN controller 5003 completes the message sending. The RXPR 5304 is an area to store completion of the message receiving on the mail box number basis, and the bit set is performed when the CAN controller 5003 completes the message receiving. The MBIMP 5305 is an area to inhibit interrupt at completion of message sending or at completion of message receiving, and the bit set is performed when interrupt from the CAN controller 5003 to the CPU 5001 is inhibited at completion of message sending or at completion of message receiving.

The priority control part 5024 transfers a message of a corresponding mail box to the sending buffer 5025 when the message sending request occurs. Further, when a plurality of message sending requests occur, the priority control part 5024 compares message IDs stored in the corresponding mail boxes and transfers a message of a corresponding mail box storing the highest priority message ID to the sending buffer 5025.

The sending buffer 5025 stores the message transferred from the priority control part 5024. The stored message participates the bus-arbitration by message ID. When the message wins the bus-arbitration by message ID, the message is transferred to the network 5005. When the message loses the bus-arbitration by message ID, the message is not transferred to the network 5005 and waits for the next bus-arbitration. When the message loses the bus-arbitration by message ID and a message sending request to a message having a higher priority message ID occurs, the priority control part 5024 transfers the message of the mail box storing the higher priority message ID to the sending buffer 5025.

The receiving buffer 5026 stores a received message from the network 5005.

The receiving buffer 5026 compares a message ID of a message stored in the receiving buffer 5026 with a message ID registered to each of the mail boxes, and stores the message to the corresponding mail box if the same message ID is found.

The application program 5006, the OSEK-COM 5008, the CAN driver 5009 and the OS 5050 will be described below in detail.

(c) Application Program

The application program will be described. The application program 5006 is composed of a plurality of application programs such as Apa 5012, Apb 5013, Apc 5014 and so on, as shown in FIG. 51. In the present embodiment, each of these application programs is executed by different task.

(d) OSEK-COM

The configuration of OSEK-COM will be describe below in detail. The OSEK-COM 5008 is composed of a plurality of message objects such as a message object a 5015, a message object b 5016, a message object c5017 and so on, a massage sending process 5010 and a message receiving process 5011. Therein, in the massages used in the present embodiment there are two kinds of messages, queued message and unqueued message. The queued message is a message which requires queuing and can not be overwritten. The unqueued message is a message which does not require queuing and can be overwritten.

Figure 54:
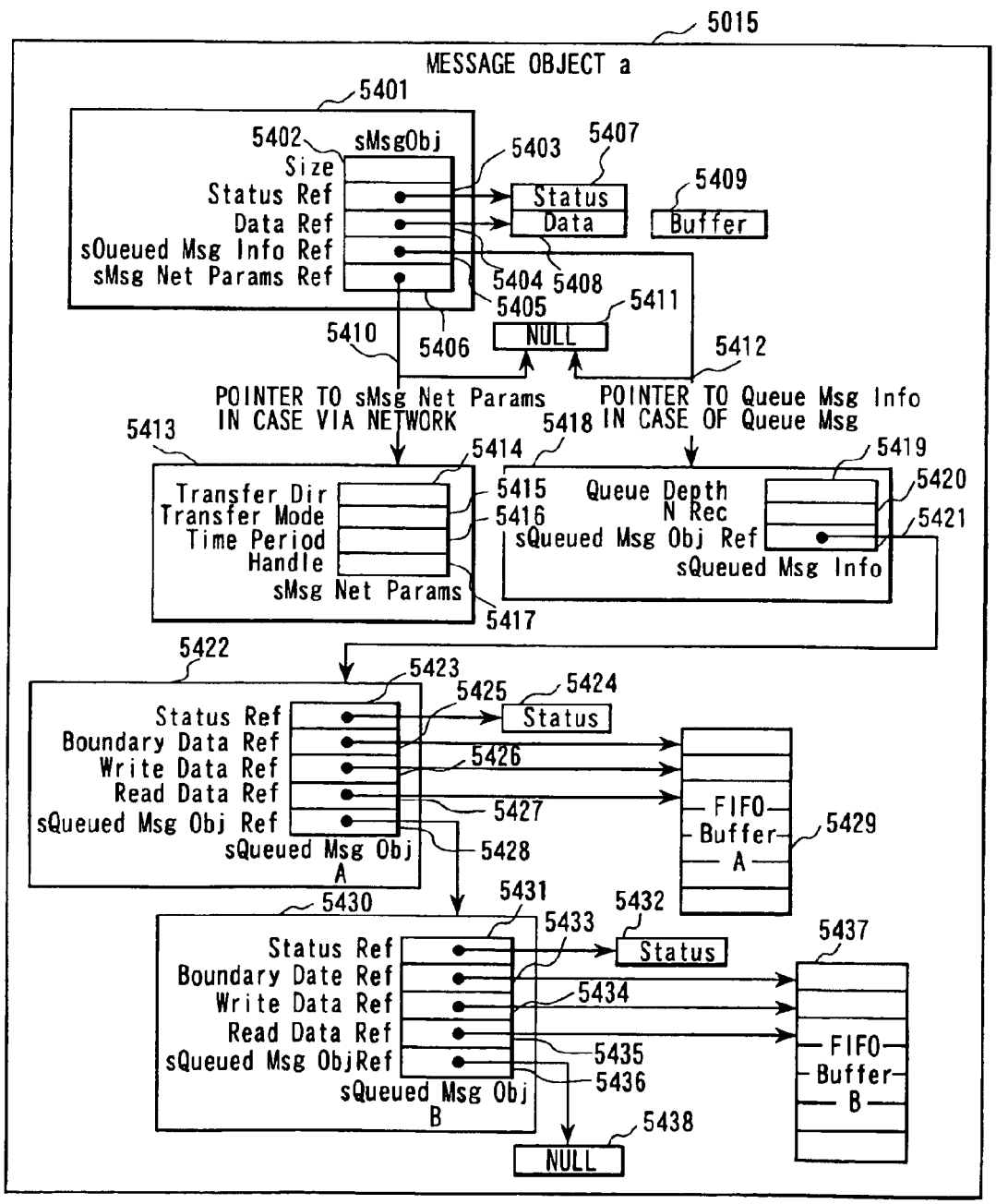
FIG. 54 is a block diagram showing the detailed configuration of a message object composing an OSEK-COM in the control unit of the real-time distributed system.

FIG. 54 is a diagram showing the detailed configuration of the message object a 5015. The message object a 5015 is composed of a plurality of sent queued message Objects. (sQueuedMsgObj) such as a sMsgObj 5401, a Status 5407, a Data 5408, a Buffer 5409, a sMsgNetParams 5413, a sQueuedMsgInfo 5418, a sQueuedMsgObj A 5422, a sQueuedMsgObj B 5430 and so on, a plurality of Statuses such as a Status 5424, a Status 5432 and so on, a plurality of FIFO buffers such as a FIFOBuffer A 5429, a FIFOBuffer B 5437 and so on, and a plurality of NULL's such as a NULL 5411, a NULL 5438 and so on.

The Status 5407 is an area to store the status of sMsgObj (sending status, empty status of buffer). The Status 5424 is an area to store the status of sQueuedMsgObj A 5422 (empty status of buffer). The Status 5432 is an area to store the status of sQueuedMsgObj B 5430 (empty status of buffer). The Data 5408 is an area to store data of a message. The Buffer 5409 is a buffer of the Data 5408 when a message is an unqueued message (5412). The FIFOBuffer A 5429 is a buffer of the Data 5408 when a message is a queued message (5412). The FIFOBuffer B 5437 is a buffer of the Data 5408 when a message is a queued message (5412).

The sMsgObj 5401 is composed of a Size 5402, a StatusRef 5403, a DataRef 5404, a sQueuedMsjInfoRef 5405 and a sMsgNetParamsRef 5406. The Size 5402 is an area to store a data size of a message. The StatusRef 5403 is a pointer to the Status 5407. The DataRef 5404 is a pointer to the Data 5408. The sQueuedMsjInfoRef 5405 is a pointer to the sQueuedMsgInfo 5418 when a message is a queued message. The sMsgNetParamsRef 5405 is a pointer to the NULL 5411 when a message is an unqueued message.

The sMsgNetParamsRef 5406 is a pointer to the aMsgNetParams 5413 when message sending or message receiving is through the network 5005.

The sMsgNetParamsRef 5406 is a pointer to the NULL 5411 when message sending or message receiving is not through the network 5005.

The aMsgNetParams 5413 is composed of a TransferDir 5414, a TransferMode 5415, a TimePeriod 5416 and a Handle 5417. The TransferDir 5414 is an area to store whether a message is a sent message or a received message. The TransferMode 5415 is an area to store whether periodical message sending is used or not. If the periodical message sending is used, an application program can perform message sending every cycle time. The TimePeriod 5416 is an area to stored the cycle time when the periodical message sending is used. The Handle 5417 is an area to store a message ID of a message.

The sQueuedMsgInfo 5418 is composed of a QueuedDepth 5419, a Nrec 5420 and a sQueuedMsjObjRef 5421. The QueuedDepth 5419 is an area to store a queuing depth, that is, a memeory used area of the FIFOBuffer. The Nrec 5420 is an area to store number of users of the message object. For example, when two application programs of the Apa 5012 and the Apb 5013 use one message object, the Nrec 5420 becomes 2. FIG. 54 shows a case where the Nrec 5420 is 2, and the message object a 5015 becomes a configuration having two sQueuedMsgObj (5422, 5430), two Status (5424, 5432) and two FIFOBuffer (5429, 5437). The sQueuedMsjObjRef 5421 is a ponter to the sQueuedMsgObj.

The configuration of the sQueuedMsgObj will be described, taking the sQueuedMsgObj A 5422 as an example. The sQueuedMsgObj A 5422 is composed of a StatusRef 5423, a BoundaryDataRef 5425, a WriteDataRef 5426, a ReadDataRef 5427 and a sQueuedMsgObjRef 5428.

The StatusRef 5423 is a pointer to the Status 5424. The BoundaryDataRef 5425 is a first address of the FIFOBuffer A 5429. The WriteDataRef 5426 is a write address of the FIFOBuffer A 5429. The ReadDataRef 5427 is a read address of the FIFOBuffer A 5429. The sQueuedMsgObjRef 5428 is a pointer to the sQueuedMsgObj B 5430. The configuration of sQueuedMsgObj B 5430 is the same as that of the sQueuedMsgObj A 5422. However, the sQueuedMsgObjRef 5436 is a pointer to the NULL 5438.

Figure 55:
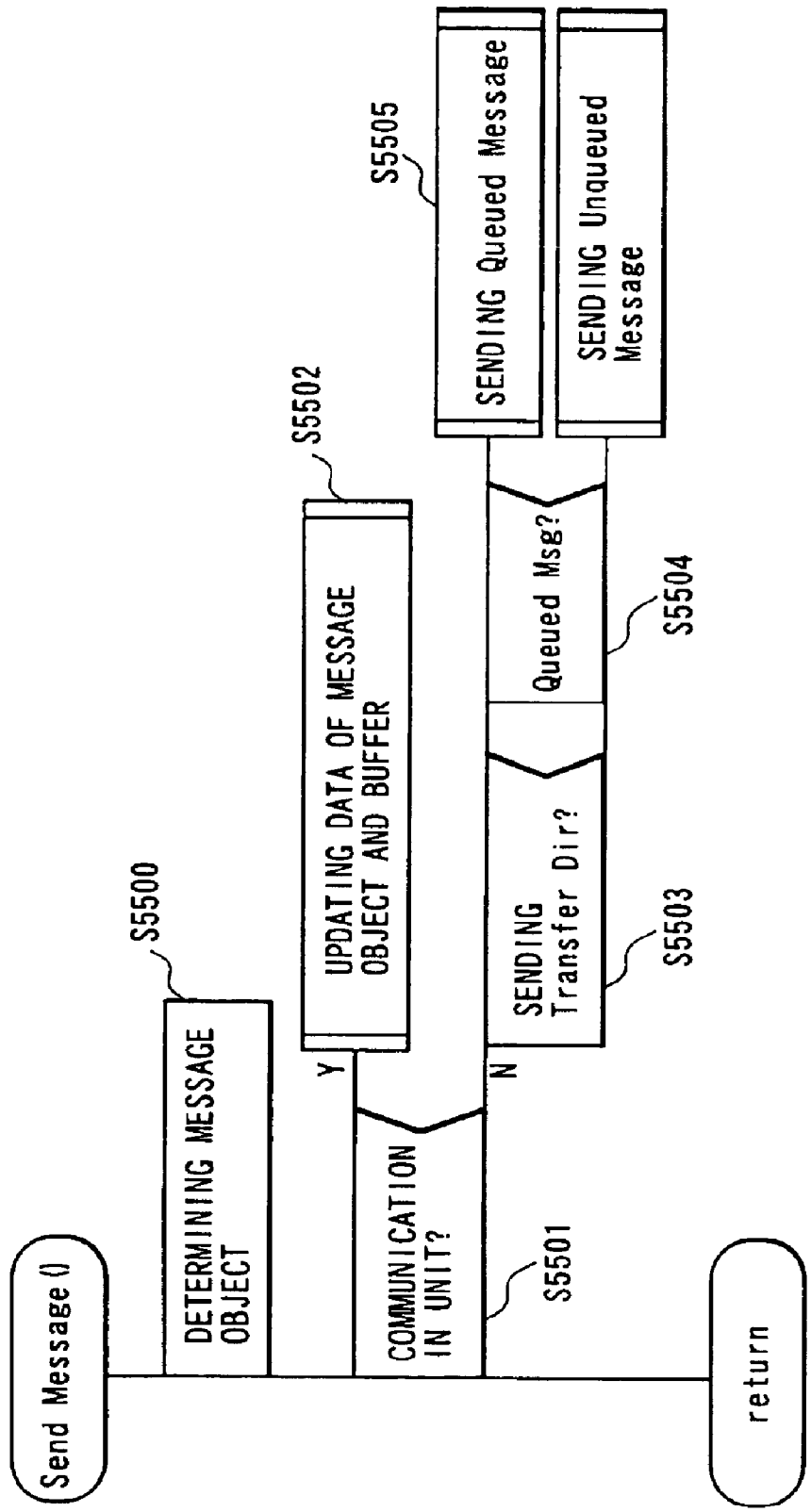
FIG. 55 is a flowchart showing the flow of message sending processing.

Operation of the OSEK-COM will be described below. Initially, message sending processing 5010 of the OSEK-COM will be described in detail. The message sending processing 5010 is a program in which each of the application programs performs actual message sending using the OSEK-COM 5008. In the present embodiment, the message sending processing of the OSEK-COM is executed by a task of an application program calling the OSEK-COM. FIG. 55 is a flow chart showing the flow of the message sending processing 5010. The message sending processing 5010 will be described, referring to FIG. 55. For example, it is assumed that the Apa 5012 executes message sending using the message object a 5015 and the mail box a 5028.

Initially, in Step S5500, the Apa 5012 determines a message object a 5015 used in the message sending.

In Step S5501, it is judged referring to the sMsgNetParamsRef 5406 whether the message sending is communication inside the unit or through network.

If the message sending is communication inside the unit, the message data sent by the Apa 5012 is written in the Data 5408 in Step S5502.

In a case where the sent message is an unqueued message, the Data 5408 is written in the Buffer 5409.

In a case where the sent message is a queued message, the Data 5408 is written in the FIFOBuffer (5429, 5437).

If the message sending is not communication inside the unit, that is, communication through the network, in Step S5503 it is judged referring to the TransferDir 5414 whether the sent message is a sent message.

Next, in Step S5504, it is judged whether or not the sent message is a queued message.

If the sent message is a queued message, the queued message sending processing is executed in Step S5505.

If the sent message is an unqueued message, the unqueued message sending processing is executed in Step S5506.

Figure 56:
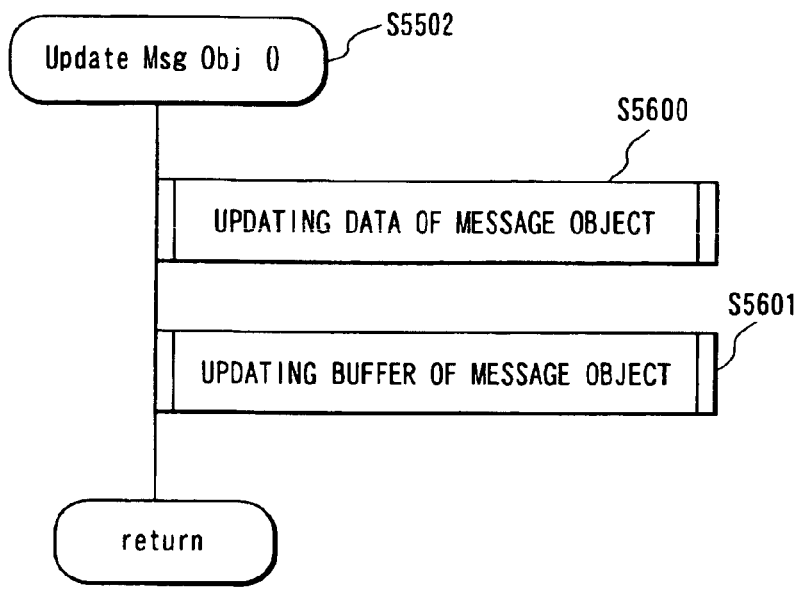
FIG. 56 is a flowchart showing the flow of updating data and buffer of message object in the message sending processing.

FIG. 56 is a flow chart showing the details of the processing of the Step S5502 of FIG. 55.

The Step S5502 will be described, referring to FIG. 56.

Initially, in Step S5600, the Apa 5012 writes data of the sent message in the Data 5408.

In Step S5601, if the sent message is an unqueued message, the Data 5408 is written in the Buffer 5409.

If the sent message is a queued message, the Data 5408 is written in the FIFOBuffer (5429, 5437).

Figure 57:
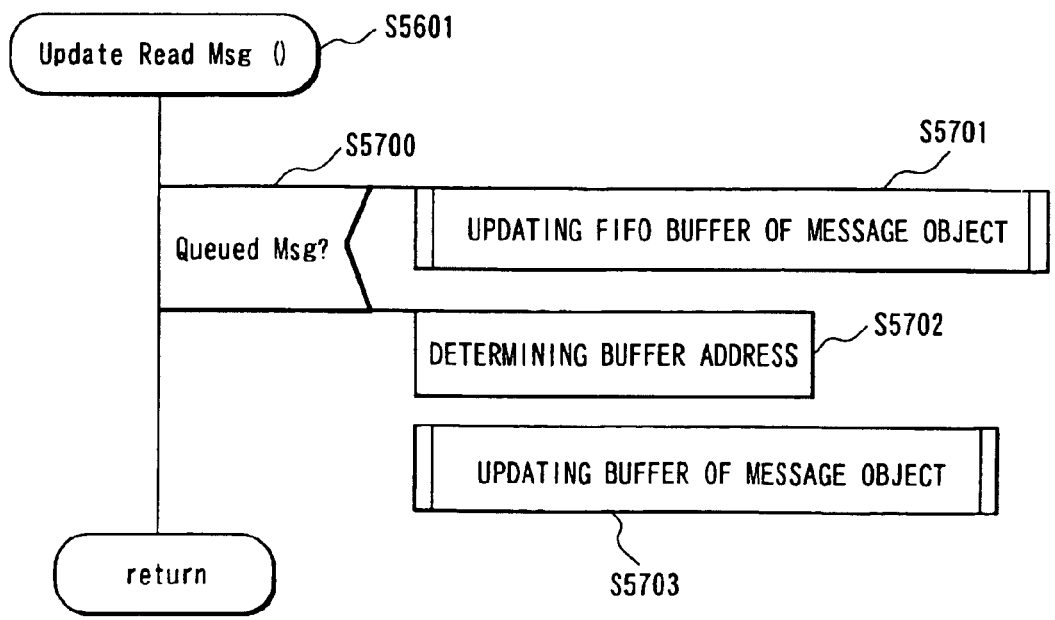
FIG. 57 is a flowchart showing the flow of updating buffer of message object in the message sending processing.

FIG. 57 is a flow chart showing the details of the processing of the Step S5601 of FIG. 56. The Step S5601 will be described, referring to FIG. 57.

Initially, in Step S5700, it is judged whether or not the sent message is a queued message.

If the sent message is a queued message, in Step S5701 the Data 5408 is written in FIFOBuffer (5409, 5437).

If the sent message is not a queued message, in Step S5702 a writing address of the Buffer 5409 is determined referring to the DataRef 5404 and the Size 5402. Then, in Step S5703, the Data 5408 is written in the Buffer 5409.

Figure 58:
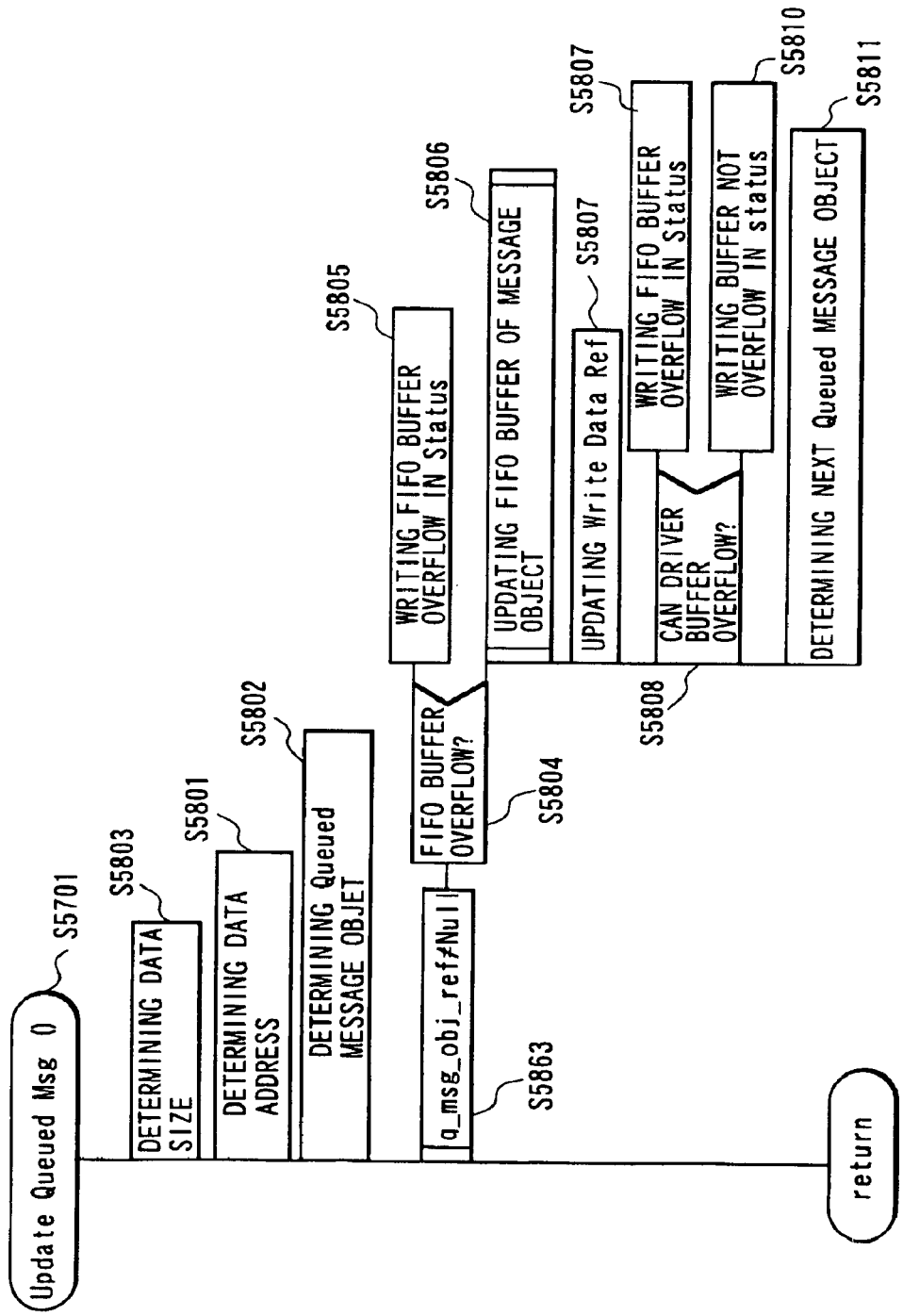
FIG. 58 is a flowchart showing the flow of updating FIFO buffer of message object in the message sending processing.

FIG. 58 is a flow chart showing the details of the processing of the Step S5701 of FIG. 57. The Step S5701 will be described, referring to FIG. 58.

Initially, in Step S5800, the data size of the sent message is determined referring to the Size 5402.

In Step S5801, the address of the Data 5408 is determined referring to the SizeRef 5404.

In Step S5802, the address of the sQueuedMsgObj A 5422 is determined referring to the sQueuedMsgObjRef 5421.

Next, by repeating the procedure from Step S5804 to Step 5811 until the condition of Step S5803 is satisfied, that is, while the above determined address is not NULL, the Data, 5408 is written in the FIFOBuffer (5429, 5437). The processing from Step S5804 to Step 5811 will be described, taking writing from the Data 5408 to the FIFOBuffer A 5429 as an example.

In Step S5804, it is judged whether the FIFOBuffer A 5429 overflows or not.

If overflows, in Step S5805, a value expressing overflowing of the FIFOBuffer A 5429 is written in the Status 5424.

If not overflows, in Step S5806, the Data 5408 is written in the FIFOBuffer A 5429 referring to the WriteDataRef 5426.

Next, in Step S5807, the WriteDataRef 5426 is updated.

In Step S5808, it is judged referring to the LIMIT 4007 whether or not the buffer a 5018 overflows.

If overflows, in Step S5809, a value expressing overflowing of the buffer a 5018 is written in the Status 5424.

If not overflows, in Step S5810, a value expressing no overflowing of the buffer a 5018 is written in the Status 5424.

In Step S5811, the address of the sQueuedMsgObj B 5430 is determined referring to the sQueuedMsgObjRef 5428.

Figure 59:
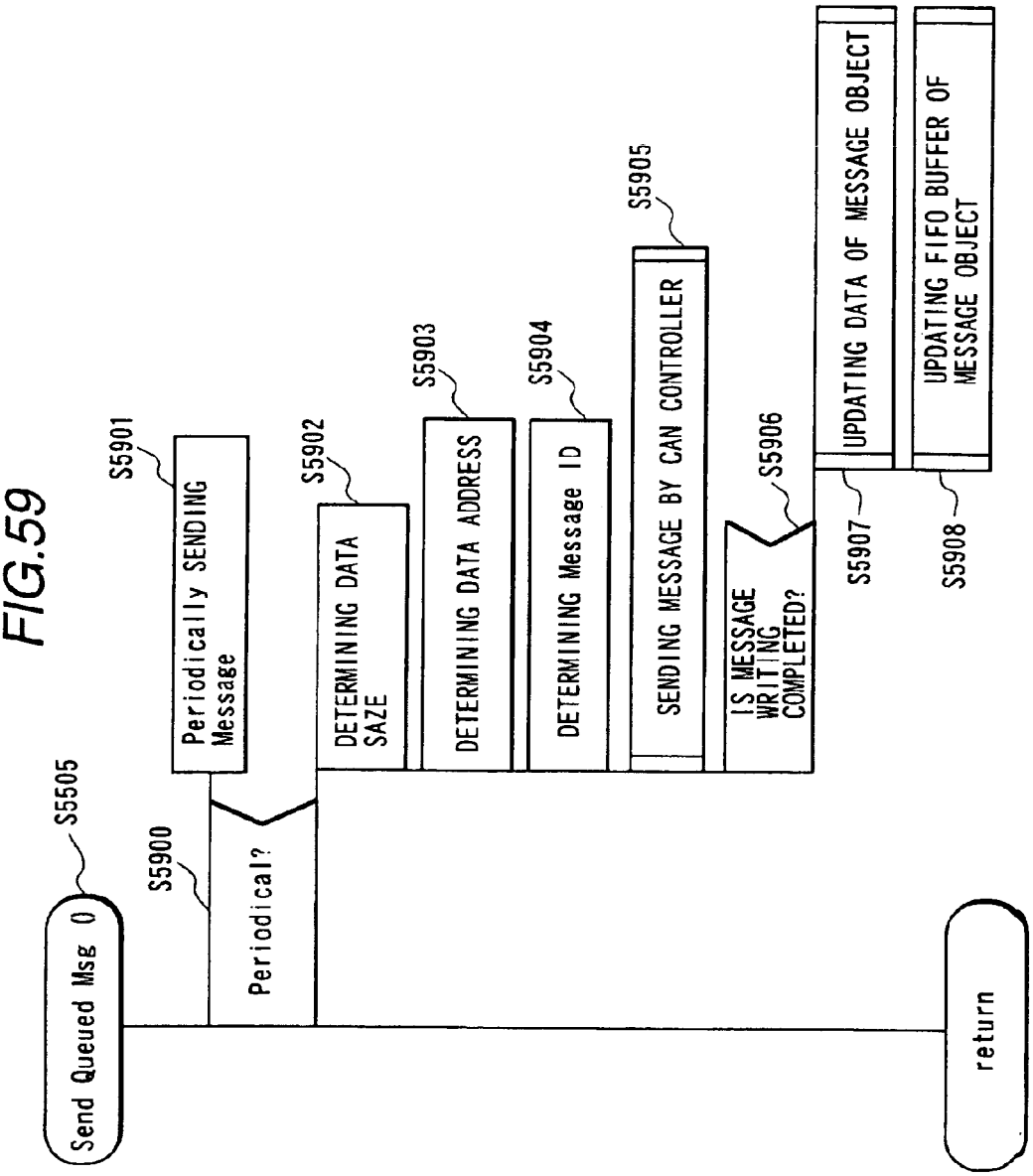
FIG. 59 is a flowchart showing the flow of sending a queued message in the message sending processing.

FIG. 59 is a flow chart showing the details of the processing of the Step S5505 of FIG. 55. The Step S5505 will be described, referring to FIG. 59.

Initially, in Step S5900, it is judged whether the periodical message sending is used or not, referring to the Transfer-Mode 5415.

If the periodical message sending is used, in Step S5901, periodical message sending is executed referring to the TimePeriod 5416.

If the periodical message sending is not used, in Step S5902, the data size of the sent message is determined first, referring to the Size 5402.

Next, in Step S5903, the address of the Data 5408 is determined, referring to the DataRef 5404.

In Step S5904, the message ID of the sent message is determined, referring to the Handle 5417.

In Step S5905, the sending processing 5032 of the CAN driver is called, and the message is sent to the network 5005 using the CAN controller 5003. The task of sending processing of the CAN driver is started by this call. The details of the above will be described later.

In Step S5906, it is judged whether or not the sent message is written in the Data 5203 by a return parameter of the Step S5905.

If the sent message is written, in Step S5907, data of the message sent by the Apa 5012 is written in the Data 5408.

Next, in Step S5909, the Data 5908 is written in the FIFOBuffer (5428, 5437).

Figure 60:
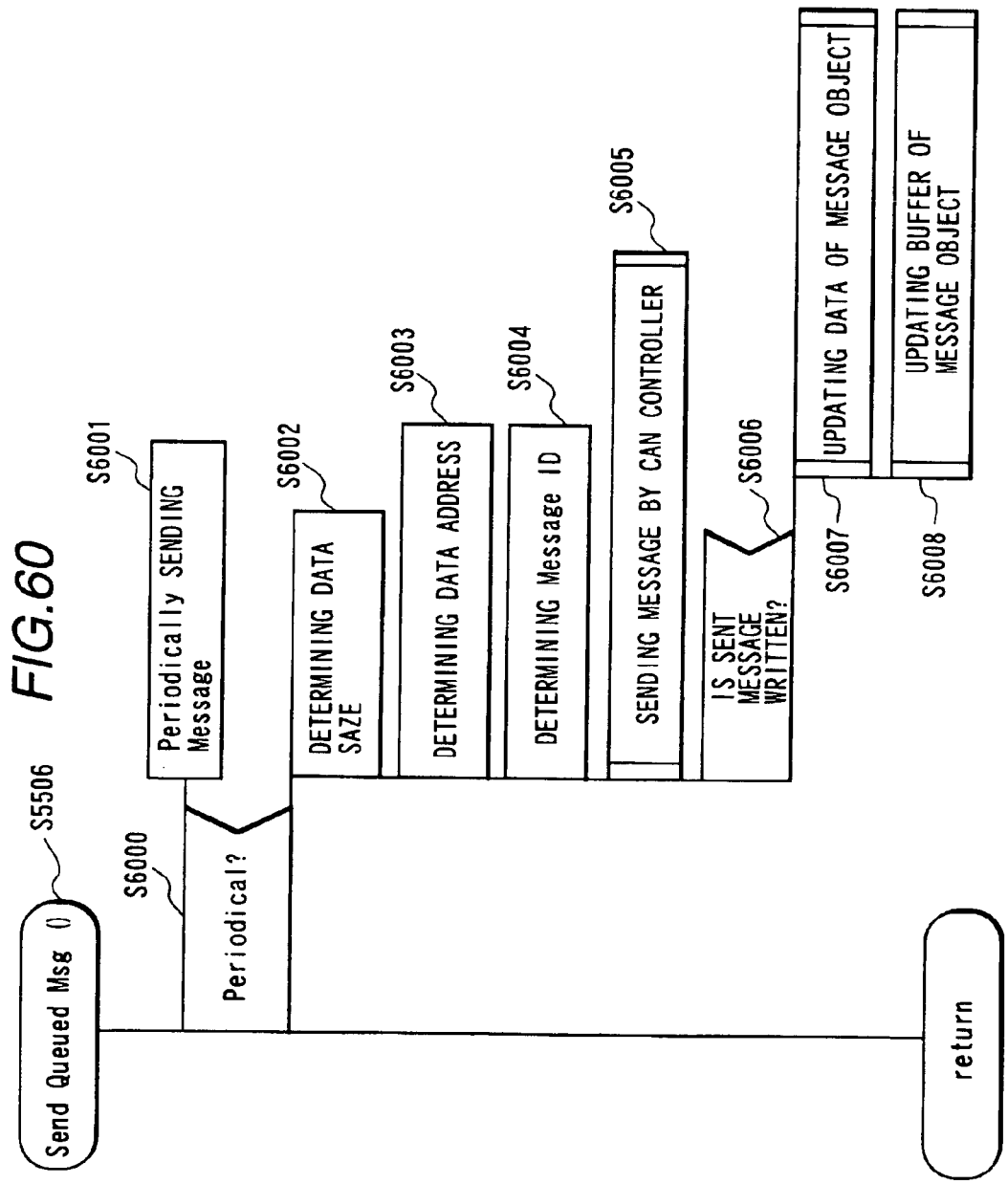
FIG. 60 is a flowchart showing the flow of sending an unqueued message in the message sending processing.

FIG. 60 is a flow chart showing the details of the processing of the Step S5506 of FIG. 55. The Step S5506 will be described, referring to FIG. 60.

Initially, in Step S6000, it is judged whether the periodical message sending is used or not, referring to the Transfer-Mode 5415.

If the periodical message sending is used, in Step S6001, periodical message sending is executed referring to the TimePeriod 5416.

If the periodical message sending is not used, in Step S6002, the data size of the sent message is determined first, referring to the Size 5402.

Next, in Step S6003, the address of the Data 5408 is determined, referring to the DataRef 5404.

In Step S6004, the message ID of the sent message is determined, referring to the Handle 5417.

In Step S6005, the message is sent to the network 5005 using the CAN controller 5003.

In Step S6006, it is judged whether or not the sent message is written in the Data 5203 by a return parameter of the Step S6005.

If the sent message is written, in Step S6007, data of the message sent by the Apa 5012 is written in the Data 5408.

Next, in Step S6008, the Data 5408 is written in the Buffer 5409.

Figure 61:
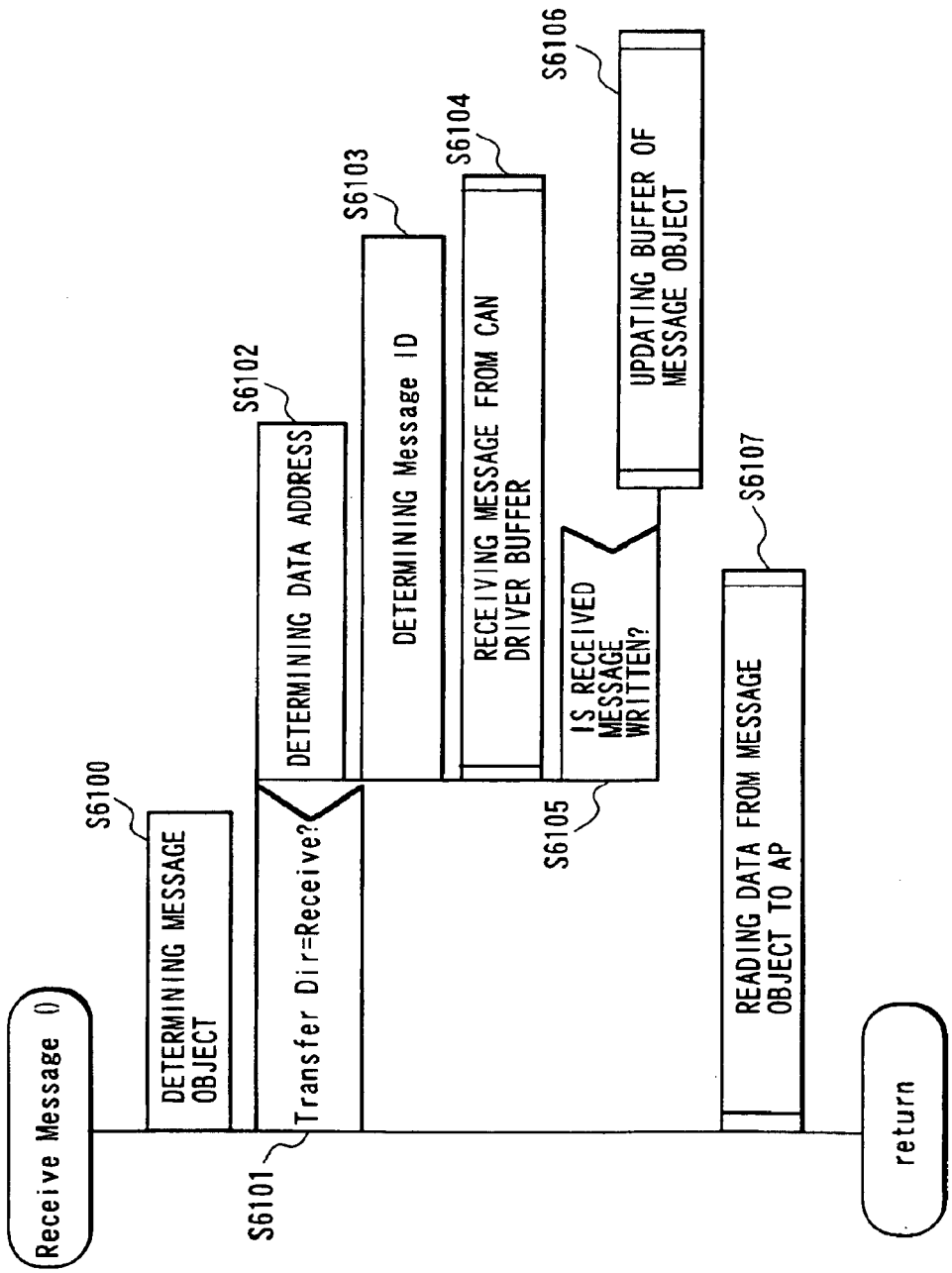
FIG. 61 is a flowchart showing the flow of message receiving processing.

The message receiving processing 5011 of the OSEK-COM will be described below in detail. The message receiving processing 5011 is a program in which each of the application programs performs actual message sending using the OSEK-COM 5008. In the present embodiment, the message receiving processing of the OSEK-COM is executed by a task of an application program calling the OSEK-COM. FIG. 61 is a flow chart showing the flow of the message receiving processing 5011. The message receiving processing 5010 will be described, referring to FIG. 61. For example, it is assumed that the Apa 5012 executes message receiving using the message object a 5015, the buffer a 5018 and the mail box a 5028. Further, it is assumed that the message received by the Apa 2012 is stored in the mail box a 5028 by the CAN controller 5003, and stored in the buffer a 5018 by the message sending/receiving completion interrupt processing 5034 of the CAN driver.

Initially, in Step S6100, the Apa 5012 determines a message object a 5015 used in the message receiving.

In Step S6101, it is judged referring to the TransferDir 5414 whether the message to be received is a received message or not.

If a received message, in Step S6102 an address of the Data 5408 is determined referring to the DataRef 5404.

In Step S6103, a message ID of the received message is determined referring to the Handle 5417.

In Step S6104, the receiving processing 5033 of the CAN driver is called, and the task of receiving processing of the CAN driver is started by this call. The details of the above will be described later. The data of the received message is written from the buffer a 5018 to the Data 5408.

In Step S6105, it is judged whether or not the message to be received is written from the buffer a 5018 to the Data 5408 by a return parameter of the Step S6104.

If the message to be received is written, in Step S6106 the Data 5408 is written in the Buffer 5406 when the received message is an unqueued message (5412).

When the received message is a queued message (5412), the Data 5408 is written in the FIFOBuffer (5429, 5437).

Finally, in Step S6107, the data is read from the message object a 5015 to the Apa 5012.

Figure 62:
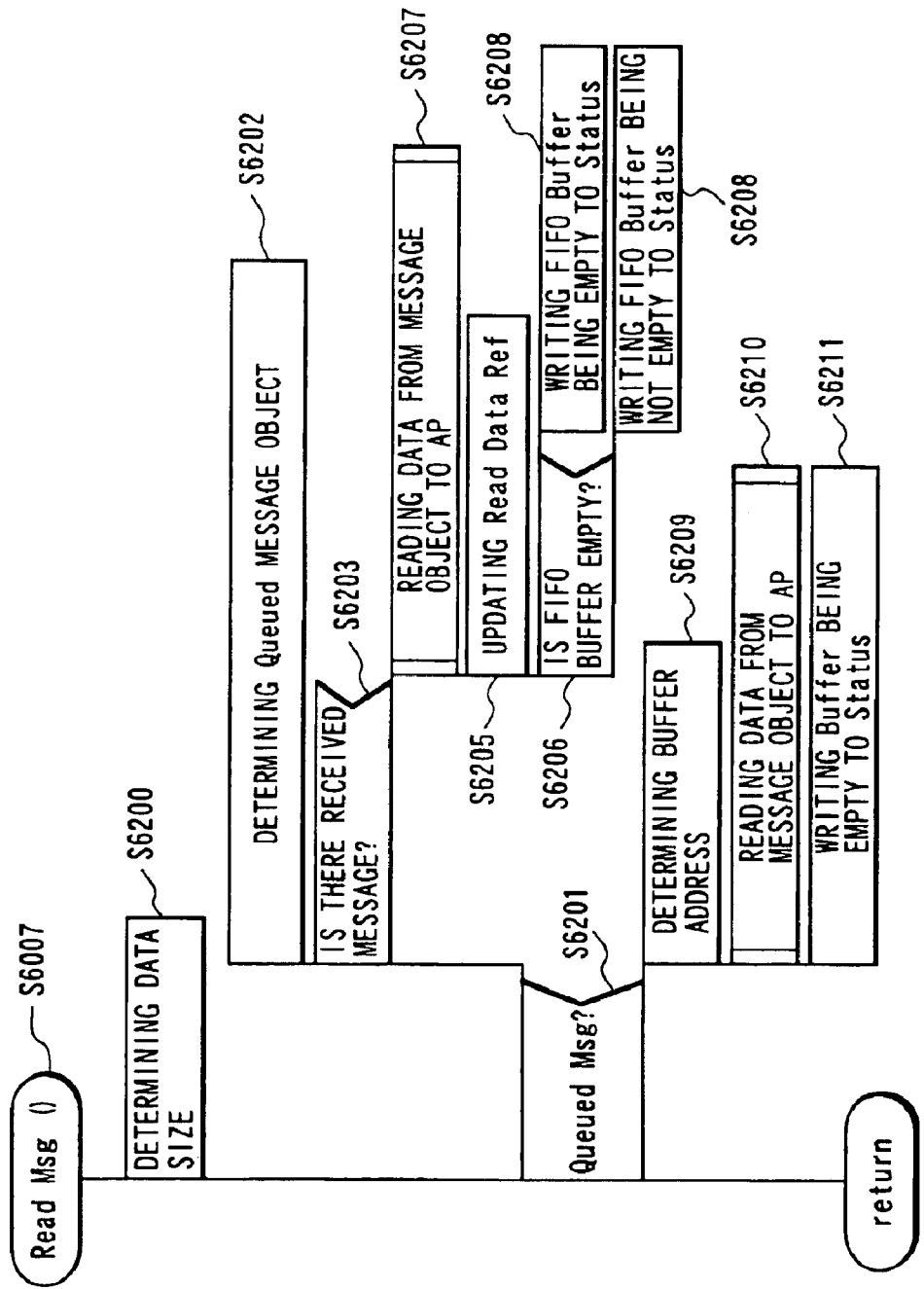
FIG. 62 is a flowchart showing the flow of receiving a message from message object in the message receiving processing.

FIG. 62 is a flow chart showing the details of the processing 6107. The Step S6107 will be described, referring to FIG. 62.

Initially, in Step S6200, the data size of the received message is determined referring to the Size 5402.

Next, in Step S6201, it is judged whether or not the message to be received is a queued message.

If the message to be received is a queued message, the address of the sQueuedMsgObj A 5422 is determined referring to the sQueuedMsgObjRef 5421.

Next, in Step S6203, it is judged referring to the Status 5424 whether or not there is a received message in the FIFOBuffer A 5429.

If there is a received message, initially in Step S6204, the received message is read from the FIFOBuffer A 5429 to the Apa 5012 referring to the ReadDataRef 5427.

Next, in Step S6205, the ReadDataRef 5427 is updated.

Then, in Step S6206, it is judged whether or not the FIFOBuffer A 5429 is empty.

If the FIFOBuffer A 5429 is empty, in Step S6207 a value expressing the FIFOBuffer A 5429 being empty is stored in the Status 5424.

If the FIFOBuffer A 5429 is not empty, in Step S6208 a value expressing the FIFOBuffer A 5429 being not empty is stored in the Status 5424.

If it is judged in Step S6201 that the message to be received is not a queued message, initially in Step S6209 the read address of the Buffer 5409 is determined referring to the DataRef 5404 and the Size 5402.

Next, in Step S6210, the received data is read from the buffer 5409 to the Apa 5012.

Then, in Step S6211, a value expressing the buffer 5409 being empty is stored in the Status 5407.

(e) CAN Driver

The CAN driver 5009 will be described below in detail. Initially, the configuration of the CAN driver will be described. The CAN driver 5009 is composed of a buffer 5031, a message attribute table 5021, a message sending process 5032, a message receiving process 5033 and a message sending/receiving completion interrupt process 5034.

The buffer 5031 is composed of a plurality of buffers of a buffer a 5018, a buffer b 5019, a buffer c 5020 and so on. Number of the buffers composing the buffer 5031 is prepared by the number of mail boxes composing the sending and receiving mail box 5023, and each of the buffers serves as a specially used buffer for each of the mail boxes. For example, when the specially used buffer for the mail box a 2028 is the buffer a 5018, the buffer is a data storing area of the message similar to the Data 5203.

FIG. 63 is a view showing the detailed configuration of the message attribute table 5021. The message attribute table 5021 is composed of a mail box number 6301, a MessageID 6302, a DataSize 6303, a QUEUED 6304, a LOCKED 6305, a NOMSG 6306 and a LIMIT 6307.

The mail box number 6301 is an area to store the mail box number of each of the mail boxes. The MessageID 6302 is an area to store the message ID registered to the mail box. The DataSize 6303 is an area to store the data size of the message registered to the mail box for each of the mail boxes. The messageID 6304 and the DataSize 6303 are memory areas, for example, similar to those of the messageID 5201 and the DataSize 5202 composing the mail box a 5028. The QUEUED 6304 is an area to store whether a message is a queued message or an unqueued message for each of the mail boxes. It is bit-set when the message is a queued message. The LOCKED 6305 is an area to store whether a message stored in the mail box is under execution of message sending to the network 5005 by receiving a message sending request or not under execution of message sending by receiving no message sending request for each of the mail boxes. The LOCKED 6305 is bit-set when a message stored in the mail box is under execution of message sending to the network 5005 by receiving a message sending request. The NOMSG 6306 is an area to store whether or not the buffer 5031 is filled with the received messages for each mail box number. The NOMSG 6306 is bit-set when the buffer 5031 is not filled with the received messages. The LIMIT 6307 is an area to store whether or not the buffer 5031 is filled with the received messages to the limit for each mail box number. The LIMIT 6307 is bit-set when the buffer 5031 is filled with the received messages to the limit. In the present embodiment, it is necessary to provide, for example, the buffer 5031 with the FIFO buffer for queuing the queued messages because queued messages and unqueued messages are handled.

The unqueued messages does not need to be queued. In a case where each of the buffers 5031 is installed as a FIFO buffer, the LIMIT 6307 is bit-set when the FIFO buffer overflows.

Operation of the CAN driver will be described below. Processing of the CAN driver is executed by another task different from the application program or the OSEK-COM. Initially, the message sending processing 5032 of the CAN driver will be described in detail. In the present embodiment, as the OSEK-COM calls the message sending processing of the CAN driver by STEP S5905 of FIG. 59, the message sending processing task of the CAN drover is started. When a plurality of calls of the message sending processing of the CAN driver occur, a plurality of tasks are started correspondingly.

FIG. 64 is a flow chart showing the detailed process of the message sending processing 5032 of the CAN driver. The message sending processing of the CAN driver will be described, referring to FIG. 64.

Initially, in Step S6400, a mail box number is determined from a message ID of a sent message using the message attribute table 5021.

Next, in Step S6401, it is judged whether or not the LOCKED 6305 is bit-set. If the LOCKED 6305 is bit-set, a value expressing failing to write the sent message in the Data 5203 is stored in the return parameter.

If not bit-set, in St3ep S6403 the LOCKED 6305 is bit-set.

Next, in Step S6404, the data of the message sent by the Apa-5012 is written in the Data 5203.

Then, in Step S6405, the TXPR is bit-set to request the CAN controller 5003 to execute message sending to the network 5005.

In Step S6406, a value expressing success of writing the sent message in the Data 5203 is stored in the return parameter.

By completion of the above processing, the message sending task of the CAN driver is completed.

The message receiving processing 5033 of the CAN driver will be described in detail. In the present embodiment, as the OSEK-COM calls the message receiving processing of the CAN driver by STEP S6104 of FIG. 61, the message receiving processing task of the CAN drover is started. When a plurality of calls of the message receiving processing of the CAN driver occur, a plurality of tasks are started correspondingly.

Figure 65:
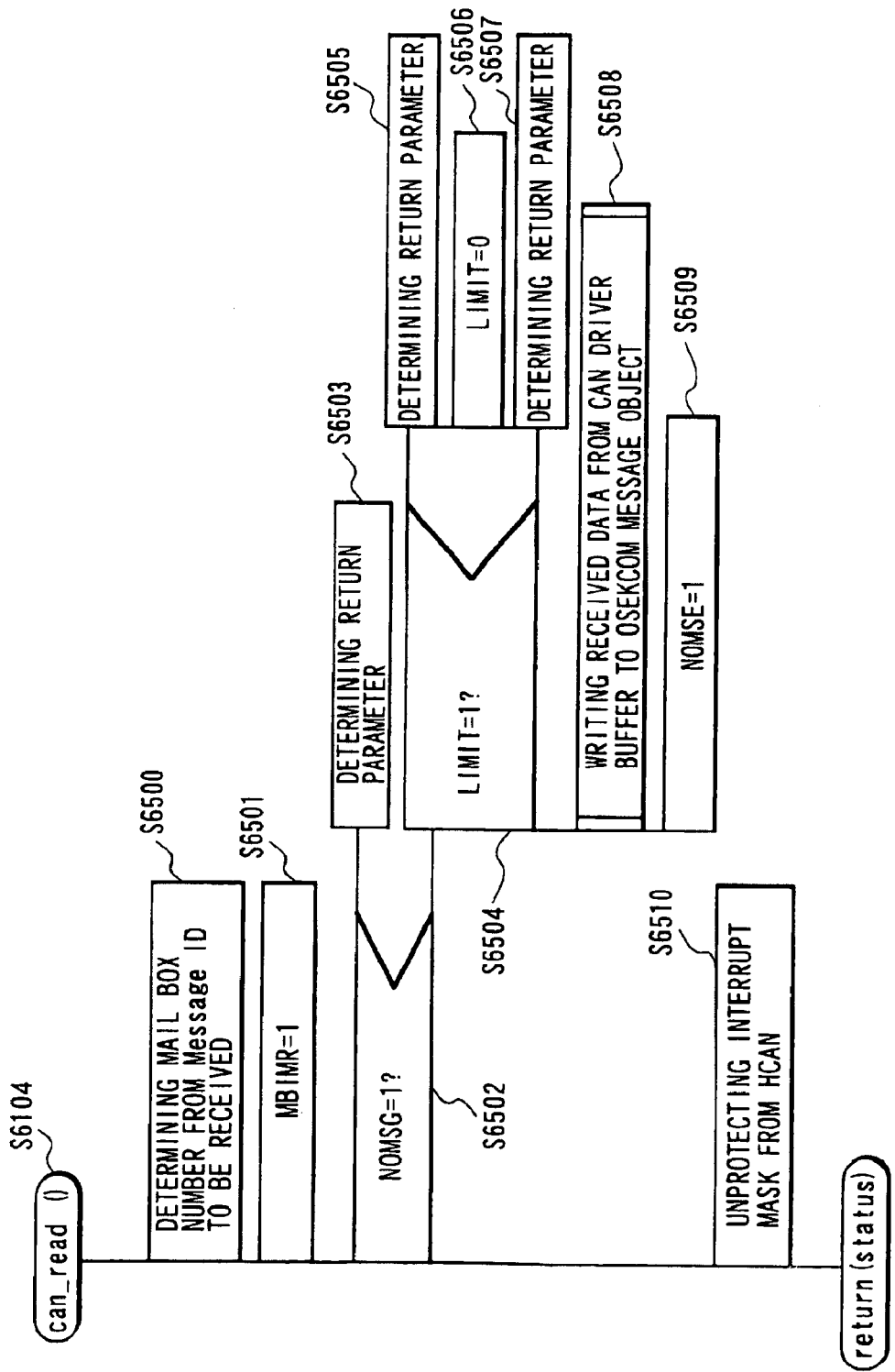
FIG. 65 is a flowchart showing the flow of receiving a message from a buffer in the CAN driver.

FIG. 65 is a flow chart showing the detailed process of the message receiving processing 5033 of the CAN driver. The message receiving processing of the CAN driver will be described, referring to FIG. 65.

Initially, in Step S6500, a mail box number is determined from a message ID of a message to be received using the message attribute table 5021.

In Step S6501, the MBIMR 5305 is bit-set.

In Step S6502, it is judged whether or not the NOMSG is bit-set.

If it is judged in Step S6502 that the NOMSG is bit-set, in Step S6503 a value expressing that the received message is not written in the buffer a 5018 is stored in the return parameter.

If it is judged in Step S6502 that the NOMSG is not bit-set, in Step S6504 it is judged whether or not the LIMIT 6307 is bit-set.

If it is judged in Step S6504 that LIMIT 6307 is bit-set, in Step S6505 a value expressing overflow of the buffer a 5018 is stored in the return parameter.

Then, in Step S6506, the LIMIT 6307 is cleared.

If it is judged in Step S6504 that LIMIT 6307 is not bit-set, in Step S6507 a value expressing no overflow of the buffer a 5018 is stored in the return parameter.

Then, in Step S6508, the data of the received message is written from the buffer 5018 to the Data 3408.

In Step S6509, the NOMSG 6306 is bit-set.

In Step S6510, the MBIMR 5305 is cleared.

By completion of the above processing, the message receiving task of the CAN driver is completed.

Figure 66:
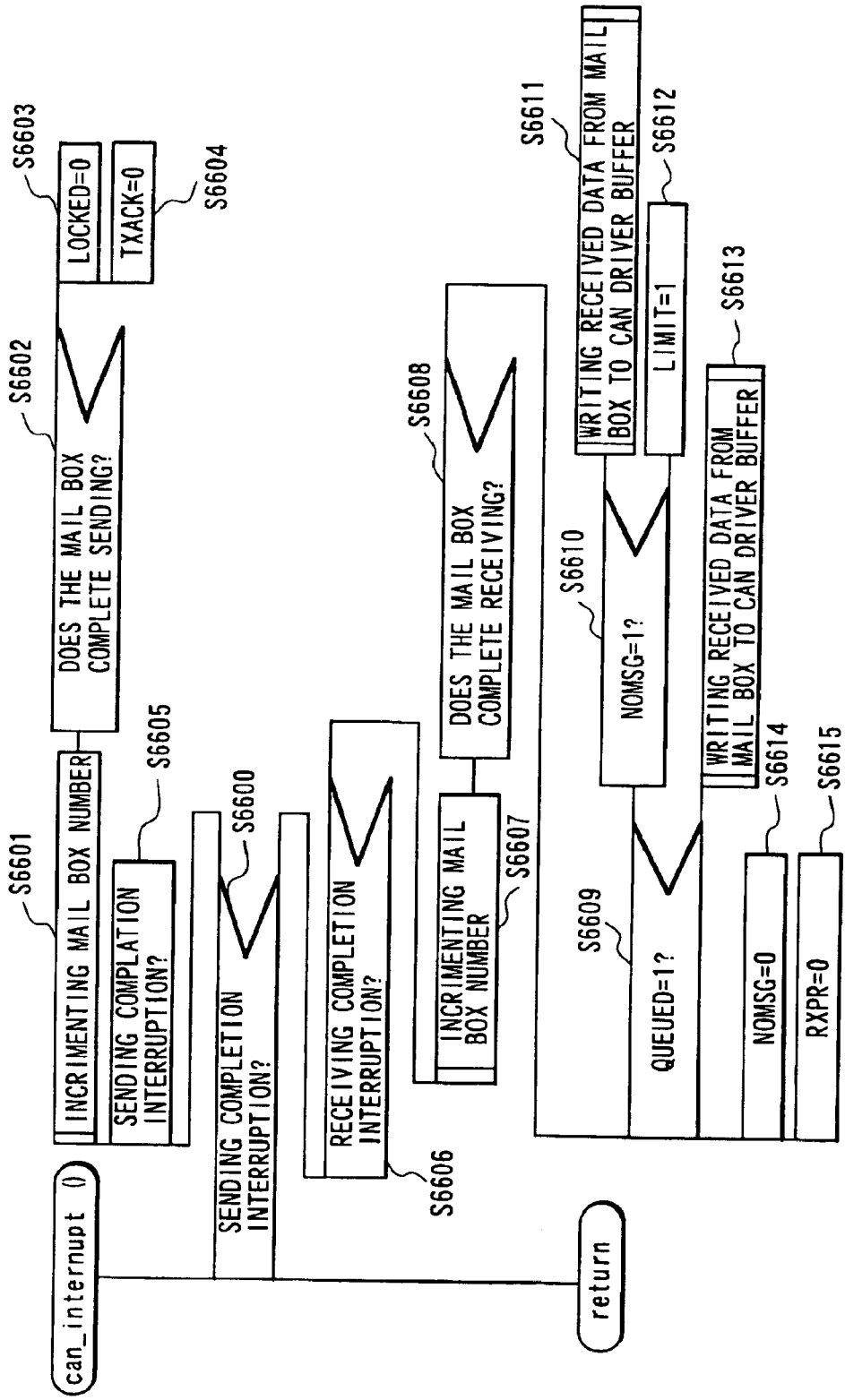
FIG. 66 is a flowchart showing the flow of message sending-receiving completion interrupt processing.

The message sending/receiving completion interrupt processing 5034 of the CAN driver will be described in detail. FIG. 66 is a flow chart showing the detailed process of the message sending/receiving completion interrupt processing 5034 of the CAN driver. The message sending/receiving completion interrupt processing of the CAN driver will be described, referring to FIG. 66.

Initially, in Step S6600, it is judged whether or not the CAN controller 5003 is message sending completion interrupt.

If message sending completion interrupt, the procedure from Step S6602 to Step S6604 is repetitively executed in order of smaller mail box number while the condition of Step S6601 is satisfied, that is, by number of the mail boxes of the CAN controller 5003.

In Step S6602, it is judged whether or not the TXACK 5303 is bit-set.

If bit-set, the LOCKED 6305 is cleared first in Step S6603.

Then, in Step S6604, the TXACK 5303 is cleared.

In Step S6605, the message sending completion interrupt plug is cleared.

In Step S6606, it is judged whether or not the CAN controller 5003 is message receiving completion interrupt.

If message receiving completion interrupt, the procedure from Step S6608 to Step S6615 is repetitively executed in order of smaller mail box number while the condition of Step S6607 is satisfied, that is, by number of the mail boxes of the CAN controller 5003.

In Step S6608, whether or not the PXPR 5304 is bit-set.

If bit-set, in Step S6609 it is judged whether or noy the QUEUED 6304 is bit-set.

If bit-set in the judgment of Step S6609, in Step S6610 it is judged whether or not the NOMSG 6306 is bit-set.

If bit-set in the judgment of Step S6610, in Step S6611 the received message is written from the mail box a 5028 to the buffer a 5018.

If not bit-set in the judgment of Step S6610, in Step S6612 the LIMIT 6307 is bit-set.

If not bit-set in the judgment of Step S6609, in Step S6613 the received message is written from the mail box a 5028 to the buffer a 5018.

In Step S6614, the NOMSG 6306 is cleared.

In Step S6615, the RXPR 5304 is cleared.

(f) OS.

The OS will be described below in detail. The OS 5050 has a scheduler 5052 for executing scheduling of the task priority management table 5051 and tasks. A method of task scheduling of the scheduler 5052 using the task priority management table 5051 will be described below.

FIG. 67 is a figure showing the configuration of the task priority management table. The configuration of the task priority management table 5051 will be described, referring to FIG. 67. The task priority management table is composed of a message ID 6700 of a message and a task priority 6701. Assuming that, for example, priorities of message ID are 100, 200, 300 in descending order, the task priority management table is preset so that priorities of the tasks processing the message are 1, 2, 3 descending order corresponding to the priorities of the message ID. The scheduler 5052 starts a task having a high task priority preferentially referring to the task priority management table 5051.

In the present embodiment, the tasks of the message sending processing 5032 and the message receiving processing 5033 of the CAN driver 5009 are started by call from the OSEK-COM 5008. With starting the task of the message sending processing 5032 of the CAN driver 5009, the CAN controller 5003 can be requested to send a message to the network 5005 by storing the sent message in the sending and receiving mail box 5023.

When the message sending processing task of the CAN driver is started to send the message having message ID of 300, the scheduler 5052 starts the task with priority level 3 referring to the task priority management table 5051. The started task stores the sent message in the sending and receiving mail box 5023 and requests the CAN controller 5003 to send the message to the network 5005.

When a message sending processing task of the CAN driver is started later to send a message having message ID of 100 while another message sending processing task of the CAN driver for sending another message having message ID of 300 is in progress, the scheduler 5052 starts the task with priority level 1 and, at the same time, temporarily brings the task in progress with priority level 3 in a wait state referring to the task priority management table 5051. By doing so, it is possible to request the CAN controller 5003 to send the message having message ID of 100 to the network 5005 by storing the message having message ID of 100 in the sending and receiving mail box 5023, in prior to sending the message having message ID of 300.

Similarly, the message receiving processing task of the CAN driver is started in the order of priority corresponding to the received message ID.

According to the present invention, even if a message sending processing task of the CAN driver is just executing the request of sending a message to the network by storing the message in a mail box of a CAN controller, another message sending processing task of the CAN driver started later can execute the request of sending another message having a higher priority to the network by storing the message in a mail box of the CAN controller. Thereby, the priority of the writing module as the priority of the message object.

Further, according to the present invention, even if a message sending processing task of the CAN driver is just storing a message from a mail box of the CAN controller to a message object of the OSEK-COM, another message sending processing task of the CAN driver started later can store another message having a higher priority from a mail box of the CAN controller to a message object of the OSEK-COM. Thereby, a message in the highest priority level can be received with the highest preferential order, and accordingly the real-time operatabilty of message receiving can be improved.

(2) Another Embodiment of the Present Invention

Although the CAN driver in the above description has the buffer for temporarily storing a received message, the received message may be directly written in a message object of the OSEK-COM from the CAN controller without providing any buffer. By doing so, the time required for message receiving processing can be reduced and the memory resource can be saved.

Further, although in the above-mentioned embodiment the CAN controller having the plurality of mail boxes is used and the specified message IDs are allocated to the mail boxes by only one ID for each mail box, a plurality of message IDs may be allocated to one mail box. By doing so, various kinds of messages having different message IDs can be sent and received irrespective of number of the mail boxes contained in the CAN controller.

Furthermore, although the buffers for temporarily storing a received message are installed in the CAN driver by one buffer for each of the mail boxes in the above-mentioned embodiment, a plurality of buffers may be installed for one mail box. By doing so, when one mail box receives a plurality of messages, the received messages can be buffered by each of message IDs of the received messages. Therefore, the real-time operatability of the message receiving can be improved by starting message receiving processing tasks of the CAN driver corresponding to priorities of the messages.

Further, although the buffers for temporarily storing a received message are installed in the CAN driver in the above-mentioned embodiment, buffers for temporarily storing a sent message may be installed in the CAN driver. In addition, a plurality of the buffers may be installed for each mail box. By doing so, when a plurality of messages are sent using one mail box, the sent messages can be buffered; by each of message IDs of the sent messages. Therefore, the real-time operatability of the message sending can be improved by starting message sending processing tasks of the CAN driver corresponding to priorities of the messages.

Although the CAN protocol is used in the above-mentioned embodiment, the other communication protocol may be employed. By doing so, the system can cope with the other protocol as well as the CAN protocol.

Although the OSEK-COM is used as the communication library in the above-mentioned embodiment, the other communication library executing message sending processing and message receiving processing may be employed. By doing so, the system can cope with the other communication library as well as the OSEK-COM.

According to the present distributed control system, since a task starts an AP module and message communication processing, the AP module and the message communication processing can be completely separated. Therefore, according to the present distributed control system, even if the user defined information or the unit configuration is changed, the user can execute the application under the new system configuration only by changing the set contents of the user defined information without adding change to the software. That is, since a volume of software change incident to change in the system configuration or the unit configuration can be suppressed minimum, labor for matching the application to the new system can be reduced.

Further, according to the present distributed control system, since starting order of the application program and the communication control program on each of the control units can be changed by changing the set contents of the module configuration information on each of the control units, the application program and the communication control program can be easily started synchronously or asynchronously. Therefore, it is easy to shorten the worst executing time of sensor inputting to actuator outputting including the communication processing through the network, and it is easy to guarantee the real time operatability of end-to-end.

Further, in a case where there are a plurality of reading modules in the message objects, it possible to easily perform message sending in the order of higher priority task by employing the priority of the writing module as the priority of the message object. Furthermore, in a case of communication between tasks in a single unit, the communication processing can be reduced by preventing generation of messages.

According to the present invention, a message in the highest priority level can be sent with the highest preferential order, and accordingly the real-time operability of message sending can be improved.

What is claimed is:

1. A distributed control system comprising a network and at least one control unit having a communication means for connecting to said network, wherein said control unit comprises:

a message object configuration information storing means for storing a starting procedure of at least one message object having a network communication function, the message object being for performing communication processing between application programs each of which is constituted by at least one software module, and the message object configuration information storing means comprising a communication Processing priority indicating a priority to execute communication processing; and a real-time communication processing control means for executing said message object based on the priority by referring to said message object configuration information storing means;

wherein said real-time communication processing control means is a software module executed in a task.

2. A distributed control system comprising a network and at least one control unit having a communication means for connecting to said network, wherein said control unit comprises:

a message object configuration information storing means for storing a starting procedure of at least one message object having a network communication function, the message object being for performing communication processing between application programs each of which is constituted by at least one software module, and the message object configuration information storing means comprising a communication processing priority indicating a priority to execute communication processing; and a real-time communication processing control means for executing said message object based on the priority by referring to said message object configuration information storing means;

wherein said message object configuration information storing means comprises information indicating one of an in-unit communication and an inter-unit communication, and indicating a communication processing priority in regard to the inter-unit communication.

3. A distributed control system comprising at least one control unit connected to a network, wherein said control unit comprises:
- a module configuration information storing means for storing starting procedure of at least one software module which constitutes an application program;
- a message object configuration information storing means for storing starting procedure of at least one message object having a network communication function, the message object being for performing communication processing between application programs each of which is constituted by at least one software module, and the message object configuration information storing means including a communication processing priority indicating a priority to execute communication processing;
- a module start control means for executing the software module, referring to module configuration information storing means; and
- a real-time communication processing control means for executing said message object based on the priority referring to said message object configuration information storing means.

4. A distributed control system according to claim 3, wherein said module start control means is a task.

5. A distributed control system according to claim 3, wherein said module start control means is a function included in an operating system.

6. A distributed control system according to claim 3, wherein said module configuration information storing means includes a software module information to be executed next.

7. A distributed control system according to claim 3, wherein said real-time communication processing control means is a software module executed in a task.

8. A distributed control system according to claim 3, wherein said real-time communication processing control means is a task.

9. A distributed control system according to claim 3, wherein said real-time communication processing control means is a function included in an operating system.

10. A distributed control system according to claim 3, wherein said message object configuration information storing means includes information indicating whether a message object is an in-unit communication or an inter-unit communication.

11. A distributed control system according to claim 3, wherein said message object configuration information storing means includes software module information to be executed next.

12. A control system comprising at least one control unit which includes a module configuration information string means for storing a starting means for at least one software module which constitutes an application program, a message object configuration information storing means for storing a starting procedure of at least one message object having a network communication function, the message object being for performing communication processing between application programs each of which is constituted by at least one software module, and the message object configuration information storing means including a communication processing priority indicating a priority to execute communication processing, a module start control means for executing the software module referring to said module configuration information storing means, and a real-time communication processing means for executing said message object based on the priority referring to said message object configuration information storing means; a computer having information to be stored in said module configuration information storing means; and an initializing means existing in said control unit for storing the information in said module configuration information storing means, wherein said control unit, the computer and the initializing means are connected to a network.

13. A control system according to claim 12, further comprises a distributed control middleware code generating tool which receives system configuration information and outputs a program code composed of information to be stored in said module configuration information storing means and said module start control means.

* * * * *